(12) United States Patent
Weight et al.

(10) Patent No.: US 11,392,940 B2
(45) Date of Patent: Jul. 19, 2022

(54) MULTI-APPROVAL SYSTEM USING M OF N KEYS TO PERFORM AN ACTION AT A CUSTOMER DEVICE

(71) Applicant: tZERO IP, LLC, New York, NY (US)

(72) Inventors: Joel Weight, Sandy, UT (US); Steven Hopkins, Holladay, UT (US); Tron Black, Sandy, UT (US); Denny Becker, Salt Lake City, UT (US)

(73) Assignee: tZERO IP, LLC, New York, NY (US)

( * ) Notice: Subject to any disclaimer, the term of this patent is extended or adjusted under 35 U.S.C. 154(b) by 102 days.

(21) Appl. No.: 16/250,369

(22) Filed: Jan. 17, 2019

(65) Prior Publication Data
US 2019/0220858 A1 Jul. 18, 2019

Related U.S. Application Data

(60) Provisional application No. 62/780,779, filed on Dec. 17, 2018, provisional application No. 62/663,921, (Continued)

(51) Int. Cl.
*G06Q 20/38* (2012.01)
*H04L 9/30* (2006.01)
(Continued)

(52) U.S. Cl.
CPC ..... *G06Q 20/3829* (2013.01); *G06Q 20/0855* (2013.01); *G06Q 20/3672* (2013.01);
(Continued)

(58) Field of Classification Search
CPC ........... G06Q 20/3829; G06Q 20/0855; G06Q 20/3823; G06Q 20/3827; G06Q 20/3672;
(Continued)

(56) References Cited

U.S. PATENT DOCUMENTS 6,950,523 B1 9/2005 Brickell et al.
8,181,813 B2 * 5/2012 Cognard ................. F25D 3/107
220/560.1
(Continued)

FOREIGN PATENT DOCUMENTS

GB 2538022 A 11/2016
KR 20020039318 A 5/2002
(Continued)

OTHER PUBLICATIONS

U.S. Patent and Trademark Office, "Office Action", U.S. Appl. No. 16/250,362, filed Nov. 3, 2020, pp. 1 through 33, Published: US.
(Continued)

*Primary Examiner* — Patrick McAtee
*Assistant Examiner* — Vincent I Idiake
(74) *Attorney, Agent, or Firm* — Fogg & Powers LLC

(57) ABSTRACT

A computing system that includes at least one processor and at least one memory communicatively coupled to the at least one processor is disclosed. The computing system also includes at least one network interface communicatively coupled to the at least one processor and configured to communicate with at least one vault system, each of the at least one vault system storing a respective one of N private keys or key components associated with a customer. The at least one processor is configured to receive, from each of at least one vault system, a respective private key or key component. The at least one processor is also configured to perform at least one action based on at least M of the N private keys or key components.

25 Claims, 31 Drawing Sheets

Related U.S. Application Data filed on Apr. 27, 2018, provisional application No. 62/663,922, filed on Apr. 27, 2018, provisional application No. 62/618,077, filed on Jan. 17, 2018.

(51) Int. Cl.

| | |
|---|---|
| *H04L 9/14* | (2006.01) |
| *G06Q 20/36* | (2012.01) |
| *G06Q 20/40* | (2012.01) |
| *H04L 9/32* | (2006.01) |
| *H04L 9/06* | (2006.01) |
| *H04L 9/08* | (2006.01) |
| *G06Q 20/08* | (2012.01) |
| *H04L 9/00* | (2022.01) |

(52) U.S. Cl.
CPC ....... *G06Q 20/3674* (2013.01); *G06Q 20/381* (2013.01); *G06Q 20/389* (2013.01); *G06Q 20/3823* (2013.01); *G06Q 20/3827* (2013.01); *G06Q 20/40145* (2013.01); *H04L 9/0637* (2013.01); *H04L 9/0643* (2013.01); *H04L 9/085* (2013.01); *H04L 9/0819* (2013.01); *H04L 9/0894* (2013.01); *H04L 9/14* (2013.01); *H04L 9/30* (2013.01); *H04L 9/321* (2013.01); *H04L 9/3231* (2013.01); *H04L 9/3239* (2013.01); *H04L 9/3247* (2013.01); *H04L 9/3297* (2013.01); *G06Q 2220/00* (2013.01); *H04L 9/50* (2022.05); *H04L 2209/56* (2013.01)

(58) Field of Classification Search
CPC ............... G06Q 20/389; G06Q 20/381; G06Q 20/3674; G06Q 20/40145; G06Q 2220/00; G06Q 20/10; G06Q 20/384; G06Q 20/223; G06Q 20/38215; H04L 9/3297; H04L 9/3239; H04L 9/085; H04L 9/3247; H04L 9/0643; H04L 9/321; H04L 9/3231; H04L 9/0637; H04L 9/0894; H04L 9/30; H04L 9/14; H04L 9/0819; H04L 2209/38; H04L 2209/56; H04L 9/083; H04L 9/0861
See application file for complete search history.

(56) References Cited

U.S. PATENT DOCUMENTS

| | | | |
|---|---|---|---|
| 9,614,683 B1 | 4/2017 | Reed et al. | |
| 9,735,958 B2 | 8/2017 | Alness et al. | |
| 9,882,715 B2 | 1/2018 | Alness et al. | |
| 9,954,680 B1* | 4/2018 | Machani | H04L 9/085 |
| 10,050,779 B2 | 8/2018 | Alness et al. | |
| 10,354,325 B1* | 7/2019 | Skala | G06Q 40/04 |
| 10,558,974 B2* | 2/2020 | Smith | G06Q 20/02 |
| 10,868,672 B1 | 12/2020 | Farrugia et al. | |
| 2002/0087500 A1 | 7/2002 | Berkowitz et al. | |
| 2008/0031460 A1 | 2/2008 | Brookner et al. | |
| 2009/0183008 A1 | 7/2009 | Jobmann | |
| 2009/0214030 A1 | 8/2009 | Price, III | |
| 2010/0119061 A1 | 5/2010 | Kawale | |
| 2015/0088754 A1 | 3/2015 | Kirsch | |
| 2015/0262137 A1 | 9/2015 | Armstrong | |
| 2015/0262168 A1 | 9/2015 | Armstrong | |
| 2015/0262171 A1 | 9/2015 | Langschaedel et al. | |
| 2015/0262176 A1 | 9/2015 | Langschaedel et al. | |
| 2015/0269538 A1 | 9/2015 | Stanchfield | |
| 2015/0287026 A1 | 10/2015 | Yang et al. | |
| 2015/0324789 A1 | 11/2015 | Dvorak et al. | |
| 2016/0283941 A1 | 9/2016 | Andrade | |
| 2017/0221052 A1 | 8/2017 | Sheng et al. | |
| 2017/0272245 A1 | 9/2017 | Norton | |
| 2017/0317833 A1 | 11/2017 | Smith et al. | |
| 2017/0317997 A1* | 11/2017 | Smith | H04L 9/3271 |
| 2018/0089758 A1* | 3/2018 | Stradling | G06F 12/1408 |
| 2018/0101829 A1 | 4/2018 | Narasimhan et al. | |
| 2018/0293557 A1* | 10/2018 | Kim | G06Q 20/3823 |
| 2018/0337774 A1 | 11/2018 | Alness et al. | |
| 2019/0007205 A1* | 1/2019 | Corduan | G06Q 20/367 |
| 2020/0074450 A1* | 3/2020 | Fletcher | H04L 9/3255 |

FOREIGN PATENT DOCUMENTS

| | | | |
|---|---|---|---|
| WO | WO-2007102907 A2 * | 9/2007 | H04L 9/3268 |
| WO | 2017145049 A1 | 8/2017 | |
| WO | 2017190057 A1 | 11/2017 | |

OTHER PUBLICATIONS

"Kreder, Karl; "2-of-3 Blind-Key Multi-signature Security; Dated: Aug. 11, 2017; Found at: https://blog.gridplus.io/2-of-3-blind-key-multi-signature-security-965e90640b4; Retrieved: Jan. 11, 2019; pp. 1-5.

Bitcoin/bips—BIP 32; GitHub; Found at: https://github.com/bitcoin/bips/blob/master/bip-0032.mediawiki; Retrieved on: Jan. 11, 2019; pp. 1-10.

Bitcoin/bips—BIP 39; GitHub; Found at: https://github.com/bitcoin/bips/blob/master/bip-0039.mediawikii; Retrieved on: Jan. 11, 2019; pp. 1-4.

Bitcoin/bips—BIP 44; GitHub; Found at: https://github.com/bitcoin/bips/blob/master/bip-0044.mediawiki; Retrieved on: Jan. 11, 2019; pp. 1-4.

Black, Tron, et al.; "Multi-Approval System Using M of N Keys to Generate a Transaction Address"; U.S. Appl. No. 16/250,362, filed Jan. 17, 2019; pp. 112; Published: US.

Black, Tron, et al.; "Multi-Approval System Using M of N Keys to Restore a Customer Wallet"; U.S. Appl. No. 16/250,348, filed Jan. 17, 2019; pp. 114; Published: US.

K., Lukas; "The unspoked side of the blockchain. Can we live without the third party?" Hackernoon; Found at: https://hackernoon.com/the-unspoken-side-of-the-blockchain-can-we-live-without-the-third-party-2ffd0b02014c; Retrieved on Jan. 11, 2019; pp. 1-5.

Madeira, Antonio; "How to create a Multi Signature Wallet"; CryptoCompare.com; Dated: Nov. 25, 2016; Found at: https://www.cryptocompare.com/wallets/guides/how-to-create-a-multi-signature-wallet/; Retrieved on: Jan. 11, 2019; pp. 1-12.

Reddit; "List of exchanges that support/use multisig technology"; Dated Jan. 10, 2015; Found at: https://www.reddit.com/r/Bitcoin/comments/2ryrh2/list_of_exchanges_that_supportuse_multisig/; Retrieved: Jan. 11, 2019; pp. 1-11.

Weight, Joel, et al.; "Multi-Approval System Using M of N Keys to Generate a Sweeping Transaction at a Customer Device"; U.S. Appl. No. 16/250,379, filed Jan. 17, 2019; pp. 109; Published: US.

International Searching Authority, "International Search Report and Written Opinion from PCT Application No. PCT/US2019/014063, dated May 10, 2019", from Foreign Counterpart to U.S. Appl. No. 16/250,348, pp. 1-12, Published: WO.

International Searching Authority, "International Search Report and Written Opinion from PCT Application No. PCT/US2019/014064, dated May 10, 2019", from Foreign Counterpart to U.S. Appl. No. 16/250,362, pp. 1-13, Published: WO.

International Searching Authority, "International Search Report and Written Opinion from PCT Application No. PCT/US2019/014067, dated May 10, 2019", from Foreign Counterpart to U.S. Appl. No. 16/250,369, pp. 1-12, Published: WO.

International Searching Authority, "International Search Report and Written Opinion from PCT Application No. PCT/US2019/014069, dated May 9, 2019", from Foreign Counterpart to U.S. Appl. No. 16/250,379, pp. 1-10, Published: WO.

U.S. Patent and Trademark Office, "Office Action", U.S. Appl. No. 16/250,379, dated Oct. 29, 2020, pp. 1 through 28, Published: US.

U.S. Patent and Trademark Office, "Final Office Action", U.S. Appl. No. 16/250,362, dated Apr. 14, 2021, pp. 1 through 29, Published: US.

U.S. Patent and Trademark Office, "Office Action", U.S. Appl. No. 16/250,348, dated Mar. 2, 2021, pp. 1 through 36, Published: US.

(56) References Cited

OTHER PUBLICATIONS

U.S. Patent and Trademark Office, "Final Office Action", U.S. Appl. No. 16/250,379, dated May 12, 2021, pp. 1 through 34, Published: US.

U.S. Patent and Trademark Office, "Advisory Action", U.S. Appl. No. 16/250,379, dated Aug. 18, 2021, pp. 1 through 5, Published: US.

U.S. Patent and Trademark Office, "Notice of Allowance", U.S. Appl. No. 16/250,348, dated Aug. 30, 2021, pp. 1 through 24, Published: US.

European Patent Office, "Extended European Search Report from EP Application No. 19740954.3", from Foreign Counterpart to U.S. Appl. No. 16/250,369, filed Sep. 21, 2021, pp. 1 through 9, Published: EP.

Antonopoulos, "Mastering Bitcoin—Unlocking Digital Cryptocurrencies", Dec. 20, 2014, pp. 1 through 298, O'Rielly Media.

European Patent Office, "Extended European Search Report from EP Application No. 19741129.1", from Foreign Counterpart to U.S. Appl. No. 16/250,379, dated Oct. 11, 2021, pp. 1 through 9, Published: EP.

European Patent Office, "Extended European Search Report from EP Application No. 19741847.8", from Foreign Counterpart to U.S. Appl. No. 16/250,362, dated Oct. 7, 2021, pp. 1 through 10, Published: EP.

European Patent Office, "Extended European Search Report from EP Application No. 19741846.0", from Foreign Counterpart to U.S. Appl. No. 16/250,348, dated Oct. 13, 2021, pp. 1 through 8, Published: EP.

U.S. Patent and Trademark Office, "Office Action", U.S. Appl. No. 16/250,379, dated Jan. 24, 2022, pp. 1 through 30, Published: US.

Intellectual Property Office of Singapore, "Invitation to Respond to Written Opinion and the Written Opinion" from Singapore Application No. 11202006235Q, dated May 18, 2022, from Foreign Counterpart to U.S. Appl. No. 16/250,348, pp. 1 through 10, Published: SG.

Intellectual Property Office of Singapore, "Invitation to Respond to Written Opinion and the Written Opinion" from Singapore Application No. 11202006282Q, dated May 18, 2022, from Foreign counterpart to U.S. Appl. No. 16/250,348, pp. 1 through 8, Published: SG.

\* cited by examiner

MULTI-APPROVAL SYSTEM USING M OF N KEYS TO PERFORM AN ACTION AT A CUSTOMER DEVICE

CROSS-REFERENCE TO RELATED APPLICATIONS

This application claims the benefit of U.S. Provisional Patent Application Ser. No. 62/618,077 filed on Jan. 17, 2018, entitled "MULTI-SIGNATURE (MULTI-SIG) WITH THREE KEYS REQUIRING TWO OF THREE KEYS TO ACCESS CRYPTOCURRENCY WALLET AND STORING KEYS WITH USER, TRUSTED 3RD PARTY, AND EXCHANGE"; U.S. Provisional Patent Application Ser. No. 62/663,921 filed on Apr. 27, 2018, entitled "MULTI-APPROVAL CRYPTOCURRENCY SYSTEM REQUIRING M OF N KEYS TO ACCESS AND RESTORE CRYPTOCURRENCY WALLET"; U.S. Provisional Patent Application Ser. No. 62/663,922 filed on Apr. 27, 2018, entitled "MULTI-APPROVAL CRYPTOCURRENCY SYSTEM REQUIRING M OF N KEYS TO ACCESS AND RESTORE CRYPTOCURRENCY WALLET"; and U.S. Provisional Patent Application Ser. No. 62/780,779 filed on Dec. 17, 2018, entitled "MULTI-APPROVAL CRYPTOCURRENCY SYSTEM"; all of which are hereby incorporated herein by reference.

This application is related to the following co-pending United States patent applications, which are hereby incorporated herein by reference:

U.S. patent application Ser. No. 16/250,348 entitled "MULTI-APPROVAL SYSTEM USING M OF N KEYS TO RESTORE A CUSTOMER WALLET" and filed on even date herewith, which is hereby incorporated herein by reference; and U.S. patent application Ser. No. 16/250,362 entitled "MULTI-APPROVAL SYSTEM USING M OF N KEYS TO GENERATE A TRANSACTION ADDRESS" and filed on even date herewith, which is hereby incorporated herein by reference; and U.S. patent application Ser. No. 16/250,379 entitled "MULTI-APPROVAL SYSTEM USING M OF N KEYS TO GENERATE A SWEEPING TRANSACTION AT A CUSTOMER DEVICE" and filed on even date herewith, which is hereby incorporated herein by reference.

BACKGROUND

Cryptography can be used to securely store and transmit data. Keys can be used to encrypt data and decrypt encrypted data.

SUMMARY

A computing system that includes at least one processor and at least one memory communicatively coupled to the at least one processor is disclosed. The computing system also includes at least one network interface communicatively coupled to the at least one processor and configured to communicate with at least one vault system, each of the at least one vault system storing a respective one of N private keys or key components associated with a customer. The at least one processor is configured to receive, from each of at least one vault system, a respective private key or key component. The at least one processor is also configured to perform at least one action based on at least M of the N private keys or key components.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
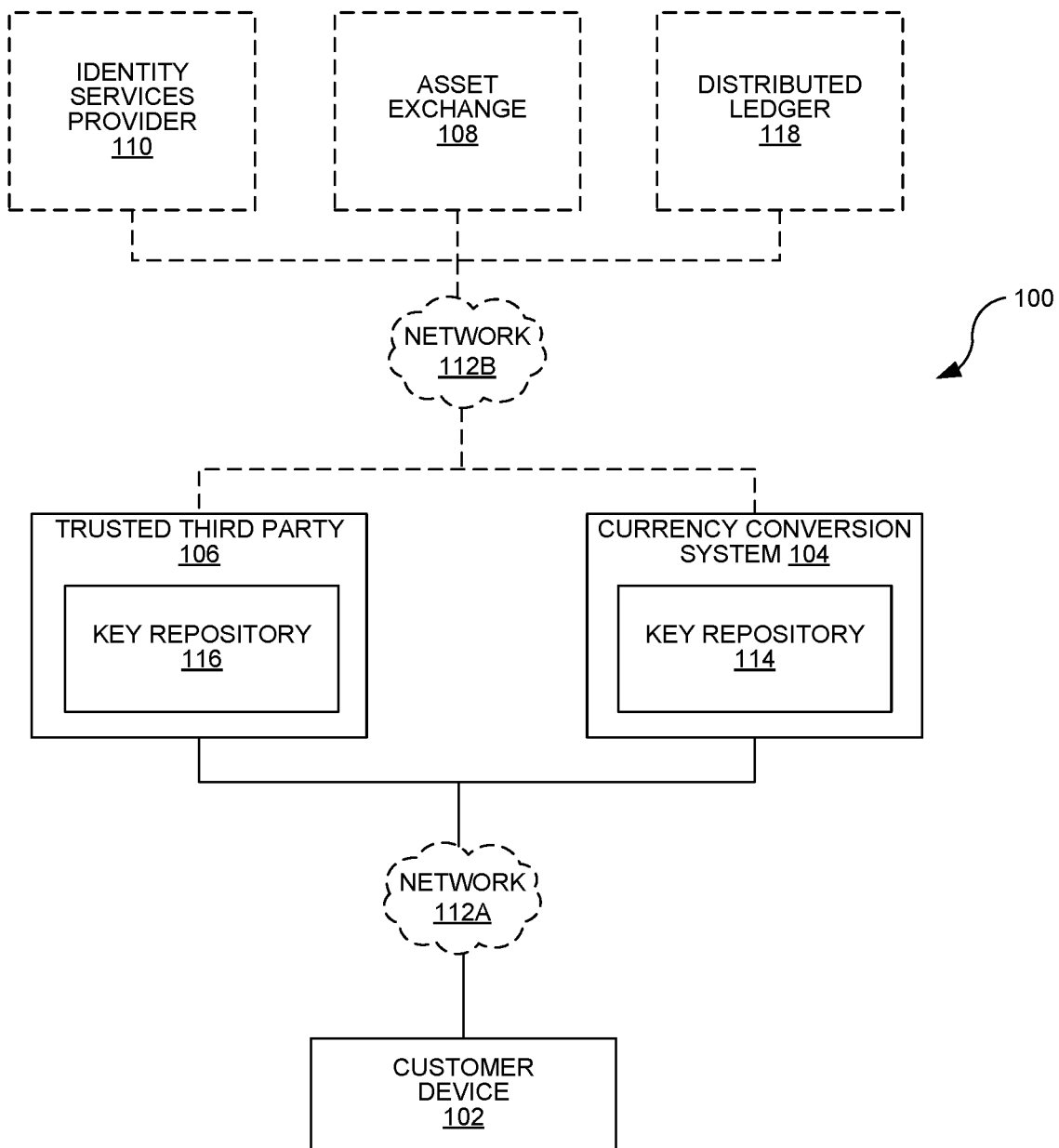
FIG. 1 is a block diagram illustrating an example system for multi-approval cryptocurrency accounts and transactions.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the methods presented in the drawing figures and the specification are not to be construed as limiting the order in which the individual steps may be performed. The following detailed description is, therefore, not to be taken in a limiting sense.

Keys, including cryptographic keys, can be used to encrypt data, decrypt data, and sign transactions. Keys can include (but are not limited to) private keys, public keys, encryption keys, signing keys, and other cryptographic keys as well as passwords and secrets. One difficulty with keys is keeping them both secure and accessible when needed. In some instances, it is not desirable to have access to a wallet limited to a single person/entity because this may leave the wallet vulnerable to malicious attacks. Instead, it may be desirable to require verification from more than one person/entity to use a wallet.

Multiple private keys can be used in a multiple signature (multi-sig) scenario where MN (e.g., 2/3) keys are required to use or recover a wallet. Distribution of keys among different devices reduces the likelihood that an unauthorized user could access a wallet. In examples, three private keys may be generated and distributed among various devices within a multi-sig system: (1) a first key held by a customer (end user); (2) a second key held by a currency conversion system (e.g., a money services business (MSB)) or exchange; and (3) a third key held by a trusted third party (such as a credit union or bank).

Instead of multi-sig, a key may be split into multiple key components (i.e., parts) where a subset of the key components can be used to reconstruct the keys, i.e., key splitting. In examples, a particular quantity of key components may be required to reconstruct a particular key. For example, a particular key may be split up into N key components, such that M of the N (e.g., 2/3) key components are required to reconstruct the particular key. In examples, the N key components can be distributed to various users, e.g., (1) a first key component held by a customer (end user); (2) a second key component held by a currency conversion system (e.g., a money services business (MSB)) or exchange; and (3) a third key component held by a trusted third party (such as a credit union or bank). In examples, the key is split into the set of key components through at least one of polynomial interpolation or Shamir secret sharing.

In examples, keys and/or key components can be electronically distributed to the devices using at least one of email, Short Message Service (SMS), Multimedia Messaging Service (MMS), instant messaging, push notification (such as a push verify notification), by polling (or pulling) a notification, or by Bluetooth, Wi-Fi, or near field communication (NFC) transmission. In examples, the keys and/or key components can be displayed on a screen and written down or otherwise physically distributed through printing (such as into a Quick Response (QR) code, barcode, etc.) or stored on USB keys/memory sticks (or other solid state drives), or optical or magnetic disks. Additionally, an index of a key or a key component within a node tree may be communicated from a first device to a second device, which can derive the key or key component from a different key already stored at the second device.

During routine operation, private keys from both the customer (end user) and currency conversion system/exchange may be required to transact from a customer wallet, e.g., to transfer cryptocurrency from a transaction address. If the user were to lose their private key (such as by losing, breaking, or upgrading their device that contained the private key), private keys of the currency conversion system/exchange and the trusted third party (such as the credit union or bank) may be used to recover the wallet. When a wallet is recovered, new private keys (or private key components) may be generated for (1) the customer (end user); (2) the currency conversion system/exchange; and (3) the trusted third party (such as a credit union or bank).

FIG. 1 is a block diagram illustrating an example system 100 for multi-approval cryptocurrency accounts and transactions. The system 100 may include a customer device 102, a currency conversion system 104, a trusted third party 106, an optional asset exchange 108, an optional identify services provider 110, and a distributed ledger 118. Additionally, the system 100 may include more than one of each device.

Each of the customer device 102, the currency conversion system 104, the trusted third party 106, the asset exchange 108 and the identity services provider 110 may be implemented as any of a mobile computing device, such as a mobile phone, tablet computer, mobile media device, mobile gaming device, laptop computer, or vehicle-based computer, etc.; or a non-mobile computing device such as a dedicated terminal, a public terminal, a kiosk, a server, a cloud server, or a desktop computer.

In examples, each of the customer device 102, the currency conversion system 104, and the trusted third party 106 may include at least one memory, at least one processor, at least one optional network interface, at least one optional display device, at least one optional input device, and at least one optional power source. Additionally, each of the customer device 102, the currency conversion system 104 and/or the trusted third party 106 may be implemented using multiple physical devices.

The system 100 may use a multi-approval methodology, e.g., multi-party multi-signature (multi-sig) methodology, a multi-party key splitting methodology, or a combination of the two. A multi-party multi-signature (multi-sig) methodology may distribute a different private key (e.g., a unique string of numbers, letters, and/or other characters) to each of the customer device 102, the currency conversion system 104, and the trusted third party 106. Using multi-sig, any requested cryptocurrency purchase or transaction from the customer must be signed using M/N (e.g., two of three) private keys, e.g., signed by the customer device 102 and the currency conversion system 104. The private keys may be generated at the customer device 102, the currency conversion system 104, the trusted third party 106, or some combination. Multi-sig methodology does not require private keys to be split.

Alternatively, the system 100 may use a multi-party key splitting methodology where a private key (e.g., a unique string of numbers, letters, and/or other characters) is split into three (or any suitable number of) key components. In examples, the key components may be generated using polynomial interpolation or Shamir secret sharing. In the multi-party key splitting methodology, a different key component may be located on each of the customer device 102, the currency conversion system 104, and the trusted third party 106. Using the multi-party key splitting methodology, any requested cryptocurrency purchases or transactions from the customer must be signed using M of the N key components (e.g., 2/3 of the key components), e.g., signed by the customer device 102 and the currency conversion system 104. The private key may be reconstructed at the customer device 102, the currency conversion system 104, or the trusted third party 106.

Any of the configurations disclosed herein using a multi-sig methodology (i.e., signing a transaction request or purchase request with M/N private keys) may alternatively use key splitting (i.e., reconstructing a private key with M/N private key components, then signing a transaction request or purchase request with the private key).

Alternatively, the system 100 may use a combination of multi-party multi-sig and key splitting methodologies where a first private key is split into two key components and different key components are located on each of the customer device 102 and the currency conversion system 104. A second private key (that is not split) may be located on the trusted third party 106. Using this combination, any requested cryptocurrency purchase or transaction from the customer must be signed using either the second private key or both key components of the first private key.

As used herein, the term "signing," or its variants, refers to adding or modifying data associated with a desired transaction using a key (or a key component), e.g., signing a transaction may include using M/N (e.g., 2/3) private keys to encrypt or otherwise transform a transaction address. Additionally, a public key may be derived from a corresponding private key (or a parent public key), and the public key may be used to derive a transaction address, monitor transactions for a transaction address, and/or view account balances (e.g., on a blockchain). However, a public key may not be used to transact from a transaction address, i.e., a public key may not be used to sign transactions. Rather, a device may transact from a transaction address using one or more private keys (or private key components).

As used herein, unless otherwise specified, the term "customer" (or "user") refers to a person (or automated instructions, e.g., a script) that accesses the customer device 102 to initiate any of the functionality described herein, e.g., creating a multi-sig account, multi-sig cryptocurrency purchases, executing multi-sig transactions using cryptocurrencies, restoring a multi-sig account, etc.

As used herein, the term "wallet" refers to a software program, digital file, and/or memory used to store and/or manage digital assets, such as cryptocurrency. Although the present systems and methods are described herein using cryptocurrency, they are also compatible with any type of digital asset. In examples, a wallet may be defined by one or more private keys, one or more public keys derived from one or more private keys, and/or one or more transaction addresses derived from one or more private keys and/or one or more public keys. In examples, a wallet may be defined by one or more private account keys (and optional corresponding public account key(s)), each of which may have one or more child and/or grandchild transaction keys.

As used herein, the term "distributed ledger" refers to an electronic ledger that is distributed across multiple interconnected nodes, where more than one of the nodes stores a copy of the ledger. In examples, the distributed ledger 118 may implement one or more blockchains to validate the data stored within the distributed ledger 118. A blockchain is a verifiable permanent ledger constructed one block at a time with a proof-of-work seal (such as a hash) affixed to each block that validates that block. In a blockchain, the hash of the previous block is included in the current block, and therefore by recursion the current hash also validates all previous blocks back to the original genesis block. Inserting a hash into a blockchain permanently records that hash and acts as a notary verifying the time stamped proof-of-existence of the hashed data at the moment in time that block is added to the chain. Any future blocks add a layer of protection from manipulation of the data stored in the chain or a chain re-organization and therefore provide additional certainty that no changes can be made to blocks earlier in the chain. A blockchain is an implementation of a distributed ledger 118, and may be public (i.e., viewable by anyone) or private. Exemplary blockchains include, but are not limited to, the bitcoin blockchain, the Ethereum blockchain, BigchainDB, Billon, Chain, Corda, Credits, Elements, Monax, Fabric, HydraChain, Hyperledger, Multichain, Openchain, Quorum, Sawtooth, and Stellar.

In examples, the customer device 102 may be a mobile device, e.g., using the Android® or iOS® operating systems. A customer may download, to the customer device 102, an application corresponding to the currency conversion system 104. The application may present a user interface on the customer device 102, and the customer may provide input using the user interface. Based at least in part on the user input, the application on the customer device 102 may send and receive instructions and/or other data to the currency conversion system 104. In examples, the application on the customer device 102 may only communicate directly with the currency conversion system 104, which communicates with other devices in the system 100, i.e., the currency conversion system 104 may be a gateway to other devices in the system 100. Alternatively, the application on the customer device 102 may communicate directly with the trusted third party 106, the currency conversion system 104, and/or other devices in the system 100.

The currency conversion system 104 may be a bank or non-bank financial institution that converts currency into other forms of currency, e.g., a money services business (MSB). In examples, the currency conversion system 104 may be implemented with one or more servers. The currency conversion system 104 may maintain a key repository 114 for storing keys (e.g., a database and/or secure memory) associated with one or more customer wallets. The key repository 114 may be physically located in the same or different device(s) that perform the other functionality of the currency conversion system 104. The currency conversion system 104 may or may not have a money transmitter license required under applicable rules and regulations.

In examples, the currency conversion system 104 may assist end-users (i.e., customers) in purchasing cryptocurrency, such as Bitcoin. Specifically, the currency conversion system 104 may enable customers to convert currency into other forms of currency, e.g., fiat currency into cryptocurrency (e.g., Bitcoin), cryptocurrency (e.g., Bitcoin) into fiat currency, one type of cryptocurrency (e.g., Bitcoin) into a different form of currency (e.g., Ethereum), etc. In examples, the currency conversion system 104 may also enable customers to transact using cryptocurrency, i.e., buy and/or sell goods and/or services in exchange for cryptocurrency. In addition to cryptocurrency, the currency conversion system 104 may enable the purchase of and/or transactions using other types of assets, e.g., at least one security, at least one bond, at least one commodity, at least one piece of real property, at least one item of personal property, at least one fund, at least one currency fund, at least one exchange traded fund, at least one mutual fund, at least one index fund, at least one bond fund, at least one commodity fund, or at least one real estate fund.

In order to enable the purchase of cryptocurrency and transactions using cryptocurrency, the currency conversion system 104 may communicate with the asset exchange 108. The asset exchange 108 may be a marketplace (and/or a business entity that operates the marketplace) in which securities, commodities, derivatives and/or other financial instruments are traded, e.g., Kraken, SFOX, Coinbase®, etc. In examples, the asset exchange 108 may serve as a marketplace for cryptocurrency, digital currency, fiat currency, and/or commodity currency. In examples, the asset exchange 108 described herein may record successfully executed transactions on a distributed ledger 118, e.g., a blockchain. Alternatively, or in addition to, the asset exchange 108 may be configured to trade at least one security, at least one bond, at least one commodity, at least one piece of real property, at least one item of personal property, at least one fund, at least one currency fund, at least one exchange traded fund, at least one mutual fund, at least one index fund, at least one bond fund, at least one commodity fund, or at least one real estate fund. The asset exchange 108 may be implemented using one or more computing devices.

The trusted third party 106 may be a financial institution. In examples, the trusted third party 106 may be implemented using one or more computing devices that are trusted that are trusted to verify transactions between two parties. In examples, the trusted third party 106 may be owned and operated by a credit union or a bank. The trusted third party 106 may receive information from the currency conversion system 104 about transactions requested by the customer device 102. Alternatively, the trusted third party 106 may receive information relating to requested transactions directly from the customer device 102. In either case, the information received at the trusted third party 106 may indicate that a pending transaction needs to be signed (e.g., authenticated) using a private key stored at the trusted third party 106. The trusted third party 106 may also communicate with the identity services provider 110, e.g., during the process of creating a customer account. The trusted third party 106 may maintain a key repository 116 for storing keys (e.g., a database and/or secure memory) associated with one or more customer wallets. The key repository 116 may be physically located in the same or different device(s) that perform the other functionality of the trusted third party 106. In examples, the key(s) (or key components) stored at the key repository 116 for the trusted third party 106 may only be used in emergencies, e.g., when the customer device 102 (and any keys stored thereon) is lost, broken, upgraded or hard reset/reformatted. In examples, the trusted third party 106 may have a money transmitter license required under applicable rules and regulations.

The identity services provider 110 may be one or more computing devices that provide anti-money laundering (AML) and/or know-your-customer (KYC) services. AML, services may include one or more steps to ensure that a potential (or current) customer is not in violation of relevant laws and regulations designed to combat money laundering, i.e., AML services seek to ensure that a potential (or current) customer is not taking steps to obscure the source of funds that were received from illegal or unethical activities. KYC services may include one or more steps to gather, review, and monitor information related to the identity and/or financial dealings of a potential (or current) customer. In examples, KYC services may include collecting basic identity data (e.g., name, contact information, etc.), verifying that the customer is who they say they are, and/or ensuring that the customer is not on any law enforcement watch lists. KYC services may also include performing a soft credit check (e.g., based on the customer's basic identity data), analyzing a customer's transactional behavior, and/or monitoring the customer's account for fraudulent behavior based on the customer's transaction behavior. AML and KYC may be required under various federal, state, and/or local laws.

Each of the devices in the system 100 may be communicatively coupled to one or more other devices using at least one network 112 (such as networks 112A-B). In examples, the at least one network 112 includes at least one wired network and/or at least one wireless network. In examples, any combination of wired and wireless networks may be used to couple the customer device 102, the currency conversion system 104, and the trusted third party 106 to each other. In examples, the at least one network 112 includes at least one of at least one local area network (LAN), at least one wide area network (WAN), or the Internet. In examples, any combination of local area networks, wide area networks, or the Internet may be used as the at least one network 112 to couple the customer device 102, the currency conversion system 104, and the trusted third party 106 to each other.

The devices in the system 100 may enable a customer to purchase cryptocurrency and transact using the cryptocurrency with the security of multi-approval. In multi-sig examples, the currency conversion system 104 and/or the trusted third party 106 may create a respective multi-sig account (for multi-sig cryptocurrency transactions) for a customer, i.e., "onboarding" a customer. In examples, one or more devices in the system 100 may also operate to make multi-sig cryptocurrency purchases and store the cryptocurrency in a customer wallet. In examples, one or more devices in the system 100 may also operate to execute multi-sig cryptocurrency transactions, e.g., purchase goods or services in exchange for cryptocurrency. In examples, one or more devices in the system 100 may also operate to restore a customer account with multiple keys, e.g., following the customer device 102 being lost, broken, upgraded or hard reset/reformatted.

In key splitting examples, the currency conversion system 104 and/or the trusted third party 106 may create a respective split key account (for cryptocurrency transactions using split key components) for a customer, i.e., "onboarding" a customer. In examples, one or more devices in the system 100 may also operate to make cryptocurrency purchases (using multiple key components) and store the cryptocurrency in a customer wallet. In examples, one or more devices in the system 100 may also operate to execute cryptocurrency transactions requiring multiple key components, e.g., purchase goods or services in exchange for cryptocurrency. In examples, one or more devices in the system 100 may also operate to restore a customer account using multiple key components, e.g., following the customer device 102 being lost, broken, upgraded or hard reset/reformatted.

Figure 2A:
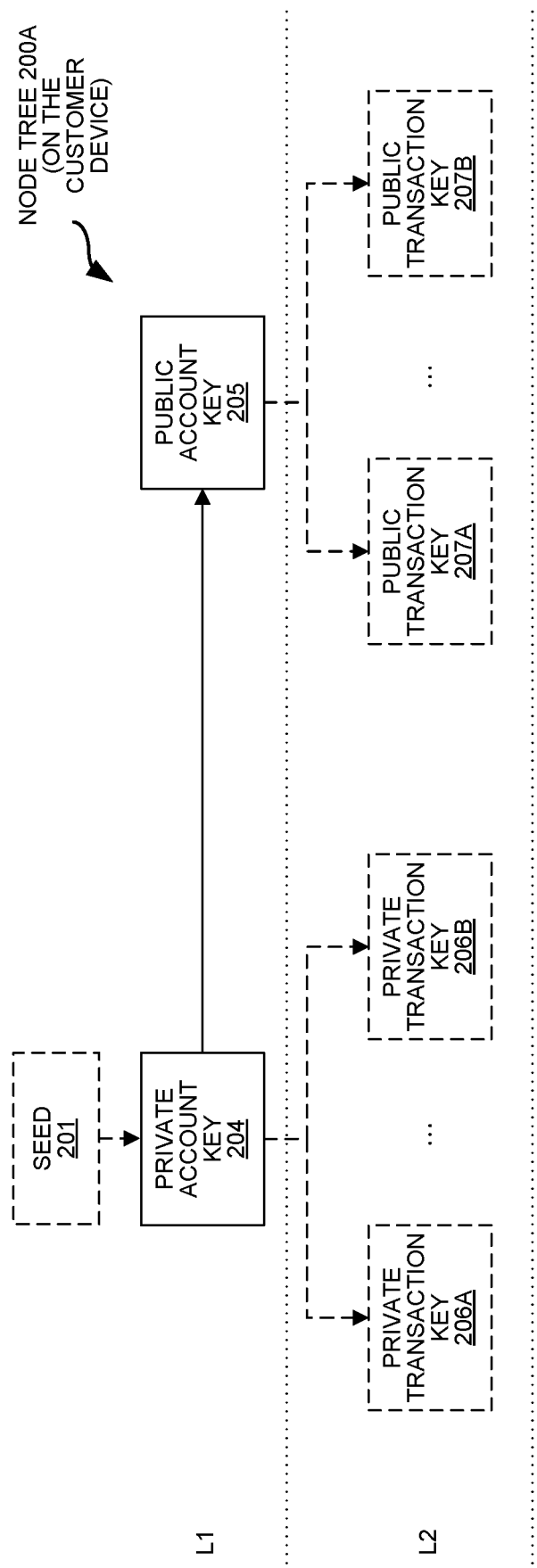
FIG. 2A is a block diagram illustrating an example node tree on the customer device for implementing a customer wallet.

FIG. 2A is a block diagram illustrating an example node tree 200A on the customer device 102 for implementing a customer wallet. In examples, the node tree 200A may implement a hierarchical deterministic (HD) wallets for a customer according to portions of Bitcoin Improvement Proposal 32 (BIP32) and/or portions of Bitcoin Improvement Proposal 44 (BIP44). BIP32 (available at https://github.com/bitcoin/bips/blob/master/bip-0032.mediawiki) and BIP44 (available at https://github.com/bitcoin/bips/blob/master/bip-0044.mediawiki) are incorporated by reference herein.

The node tree 200A may reside on the customer device 102 and may include a hierarchy of levels. Specifically, the node tree 200A may include a private account key 204 and a public account key 205 in the first level (L1). The private account key 204 may be a unique string of numbers, letters, and/or other characters that is specific to a customer. The private account key 204 may further be specific to a type of cryptocurrency, e.g., the customer device 102 may include a different private account key 204 for each type of cryptocurrency stored in a customer wallet. In examples, the customer device 102 may store a separate private account key 204 for each of Bitcoin, Ethereum, Litecoin, etc. A customer wallet may be defined by the private account key 204 and/or other private account key(s) (not shown).

Optionally, the private account key 204 may be generated at the customer device 102 based on a seed 201, e.g., a seed that is derived from a mnemonic code or sentence according to Bitcoin Improvement Proposal 39 (BIP39) (available at https://github.com/bitcoin/bips/blob/master/bip-0039.mediawiki and incorporated by reference herein). Alternatively, the private account key 204 may be generated at the customer device 102 randomly, manually, or by other means.

The private account key 204 may be used to derive a public account key 205, i.e., the private account key 204 may be determinative of the public account key 205. In examples, the customer device 102 may use a hash function to derive the public account key 205 from the private account key 204, e.g., the SHA256 function. However, the public account key 205 is typically (and preferably) not determinative of the private account key 204, e.g., the public account key 205 may not be used to generate the private account key 204.

The private account key 204 and the public account key 205 may be "extended" keys, meaning that a chain code is appended to the key string. In examples, each of the private account key 204 and the public account key 205 may be 256 bits long with an additional 256-bit chain code, i.e., the extended private account key 204 and the extended public account key 205 may each be 512 bits long. An extended key may be used to derive child keys, while a non-extended (or "hardened") key may not be used to derive child keys. Since they are extended keys, it may be preferable to avoid transmitting the private account key 204 and the public account key 205 from the customer device 102 to the currency conversion system 104 or the trusted third party 106.

The private account key 204 may have one or more optional child private transaction keys 206A-B in the second level (L2) of the node tree 200A. The private transaction key(s) 206 may be derived from the private account key 204 using a child key derivation (CKD) function, e.g., as described in BIP32. The private transaction key(s) 206 may be non-extended (i.e., hardened) keys and may not be used to derive further child keys.

Each private transaction key 206 may have an associated index, e.g., in the range of 0 to $(2^{32}-1)$. The index may be used to navigate the node tree 200A, i.e., an index may uniquely identify the location of its corresponding particular private transaction key 206. Accordingly, indices may be transmitted between devices as an efficient way to identify a private transaction key 206. In examples, a device that receives an index may generate a corresponding private transaction key 206 from its own node tree.

Similarly, the public account key 205 may have one or more optional public transaction keys 207A-B in the second level (L2) of the node tree 200A. Each public transaction key 207 may be derived from a public account key 205 using a child key derivation (CKD) function (e.g., as described in BIP32) or derived from an associated private transaction key 206, i.e., public transaction key 207A may be derived from private transaction key 206A and public transaction key 207B may be derived from private transaction key 206B. The public transaction key(s) 207 may be non-extended (i.e., hardened) keys and may not be used to derive further child keys. Accordingly, the private transaction key(s) 206 and/or the public transaction key(s) 207 may be transmitted from the customer device 102 to the currency conversion system 104 and/or the trusted third party 106 for multi-approval transactions requiring M of N keys.

Each public transaction key 207 may have an associated index, e.g., in the range of 0 to $(2^{32}-1)$. The index may be used to navigate the node tree 200A, i.e., an index may uniquely identify the location of its corresponding particular private transaction key 207. Accordingly, indices may be transmitted between devices as an efficient way to identify a public transaction key 207. In examples, a device that receives an index may generate a corresponding public transaction key 207 from its own node tree.

In examples, the node tree 200A may include many (e.g., hundreds, thousands, millions or billions) private transaction keys 206, e.g., a new private transaction key 206 may be generated for every transaction in which cryptocurrency is received into the customer wallet and/or every transaction in which less than all cryptocurrency in an existing transaction address is transferred. Additionally, the node tree 200A may include many (e.g., hundreds, thousands, millions or billions) public transaction keys 207, e.g., one corresponding to each private transaction key 206 in the node tree 200A.

While illustrated with two hierarchical levels (L1-L2), the node tree 200A may include more hierarchical levels. In examples, a change key level (not shown) may be positioned in between L1 and L2.

Figure 2B:
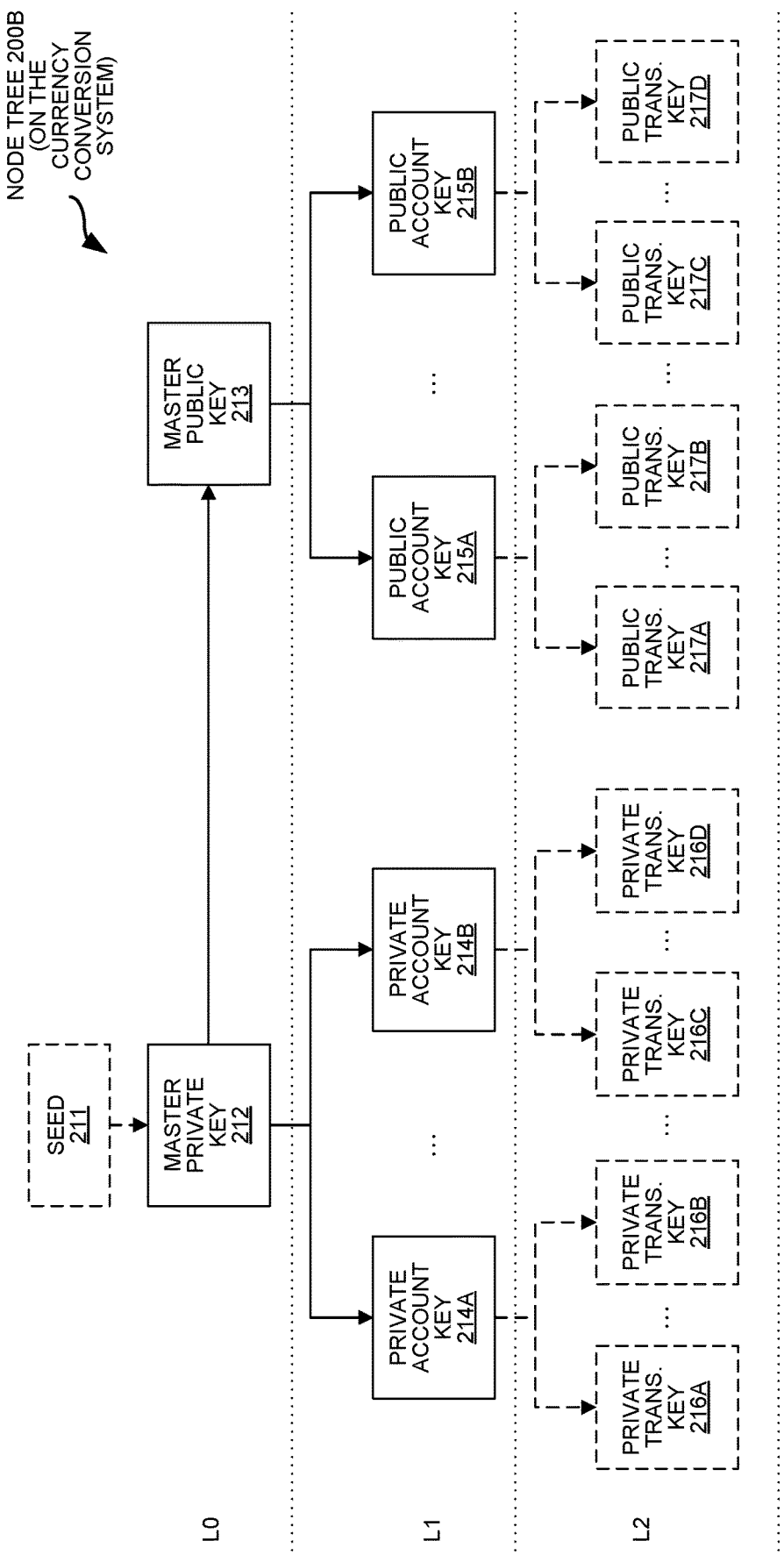
FIG. 2B is a block diagram illustrating another example node tree on the currency conversion system for implementing a customer wallet.

FIG. 2B is a block diagram illustrating another example node tree 200B on the currency conversion system 104 for implementing a customer wallet. In examples, the node tree 200B may implement one or more HD wallet(s) for one or more customers according to portions of BIP32 and/or portions of BIP44.

The node tree 200B may be stored at the currency conversion system 104 (e.g., in the key repository 114) and may include a hierarchy of levels. However, unlike the node tree 200A in the customer device 102, the node tree 200B may include a master private key 212 in the first level (L0). Specifically, the currency conversion system 104 may store a single master private key 212 that is used to derive one or more private account keys 214A-B. In other words, the master private key 212 may be the parent private key for all private account keys 214 stored at the currency conversion system 104. Optionally, the master private key 212 may be generated at the currency conversion system 104 based on a seed 211, e.g., a seed that is derived from a mnemonic code or sentence according to BIP39. Alternatively, the master private key 212 may be generated at the currency conversion system 104 randomly, manually, or by other means.

The master private key 212 may be used to derive a master public key 213, which may be a parent public key to all public account keys 215A-B on the currency conversion system 104. The master private key 212 and the master public key 213 may be extended keys. Therefore, it may be preferable to avoid transmitting the master private key 212 and the master public key 213 from the currency conversion system 104.

In examples, a first private account key 214A and a first public account key 215A may be maintained for a first customer, while a second private account key 214B and a second public account key 215B may be maintained for a second customer. Alternatively, the first private account key 214A and the first public account key 215A may be maintained for a first type of cryptocurrency held in a customer wallet, while the second private account key 214B and the second public account key 215B may be maintained for a second type of cryptocurrency held in the same customer wallet. The first type and the second type may be selected from among Bitcoin, Ethereum, Litecoin, etc.

In examples, the node tree 200B may include a private account key 214 and a public account key 215 per customer per cryptocurrency type, i.e., if 10 customers each held 3 different types of cryptocurrency at the currency conversion system 104, the node tree 200B may include 30 (i.e., 10×3) private account keys 214 and 30 public account keys 215. Since they are extended keys, it may be preferable to avoid transmitting the private account keys 214 and the public account keys 215 from the currency conversion system 104 to the customer device 102 or the trusted third party 106.

The private account keys 214A-B and public account keys 215A-B in the second level (L1) of the node tree 200B may correspond to (but are not identical to) private account keys and public account keys stored on various customer devices 102 and a trusted third party 106.

Similar to the node tree 200A on the customer device 102, the node tree 200B on the currency conversion system 104 may have one or more optional private transaction keys 216A-D, e.g., in the third level (L2) of the node tree 200B. Each private transaction key 216 may be derived from one of the private account keys 214 using a child key derivation (CKD) function, e.g., as described in BIP32.

The node tree 200B may also have one or more optional public transaction keys 217A-D in the third level (L2). Each public transaction key 217 may be derived from one of the public account keys 215 using a child key derivation (CKD) function (e.g., as described in BIP32) or derived from an associated private transaction key 216. Alternatively, each public transaction key 217 may be derived from one of the private account keys 216 or directly from one of the private account keys 214.

The private transaction keys 216 and public transaction keys 217 may be non-extended (i.e., hardened) keys and may not be used to derive further child keys. Accordingly, the private transaction keys 216 and/or public transaction keys 217 may be transmitted from the currency conversion system 104 to the customer device 102 and/or the trusted third party 106 for multi-approval transactions requiring M of N (e.g., 2/3) keys.

Each private transaction key 216 may have an associated index, e.g., in the range of 0 to $(2^{32}-1)$. The index may be used to navigate the node tree 200B, i.e., an index may uniquely identify the location of its corresponding particular private transaction key 216. Accordingly, indices may be transmitted between devices as an efficient way to identify a private transaction key 216. In examples, a device that receives an index may generate a corresponding private transaction key 216 from its own node tree.

Each public transaction key 217 may have an associated index, e.g., in the range of 0 to $(2^{32}-1)$. The index may be used to navigate the node tree 200B, i.e., an index may uniquely identify the location of its corresponding particular private transaction key 217. Accordingly, indices may be transmitted between devices as an efficient way to identify a public transaction key 217. In examples, a device that receives an index may generate a corresponding public transaction key 217 from its own node tree.

In examples, the node tree 200B may include many (e.g., hundreds, thousands, millions or billions) private transaction keys 216, e.g., a new private transaction key 216 may be generated for every transaction in which cryptocurrency is received into the customer wallet and/or every transaction in which less than all cryptocurrency in an existing transaction address is transferred. Additionally, the node tree 200B may include many (e.g., hundreds, thousands, millions or billions) public transaction keys 217, e.g., one corresponding to each private transaction key 2016 in the node tree 200B.

While illustrated with three hierarchical levels (L0-L2), the node tree 200B may include more hierarchical levels. In examples, a change key level (not shown) may be positioned in between L1 and L2.

Figure 2C:
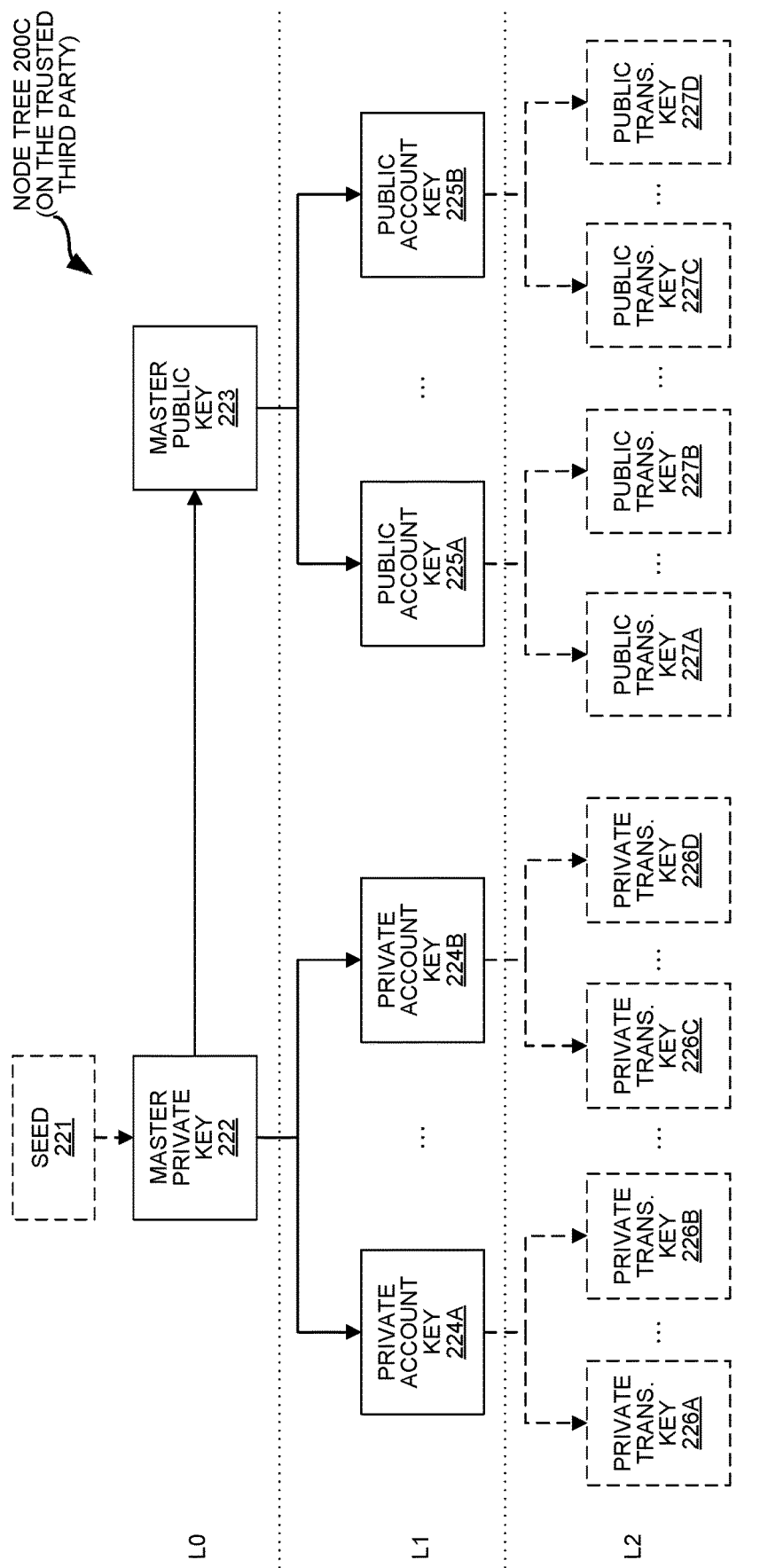
FIG. 2C is a block diagram illustrating another example node tree on the trusted third party for implementing a customer wallet.

FIG. 2C is a block diagram illustrating another example node tree 200C on the trusted third party 106 for implementing a customer wallet. In examples, the node tree 200C may implement one or more HD wallet(s) for one or more customers according to portions of BIP32 and/or portions of BIP44.

The node tree 200C may be stored at the trusted third party 106 (e.g., in the key repository 116) and may include a hierarchy of levels. The node tree 200C may include a single master private key 222 associated with the currency conversion system 104 in the first level (L0), which may be used to derive one or more private account keys 224A-B for accounts associated with the currency conversion system 104. In other words, the master private key 222 may be the parent private key for all private account keys 224 on the trusted third party 106 that are associated with the currency conversion system 104, even though the trusted third party 106 may include other master private key(s) (not shown) that are not associated with the currency conversion system 104. The master private key 222 may have a different value than the master private key 212 in the node tree 200B of the currency conversion system 104. Optionally, the master private key 222 may be generated at the trusted third party 106 based on a seed 221, e.g., a seed that is derived from a mnemonic code or sentence according to BIP39. Alternatively, the master private key 222 may be generated at the trusted third party 106 randomly or by other means.

The master private key 222 may be used to derive a master public key 223, which may be a parent public key to all public account keys 225A-B on the trusted third party 106. The master private key 222 and the master public key 223 may be extended keys. Even though the master public key 223 is an extended key, it may be transmitted from the trusted third party 106 to the currency conversion system 104. The master public key 223 may be shared with the currency conversion system 104 by secure and/or non-electronic means without transmitting the master public key 223 over a network, such as the Internet. In examples, the master public key 223 may be copied to secure portable memory (e.g., a portable hard drive), which is physically moved to and downloaded at the currency conversion system 104. Alternatively, the master public key 223 may be manually transcribed by hand (or otherwise printed) onto a hard copy, transported to the currency conversion system 104, and manually entered at the currency conversion system 104. Alternatively, the master public key 223 may be encrypted and transmitted via a network (e.g., the Internet) to the currency conversion system 104.

In examples, a first private account key 224A and a first public account key 225A may be maintained for a first customer, and a second private account key 224B and a second public account key 225B may be maintained for a second customer. Alternatively, the first private account key 224A and the first public account key 225A may be maintained for a first type of cryptocurrency held in a customer wallet, while the second private account key 224B and the second public account key 225B may be maintained for a second type of cryptocurrency held in the customer wallet, etc., e.g., the first type and the second type may be selected from among Bitcoin, Ethereum, Litecoin, etc. In examples, the node tree 200C may include a private account key 224 and a public account key 225 per customer per cryptocurrency type, i.e., if 10 customers each held 3 different types of cryptocurrency at the trusted third party 106, the node tree 200C may include 30 (i.e., 10×3) private account keys 224 and 30 public account keys 225. Since they are extended keys, it may be preferable to avoid transmitting the private account key 224 and the public account key 225 from the trusted third party 106 to the customer device 102 or the currency conversion system 104.

The private account keys 224A-B and public account keys 225A-B in the second level (L1) of the node tree 200C may correspond to (but are not identical to) the private account key 204 and the public account key 205 in the node tree 200A on the customer device 102 and the private account keys 214A-B and the public account keys 215A-B in the node tree 200B on the currency conversion system 104. The public account key 205 on the customer device 102, the first public account key 215A on the currency conversion system 104, and the first public account key 225A on the trusted third party 106 may correspond to (but are not identical to) each other. In examples, all three public account keys 205, 215A, 225A may be required to create a multi-approval transaction address. Similarly, the private account key 204 on the customer device 102, the first private account key 214A on the currency conversion system 104, and the first private account key 224A on the trusted third party 106 may correspond to (but are not identical to) each other. In examples, at least two of the private account keys 204, 214A, 224A may be required to transact from the multi-approval transaction address.

Similar to the node tree 200A in the customer device 102 and the node tree 200B in the currency conversion system 104, the node tree 200C in the trusted third party 106 may have one or more optional private transaction keys 226A-D, e.g., in the third level (L2) of the node tree 200C. Each private transaction key 226 may be derived from one of the private account keys 224 using a child key derivation (CKD) function, e.g., as described in BIP32.

The node tree 200C may have one or more optional public transaction keys 227A-D in the third level (L2). Each public transaction key 227 may be derived from one of the public account keys 225 using a child key derivation (CKD) function (e.g., as described in BIP32) or an associated private transaction key 226. Alternatively, each public transaction key 227 may be derived from one of the private account keys 226 or directly from one of the private account keys 224.

The private transaction keys 226 and public transaction keys 227 may be non-extended (i.e., hardened) keys and may not be used to derive further child keys. Accordingly, the private transaction key 226 and/or public transaction keys 227 may be transmitted from the trusted third party 106 to the customer device 102 and/or the currency conversion system 104 for multi-approval transactions requiring M of N keys.

Each private transaction key 226 may have an associated index, e.g., in the range of 0 to $(2^{32}-1)$. The index may be used to navigate the node tree 200C, i.e., an index may uniquely identify the location of its corresponding particular private transaction key 226. Accordingly, indices may be transmitted between devices as an efficient way to identify a private transaction key 226. In examples, a device that receives an index may generate a corresponding private transaction key 226 from its own node tree. Additionally, a particular private transaction key 226 in the node tree 200C may correspond to (and have an identical index to) a particular private transaction key 206 in the node tree 200A on the customer device 102 and a particular private transaction key 226 in the node tree 200B on the currency conversion system 104, e.g., the private transaction key 206A, the private transaction key 216A, and the private transaction key 226A may correspond to each other and have identical indices.

Each public transaction key 227 may have an associated index, e.g., in the range of 0 to $(2^{32}-1)$. The index may be used to navigate the node tree 200C, i.e., an index may uniquely identify the location of its corresponding particular private transaction key 227. Accordingly, indices may be transmitted between devices as an efficient way to identify a public transaction key 227. In examples, a device that receives an index may generate a corresponding public transaction key 227 from its own node tree. Additionally, a particular public transaction key 227 in the node tree 200C may correspond to (and have an identical index to) a particular public transaction key 207 in the node tree 200A on the customer device 102 and a particular public transaction key 227 in the node tree 200B on the currency conversion system 104, e.g., the public transaction key 207A, the public transaction key 217A, and the public transaction key 227A may correspond to each other and have identical indices.

In examples, the node tree 200C may include many (e.g., hundreds, thousands, millions or billions) private transaction keys 226, e.g., a new private transaction key 226 may be generated for every transaction in which cryptocurrency is received into the customer wallet and/or every transaction in which less than all cryptocurrency in an existing transaction address is transferred. Additionally, the node tree 200B may include many (e.g., hundreds, thousands, millions or billions) public transaction keys 227, e.g., one corresponding to each private transaction key 226 in the node tree 200B.

While illustrated with three hierarchical levels (L0-L2), the node tree 200C may include more hierarchical levels. In examples, a change key level (not shown) may be positioned in between L1 and L2.

Figure 3:
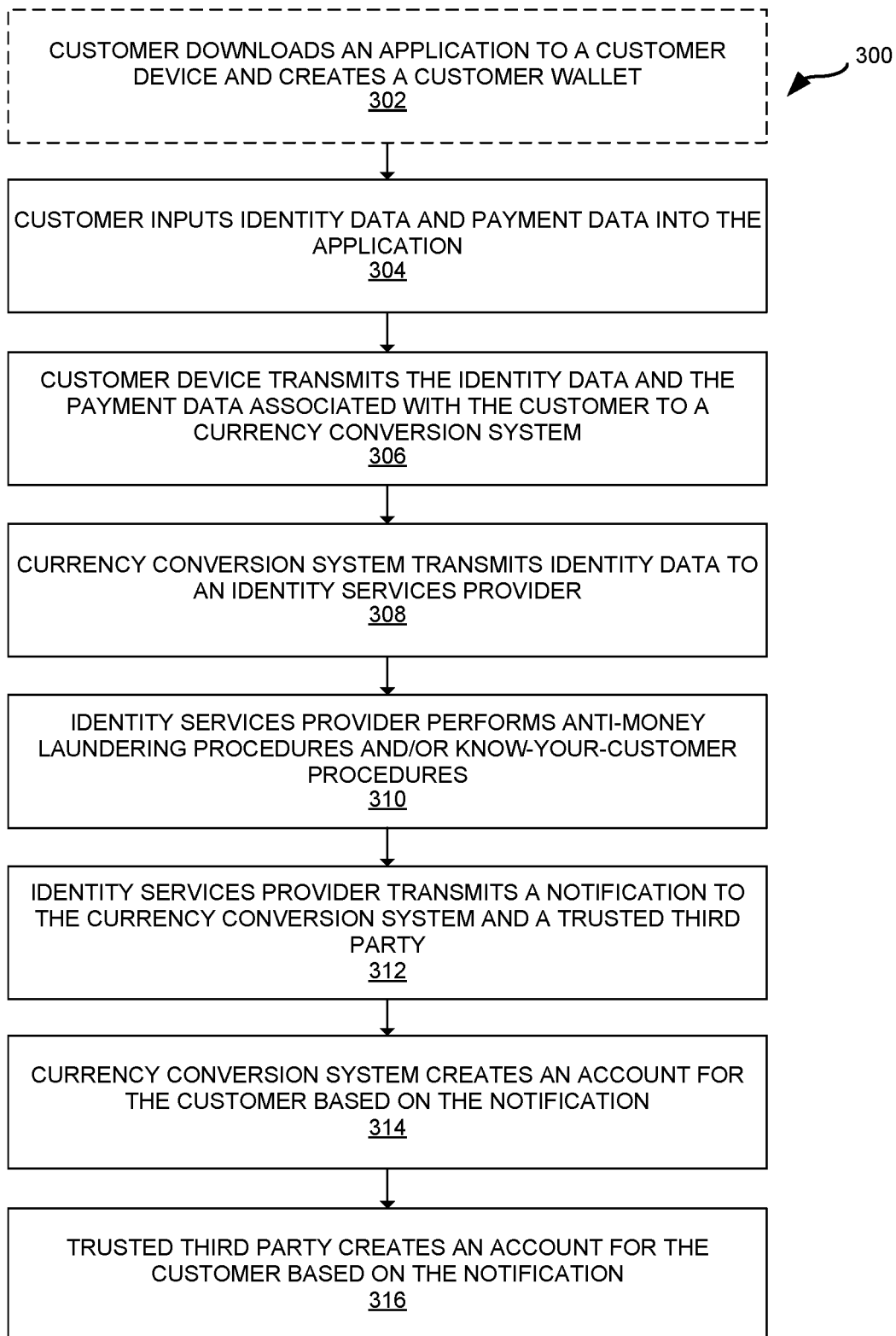
FIG. 3 is a flow diagram illustrating an example method for onboarding a customer in a multi-approval system.

FIG. 3 is a flow diagram illustrating an example method 300 for onboarding a customer in a multi-sig system. The method 300 may be performed by the customer device 102, the currency conversion system 104, the trusted third party 106, and the identity services provider 110 in the system 100 illustrated in FIG. 1.

A customer may optionally download 302 an application to the customer device 102 (e.g., from an app store) and create (or modify) a customer wallet. Alternatively, the application may be previously downloaded and installed to the customer device 102 during manufacture. The application may be created by the currency conversion system 104, e.g., a money services business (MSB). The application may interface with a customer (e.g., using a user interface) and communicate with the currency conversion system 104. Creating (or modifying) a customer wallet may include generating a first (or subsequent) private account key 204 at the customer device 102, e.g., based on a seed 201, randomly, or manually. Alternatively, creating a customer wallet may include the customer entering an existing private account key 204 into the application, e.g., the customer may manually transcribe or copy and paste the existing private account key 204 into the application.

The customer may also input 304 identity data and payment data into the application. Identity data may include a customer's name, date of birth, driver's license number and expiration date, address, phone number(s), email address(es), social security number, image of customer's government issued photo identification, photo of the customer holding the government issued photo identification, employment information, and/or income. The identity data may also include biometric data, such as fingerprint data (e.g., scan(s) of the customer's fingerprint(s)), retinal scan data (e.g., image(s) of the customer's retina(s)), facial recognition data (e.g., image(s) of the customer's face), and/or voice data (e.g., recording(s) of the customer's voice). Instead of raw biometric data (e.g., images and/or recordings), the application may transmit only processed data derived from the raw biometric data, e.g., image features, voice features, etc.

Payment data may include bank account information, credit card information, contactless payment data (e.g., Apple Pay® or Android Pay® user name and passwords), existing cryptocurrency wallet key, and/or other payment processing information (e.g., user name and password for PayPal® or WhatsApp®). The customer device 102 may transmit 306 the identity data and the payment data associated with the customer to the currency conversion system 104, e.g., using a secure transfer protocol.

The currency conversion system 104 may transmit 308 the identity data to the identity services provider 110. The identity services provider 110 may perform 310 anti-money laundering (AML) and/or know-your-customer (KYC) procedures using the transmitted identity data for the customer. AML may seek to ensure that the customer is not laundering money, i.e., that the customer is not taking steps to obscure the source of funds that were received from illegal or unethical activities. KYC may seek to verify that the customer is who they say they are, and ensure that the customer is not on any law enforcement watch lists. KYC may also assess credit worthiness (e.g., with a soft credit check), analyze the customer's transactional behavior, and/or monitor the customer's account for fraudulent behavior based on the customer's transaction behavior. When the AML and/or KYC procedures are complete, the identity services provider 110 may transmit 312 a notification to the currency conversion system 104 and the trusted third party 106. The notification may indicate the success or failure of the AML and/or KYC procedures for the customer. In examples, the identity services provider 110 may transmit a report indicating all AML and KYC checks that it performed.

When the notification indicates that all (or all required) AML and KYC checks passed, the currency conversion system 104 may create 314 an account for the customer based on the notification. Creating an account may include generating a private account key 214 at the currency conversion system 104 for the customer. The currency conversion system 104 may derive a private account key 214 for the customer from a master private key 212 at a new index, e.g., using a child key derivation (CKD) function according to BIP32.

When the notification from the identity services provider 110 indicates that all (or all required) AML and KYC checks passed, the trusted third party 106 may also create 316 an account for the customer based on the notification. Creating an account may include generating a private account key 224 at the trusted third party 106 for the customer. The trusted third party 106 may derive a private account key 224 for the customer from a master private key 222 at a new index, e.g., using a child key derivation (CKD) function according to BIP32.

When the notification indicates that all (or all necessary) AML, and KYC checks were not passed, the currency conversion system 104 may notify the customer (via the application) that the AML and/or KYC failed. Alternatively, when the notification indicates that the AML and/or KYC could not be completed with the identity data, the currency conversion system 104 may request more information from the customer.

Figure 4:
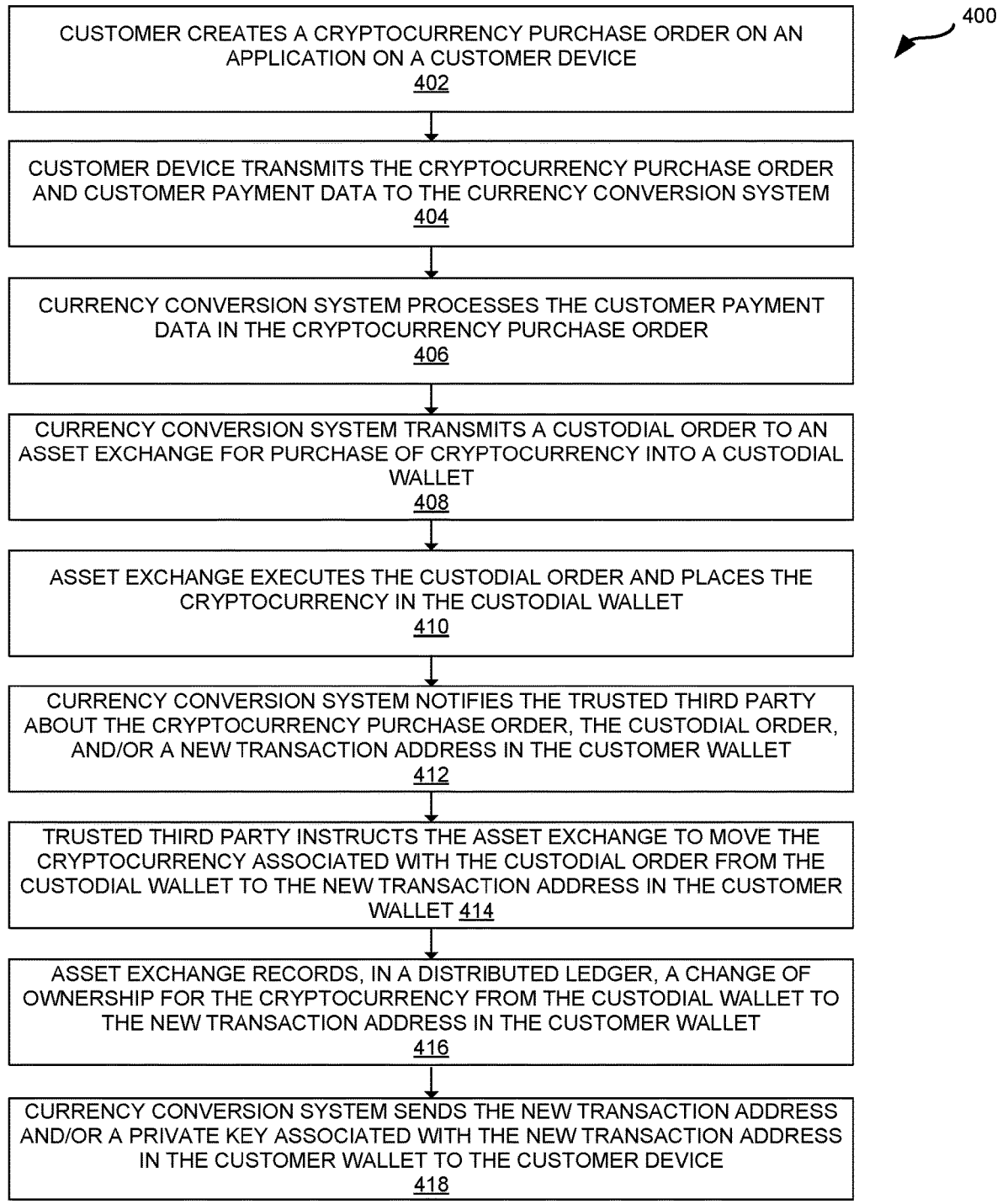
FIG. 4 is a flow diagram illustrating an example method for purchasing cryptocurrency in a multi-approval system.

FIG. 4 is a flow diagram illustrating an example method 400 for purchasing cryptocurrency in a multi-sig system. The method 400 may be performed by the customer device 102, the currency conversion system 104, the trusted third party 106, and the asset exchange 108 in the system 100 illustrated in FIG. 1.

A customer may create 402 a cryptocurrency purchase order on an application on the customer device 102. The cryptocurrency purchase order may indicate a type of cryptocurrency (e.g., Bitcoin, Ethereum, etc.) and a desired quantity (in terms of amount of cryptocurrency or fiat currency, such as U.S. Dollars). The cryptocurrency purchase order may also indicate optional attributes, such as a limit price, stop price, conditional triggering requirements, duration of the order, whether the order may be partially filled, etc. The customer may be required to provide biometric input and/or a password to the customer device 102 during creation of the cryptocurrency purchase order.

Optionally, the customer device 102 may sign the cryptocurrency purchase order using a private key stored at the customer device 102, e.g., the cryptocurrency purchase order may optionally be encrypted using the private key (or a public key derived from the private key) stored at the customer device 102. The cryptocurrency purchase order may also include a public address (for a customer wallet) that is derived from the public key or the private key stored at the customer device 102.

The customer device 102 may transmit 404 the cryptocurrency purchase order and customer payment data to the currency conversion system 104. The customer payment data may include payment data that is not previously stored at the currency conversion system 104 or an indication to use payment data that is previously stored at the currency conversion system 104. Optionally, the customer device 102 may transmit identity data for the customer, e.g., biometric data.

In response to the cryptocurrency purchase order, the currency conversion system 104 may process 406 the customer payment data, optionally confirm the identity data, and transmit 408 a custodial order to the asset exchange 108 for purchase of cryptocurrency into a custodial wallet. The currency conversion system 104 may transmit custodial payment data with the custodial order. The custodial payment data may indicate that funds should be withdrawn from a custodial account at the asset exchange 108. Optionally, the currency conversion system 104 may sign the custodial order using a private key stored at the currency conversion system 104, e.g., the custodial order may optionally be encrypted using the private key (or a public key derived from the private key) stored at the currency conversion system 104. The custodial order may also include a public address (for a custodial wallet) that is derived from the public key or the private key stored at the currency conversion system 104. The custodial wallet may be titled to the currency conversion system 104, e.g., a money services business (MSB). Upon receipt, the asset exchange 108 may execute 410 the custodial order and place the cryptocurrency in the custodial wallet.

At or near the same time that the custodial order is transmitted, the currency conversion system 104 may also notify 412 the trusted third party 106 about the cryptocurrency purchase order, the custodial order, and/or a new transaction address in the customer wallet. The currency conversion system 104 may generate the new transaction address for the customer wallet. This may include using N public transaction keys (e.g., 207A, 217A, 227A) as input into a multi-approval hashing function (along with a multi-approval condition input) to generate a transaction address for the customer wallet.

The trusted third party 106 may act as a trusted party to authorize certain types of transactions at the asset exchange 108. This may make the system 100 less vulnerable to malicious attack since the keys for authorizing transactions are decentralized. Additionally, the trusted third party 106 may possess a money transmitting license while the currency conversion system 104 may not. The trusted third party 106 may instruct 416 the asset exchange 108 to transfer the cryptocurrency associated with the custodial order from the custodial wallet to the new transaction address in the customer wallet. Upon receiving instructions from the trusted third party 106, the asset exchange may record 416, in a distributed ledger 118 (e.g., a blockchain), a change of ownership for the cryptocurrency from the custodial wallet to the new transaction address in the customer wallet.

The currency conversion system 104 may send 418 the new transaction address and/or a private key associated with the new transaction address in the customer wallet to the customer device 102. The customer device 102 may then transact from the new transaction address only if it possesses M of N (based on a multi-approval condition input, e.g., 2/3) private transaction keys associated with the N public transaction keys, e.g., 206A, 216A, 226A. In examples, the currency conversion system 104 may wait to send the new transaction address and/or the private key associated with the new transaction address to the customer device 102 until the customer payment is finalized, e.g., 1-2 days for credit card payments, 3-5 days for electronic funds transfer, etc.

Figure 5:
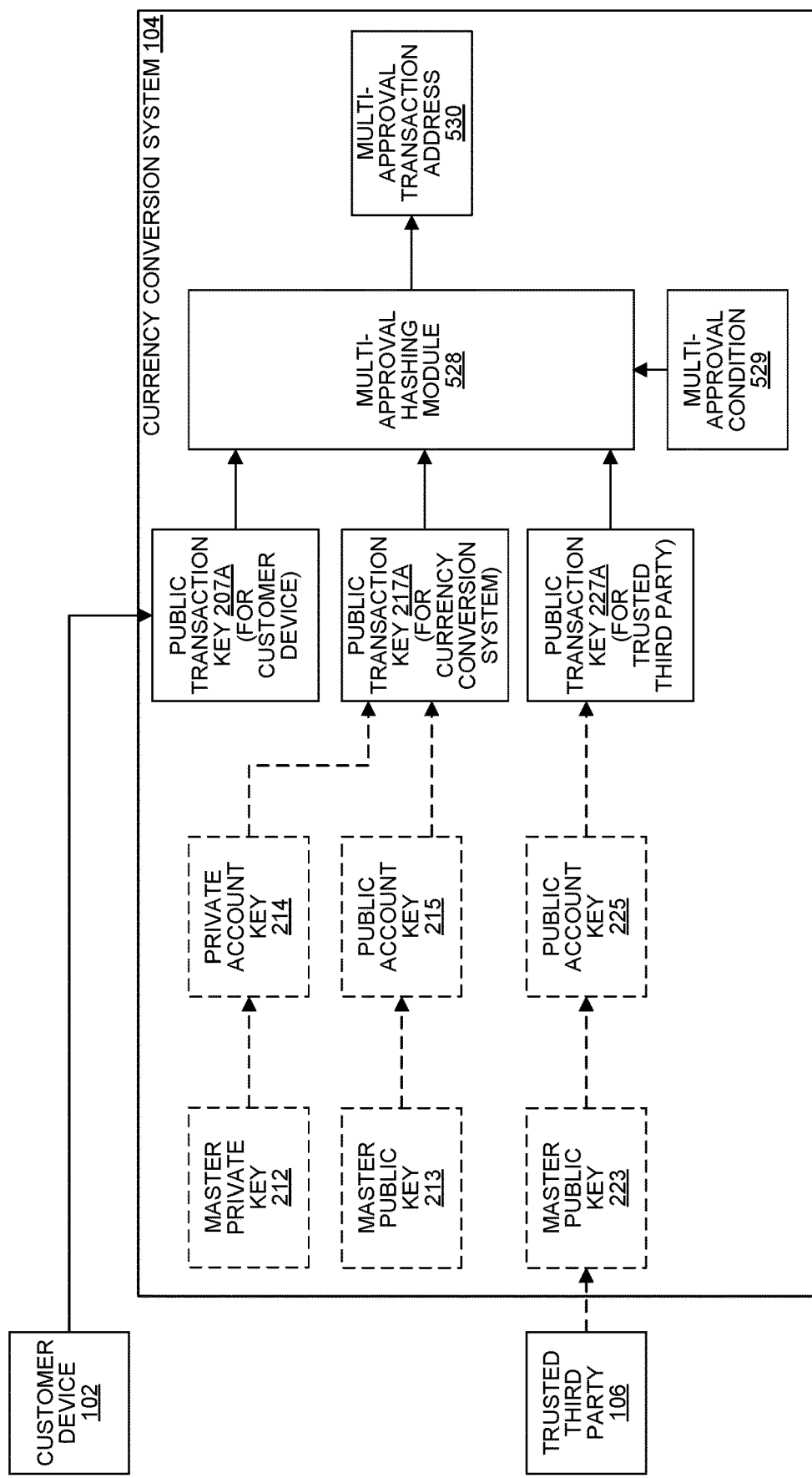
FIG. 5 is a block diagram illustrating an example currency conversion system for generating a multi-approval transaction address.

FIG. 5 is a block diagram illustrating an example currency conversion system 104 for generating a multi-approval transaction address 530. In order to generate the multi-approval transaction address 530, the currency conversion system 104 may require N (e.g., three) public transaction keys 207A, 217A, 227A.

The currency conversion system 104 may receive a public transaction key 207A from the customer device 102. The public transaction key 207A may be used to derive a transaction addresses, monitor transactions for a transaction address, and/or view account balances (e.g., on a blockchain), however, the public transaction key 207A may not be used to transact from an account. Furthermore, since the public transaction key 207A is hardened (i.e., non-extended), it may not be used to derive child keys. Accordingly, there is relatively low risk for the customer device 102 to share the public transaction key 207A with the currency conversion system 104.

The currency conversion system 104 may also derive a public transaction key 217 from the node tree 200B stored on the currency conversion system 104. In examples, the currency conversion system 104 may derive the public transaction key 217 from a public account key 215, which is derived from a master public key 213, which is optionally derived from a master private key 212. Alternatively, the currency conversion system 104 may derive the public transaction key 217 from a private account key 214, which is derived from the master private key 212. Alternatively, the currency conversion system 104 may derive the public transaction key 217 from the public account key 215, which is derived from the private account key 214, which is derived from the master private key 212. In any case, the public transaction key 217 may be derived from the node tree 200B stored on the currency conversion system 104.

The currency conversion system 104 may also derive a public transaction key 227 from a master public key 223 received from the trusted third party 106. Again, since the master public key 223 is "public," it may not be used to transact or derive private keys that can be used to transact. However, the master public key 223 may be used to derive public account keys 225 for many different customers, and therefore, may be transferred securely from the trusted third party 106 to the currency conversion system. Specifically, the master public key 223 from the trusted third party 106 may be shared with the currency conversion system 104 by secure and/or non-electronic means without transmitting the master public key 223 over a network, such as the Internet. In examples, the master public key 223 may be copied to secure portable memory (e.g., a portable hard drive), which is physically moved to and downloaded at the currency conversion system 104. Alternatively, the master public key 223 may be manually transcribed by hand (or otherwise printed) onto a hard copy, transported to the currency conversion system 104, and manually entered at the currency conversion system 104. Alternatively, the master public key 223 may be encrypted and transmitted via a network (e.g., the Internet) to the currency conversion system 104.

Once it is stored on the currency conversion system 104, a public account key 225 may be derived from the master public key 223. The currency conversion system 104 may then derive the public transaction key 227A from the public account key 225.

The currency conversion system 104 may then input the three public transaction keys 207A, 217A, 227A into a multi-approval hashing module 528, along with a multi-approval condition 529, to produce the multi-approval transaction address 530. The multi-approval hashing module 528 may use a hashing algorithm to generate the multi-approval transaction address 530, e.g., pay-to-script-hash (P2SH), as defined in BIP16, or other pubkey script. It should be noted that the resulting multi-approval transaction address 530 is different than a typical transaction address because it requires M private keys (as specified by the multi-approval condition 529) associated with the N input public keys to transact from the multi-approval transaction address 530. In examples, the multi-approval condition 529 specifies that two private keys (e.g., two of the private transaction keys 206A, 216A, 226A) associated with the three public transaction keys 207A, 217A, 227A are required in order to transact from the multi-approval transaction address 530.

The currency conversion system 104 may transmit the multi-approval transaction address 530 to the customer device 102. Thereafter, the customer device 102 may transact from the multi-approval transaction address 530 using the appropriate number of private transaction keys. In examples, the private transaction key 206A stored at the customer device 102 and the private transaction key 216A stored at the currency conversion system 104 (and transferred to the customer device 102) may preferably be used to transact from the multi-approval transaction address 530. The private transaction key 226A at the trusted third party 106 (along with the private transaction key 216A for the currency conversion system 104) may be used to restore the customer wallet if the customer device 102 is lost, broken, upgraded or hard reset/reformatted.

Figure 6:
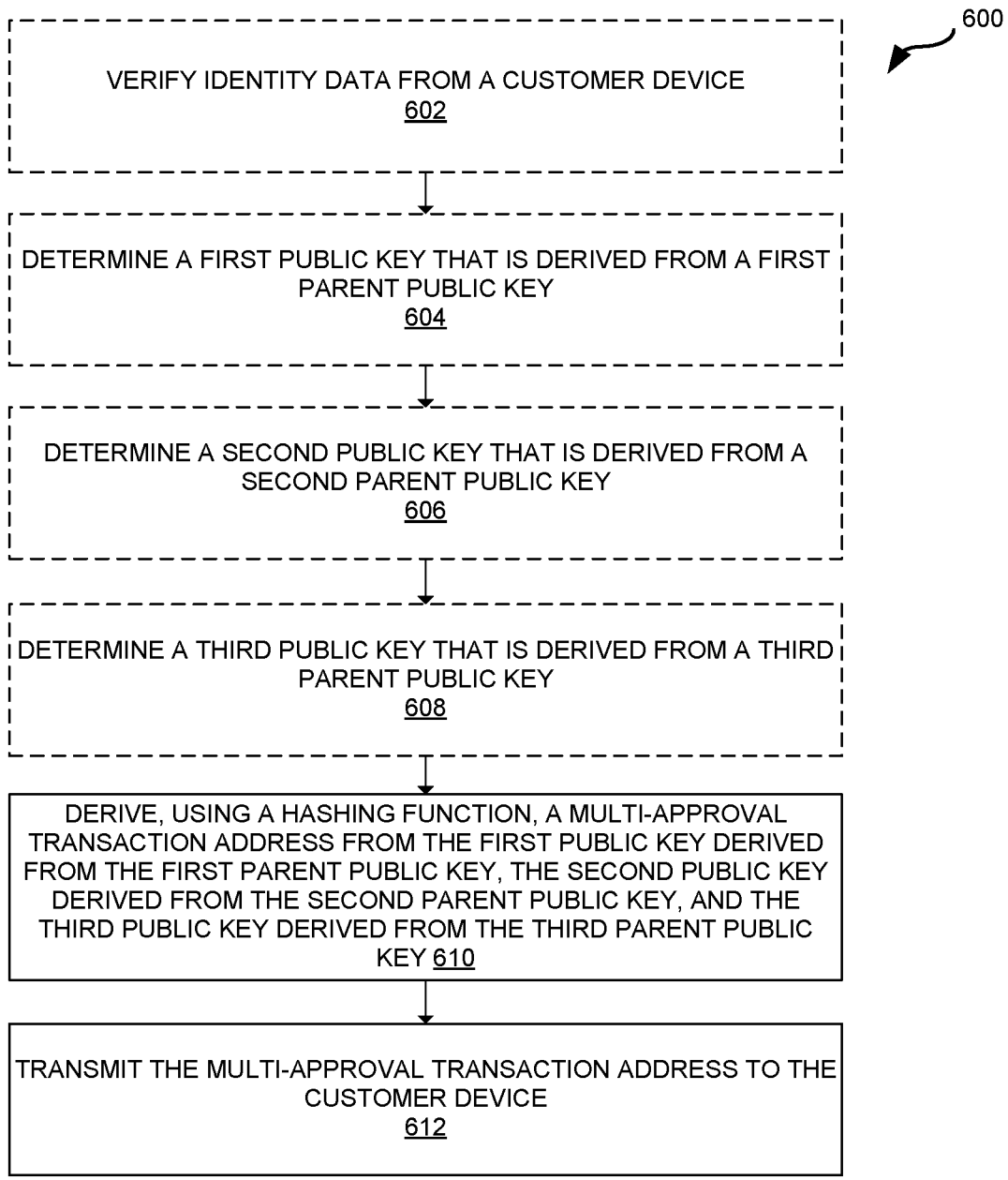
FIG. 6 is a flow diagram illustrating a method for generating a multi-approval transaction address.

FIG. 6 is a flow diagram illustrating a method 600 for generating a multi-approval transaction address 530. The method 600 may be performed by a currency conversion system 104. The method 600 may be performed any time a new transaction address is needed in the customer wallet. In examples, method 600 may be performed in response to a customer request to generate a multi-approval transaction address 530, to create a multi-approval transaction address 530 to store newly purchased cryptocurrency, or during a cryptocurrency transaction, e.g., to create a new multi-approval transaction address 530 to store remaining cryptocurrency following the transaction.

Optionally, the currency conversion system 104 may verify 602 identity data from a customer device 102. In examples, the identity data may include a customer's name, date of birth, driver's license number and expiration date, address, phone number(s), email address(es), social security number, image of customer's government issued photo identification, photo of the customer holding the government issued photo identification, employment information, and/or income. The identity data may also include biometric data, such as fingerprint data (e.g., scan(s) of the customer's fingerprint(s)), retinal scan data (e.g., image(s) of the customer's retina), facial recognition data (e.g., image(s) of the customer's face), and/or voice data (e.g., recording(s) of the customer's voice). Instead of raw biometric data (e.g., images and/or recordings), the identity data may include processed data derived from the raw biometric data, e.g., image features, voice features, etc.

The currency conversion system 104 may verify the identity data for the customer received from the customer device 102 by comparing received biometric data with previously stored biometric data, e.g., biometric data that was stored when the customer initially created their account with the currency conversion system 104.

Optionally, the currency conversion system 104 may determine 604 a first public key that is derived from a first parent public key. In examples, the currency conversion system 104 may receive a public transaction key 207A from the customer device 102, which has already derived the public transaction key 207A from a public account key 205 and/or a private account key 204. In other words, the first public key may be the public transaction key 207A from the node tree 200A stored on the customer device 102, and the first parent public key may be the public account key 205 or the private account key 204.

Optionally, the currency conversion system 104 may also determine 606 a second public key (e.g., a public transaction key 217 in the node tree 200B stored on the currency conversion system 104) that is derived from a second parent public key. In examples, the currency conversion system 104 may derive the public transaction key 217 from the node tree 200B stored on the currency conversion system 104. In examples, the public transaction key 217 is derived from a public account key 215, which is derived from a master public key 213, which is optionally derived from a master private key 212. Alternatively, the public transaction key 217 may be derived from a private account key 214, which is derived from the master private key 212. Alternatively, the public transaction key 217 may be derived from the public account key 215, which is derived from the private account key 214, which is derived from the master private key 212. Therefore, the second parent public key may be a public account key 215, a master public key 213, a master private key 212 or a private account key 214 in the node tree 200B stored on the currency conversion system 104.

Optionally, the currency conversion system 104 may also determine 608 a third public key that is derived from a third parent public key. In examples, the currency conversion system 104 may derive the public transaction key 227 from a public account key 225, which was optionally derived from the master public key 223 that was previously received from the trusted third party 106. Alternatively, the currency conversion system 104 may derive a public transaction key 227 from a master public key 223 that was previously received from the trusted third party 106. In other words, the third public key may be the public transaction key 227, and the third master key may be the master public key 223 or the public account key 225, respectively.

The currency conversion system 104 may also derive 610, using a hashing function (e.g., pay-to-script-hash (P2SH), as defined in BIP16, or other pubkey script), a multi-approval transaction address 530 from the first public key derived from a first parent public key, the second public key derived from a second parent public key, and the third public key derived from a third parent public key using a hashing function. The multi-approval transaction address 530 may require private keys, associated with the at least M (e.g., two) of first public key, the second public key, and the third public key, to transact from the multi-approval transaction address 530.

The currency conversion system 104 may transmit 612 the multi-approval transaction address 530 and/or a private transaction key 226 associated with the second public key 227 to the customer device 102. Thereafter, the customer device 102 may transact from the multi-approval transaction address 530 using private transaction keys associated with at least two of public transaction keys 207A, 217A, 227A. In examples, the private transaction key 206A stored at the customer device 102 and the private transaction key 216A stored at the currency conversion system 104 may typically be used to transact from the multi-approval transaction address 530. Alternatively, the private transaction key 216A stored at the currency conversion system 104 and the private transaction key 226A stored at the trusted third party 106 may be used to transact from the multi-approval transaction address 530 during restoration of the customer wallet.

Figure 7A:
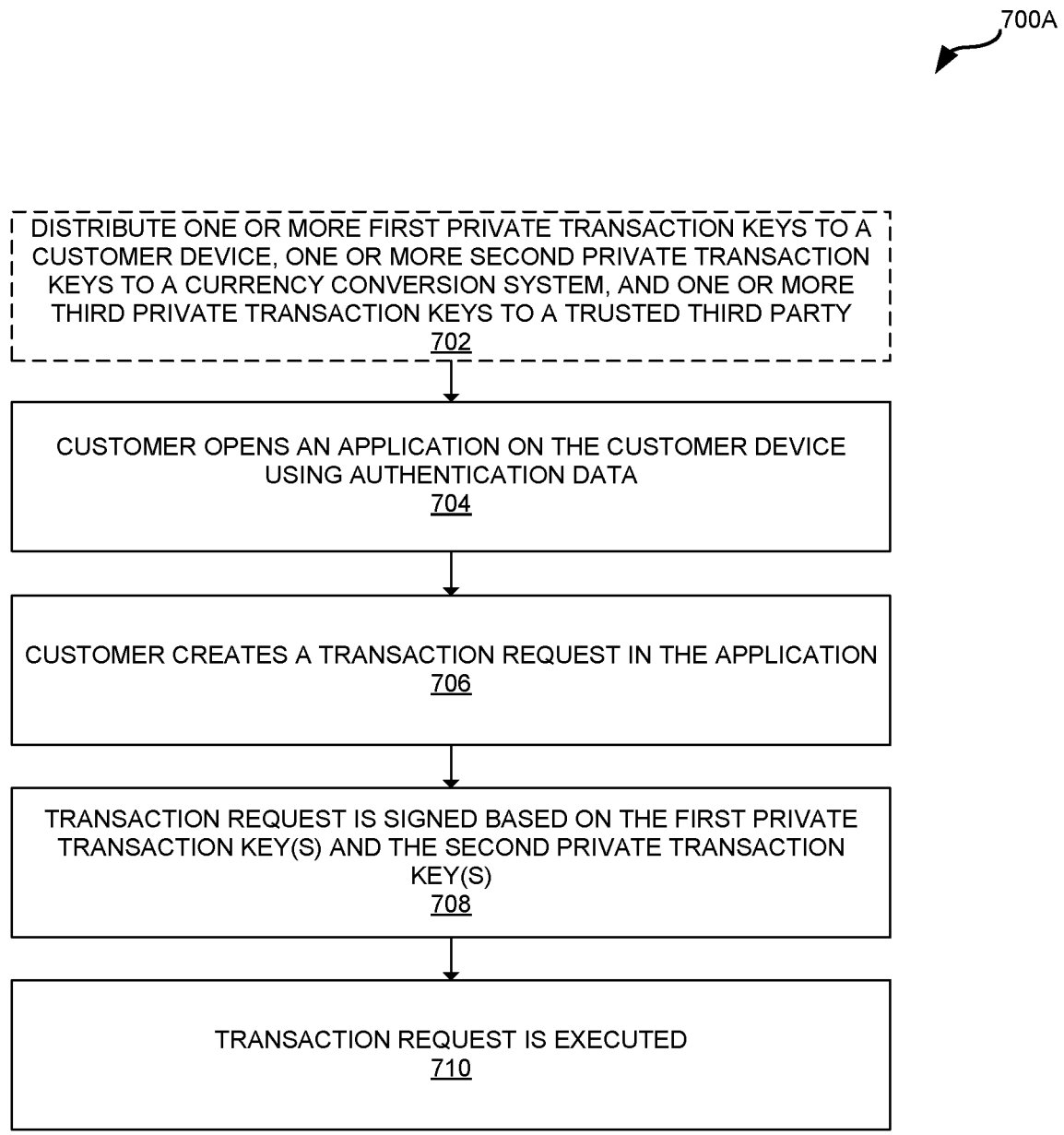
FIG. 7A is a flow diagram illustrating an example method for cryptocurrency transactions in a multi-approval system.

FIG. 7A is a flow diagram illustrating an example method 700A for cryptocurrency transactions in a multi-approval system, e.g., spending cryptocurrency for goods or services. The method 700A may be performed by the customer device 102, the currency conversion system 104, and optionally, the trusted third party 106 in the system 100 illustrated in FIG. 1.

The system 100 may optionally distribute 702 one or more first private transaction keys 206 to the customer device 102, one or more second private transaction keys 216 to the currency conversion system 104, and one or more third private transaction keys 226 to the trusted third party 106. In examples, the private account transaction keys 206, 216, 226 may derived from their respective private account keys 204, 214, 216 at the customer device 102, the currency conversion device 104, and the trusted third party 106, respectively.

To initiate a cryptocurrency transaction, the customer may open 704 an application on the customer device 102 using authentication data. In examples, the authentication data may include biometric data, e.g., the customer placing a finger on a fingerprint reader, pointing a camera at their face, pointing a camera at their eye, or speaking into a microphone. In examples, the application may open (or allow particular access) only if the biometric data matches the biometric data uploaded during onboarding. Alternatively, the authentication data may be a password, or a combination of biometric data and a password. Once the user has gained access to the application, the customer may create 706 a transaction request in the application.

The transaction request may indicate a type and quantity of cryptocurrency to be transferred, e.g., 0.15 Bitcoins. The transaction request may also indicate optional attributes, such as conditional triggering requirements, duration of the transaction request, etc. The transaction request may also include a transaction address for a destination wallet where the cryptocurrency is to be transferred.

The transaction request may be signed 708 based on the first private transaction key(s) 206 and the second private transaction key(s) 216. Specifically, the application on the customer device 102 may identify a multi-approval transaction addresses 530 with enough cryptocurrency to fill the transaction request. If a single multi-approval transaction address 530 cannot be identified with enough cryptocurrency, the application may identify multiple multi-approval transaction addresses 530 with enough cumulative cryptocurrency to fill the transaction request. The application may then input a first private transaction key 206 and a second private transaction key 216 for each identified multi-approval transaction address 530 into a redeem script (e.g., redeemScript according to BIP16) in order to transact from the respective multi-approval transaction address 530.

Once the transaction request has been signed, the transaction may be sent to the asset exchange 108 for recording on a distributed ledger 118, such as a blockchain.

Figure 7B:
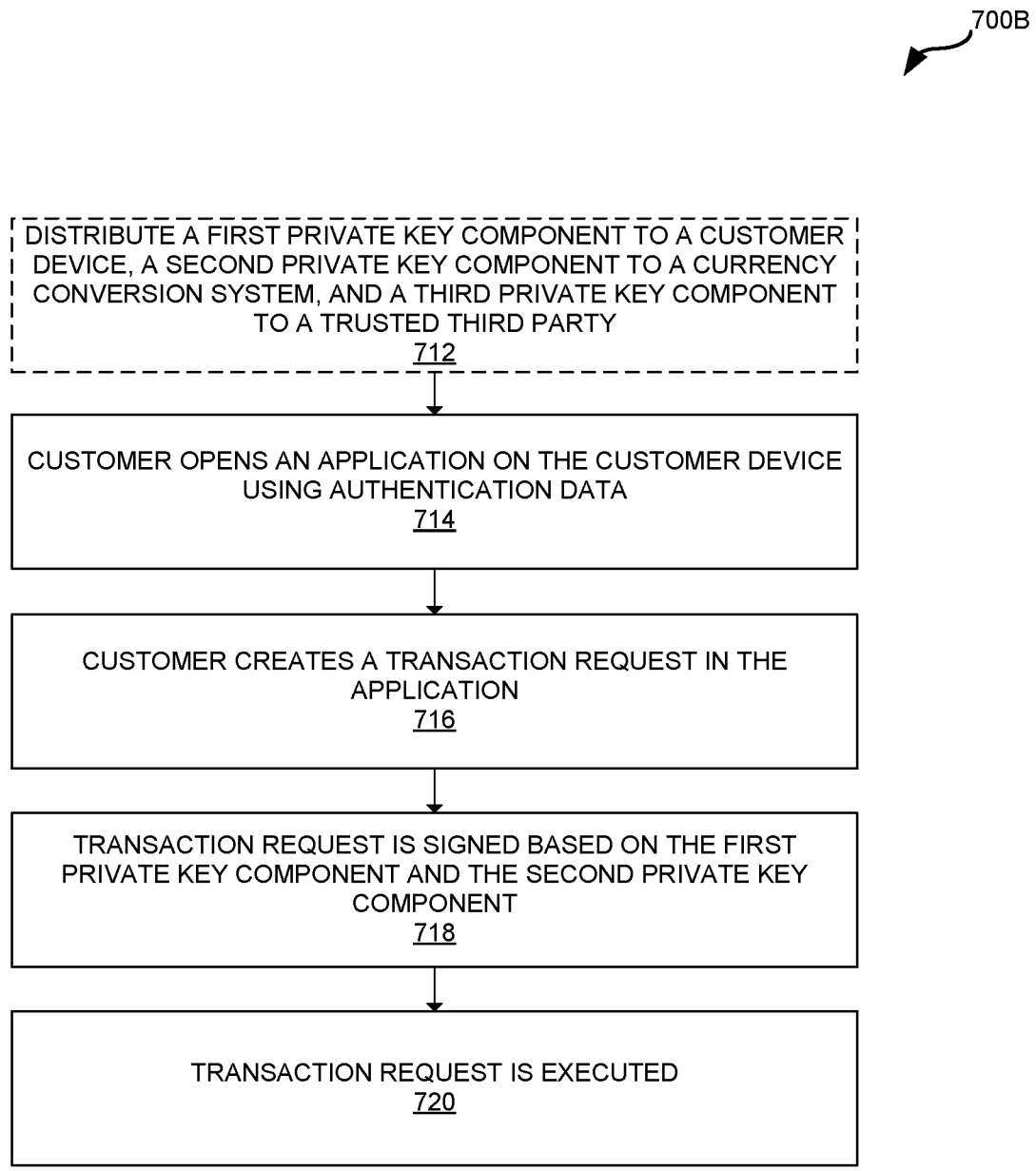
FIG. 7B is a flow diagram illustrating an example method for cryptocurrency transactions in a key splitting system.

FIG. 7B is a flow diagram illustrating an example method 700B for cryptocurrency transactions in a key splitting system, e.g., spending cryptocurrency for goods or services. The method 700B may be performed by the customer device 102, the currency conversion system 104, and optionally, the trusted third party 106 in the system 100 illustrated in FIG. 1.

The system 100 may optionally distribute 712 a first private key component to the customer device 102, a second private key component to the currency conversion system 104, and a third private key component to the trusted third party 106. In examples, the private key components may be generated from a private transaction key 206 on the customer device, e.g., using polynomial interpolation or Shamir secret sharing. In examples, M/N (e.g., 2/3) key components may be required to reconstruct the private transaction key 206 used to sign any cryptocurrency transactions from a particular transaction address. In examples, the third private key component is only used in emergencies, e.g., when the customer device 102 containing the first private key component is lost, broken, upgraded or hard reset/reformatted.

To initiate a cryptocurrency transaction, the customer may open 714 an application on the customer device 102 using authentication data. In examples, the authentication data may include biometric data, e.g., the customer placing a finger on a fingerprint reader, pointing a camera at their face, pointing a camera at their eye, or speaking into a microphone. In examples, the application may open only if the biometric data matches the biometric data uploaded during onboarding. Alternatively, the authentication data may be a password, or a combination of biometric data and a password. Once the user has gained access to the application, the customer may create 716 a transaction request in the application.

The transaction request may indicate a type and quantity of cryptocurrency to be transferred, e.g., 0.15 Bitcoins. The transaction request may also indicate optional attributes, such as conditional triggering requirements, duration of the transaction request, etc. The transaction request may also include a public address for a destination wallet where the cryptocurrency is to be transferred.

The transaction request may be signed 718 based on the first private key component and the second private key component. In a key splitting configuration, the transaction request may be signed 718 by reconstructing the private transaction key 206 using two or more of the key components, then signing the transaction request using the reconstructed private transaction key 206, e.g., as described in FIG. 8E.

Once the transaction request has been signed, the transaction may be sent to the asset exchange 108 for recording on a distributed ledger 118, such as a blockchain.

Figure 8A:
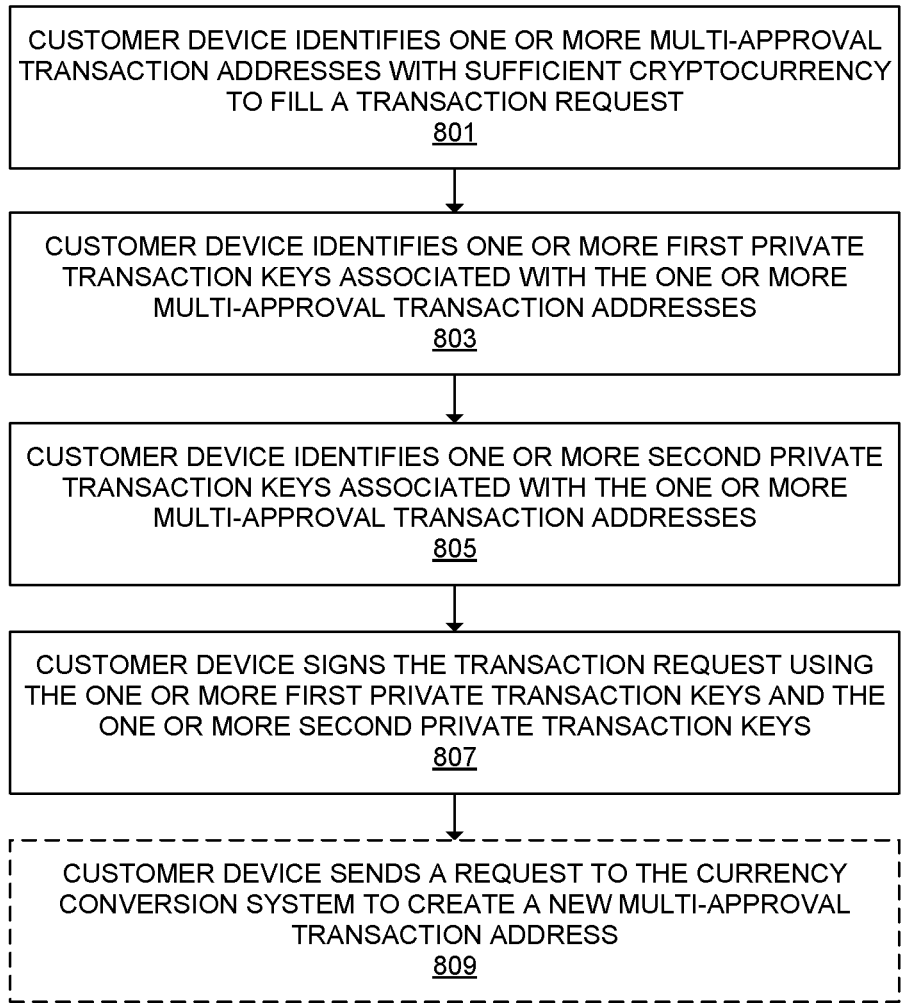
FIG. 8A is a flow diagram illustrating a first example method for signing a transaction request using multi-sig.
Figure 8B:
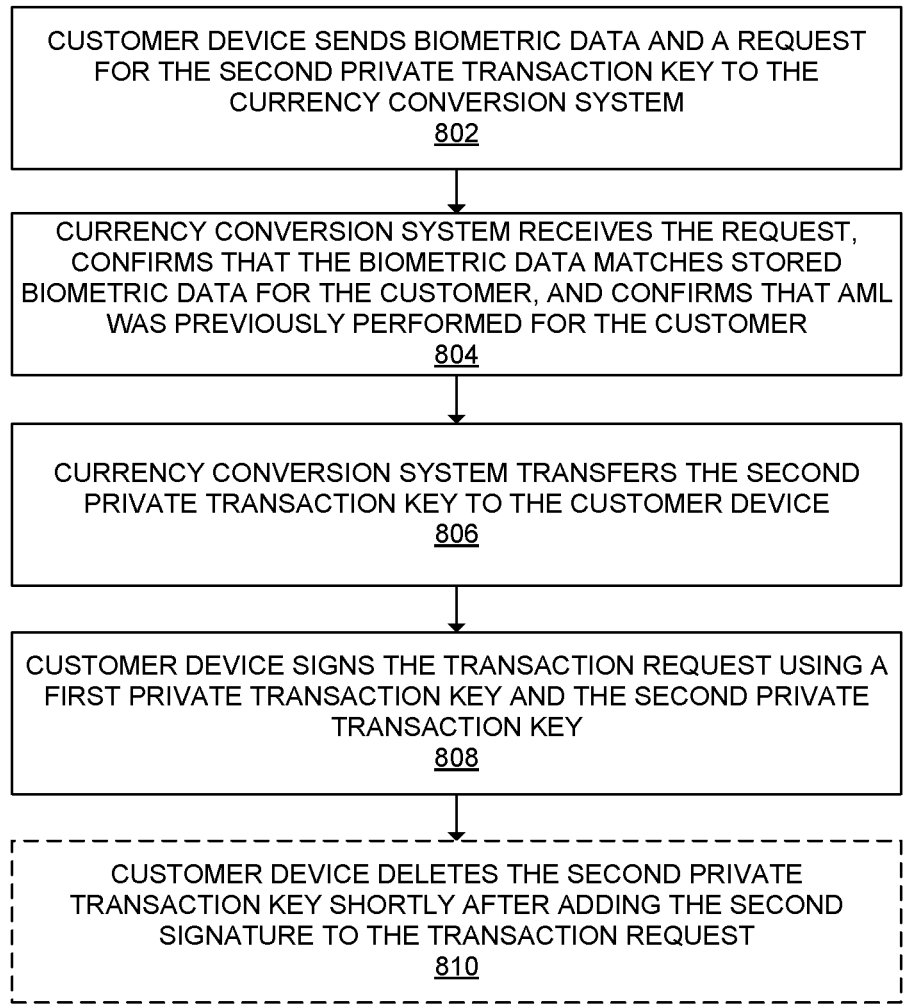
FIG. 8B is a flow diagram illustrating a second example method for signing a transaction request using multi-sig.
Figure 8C:
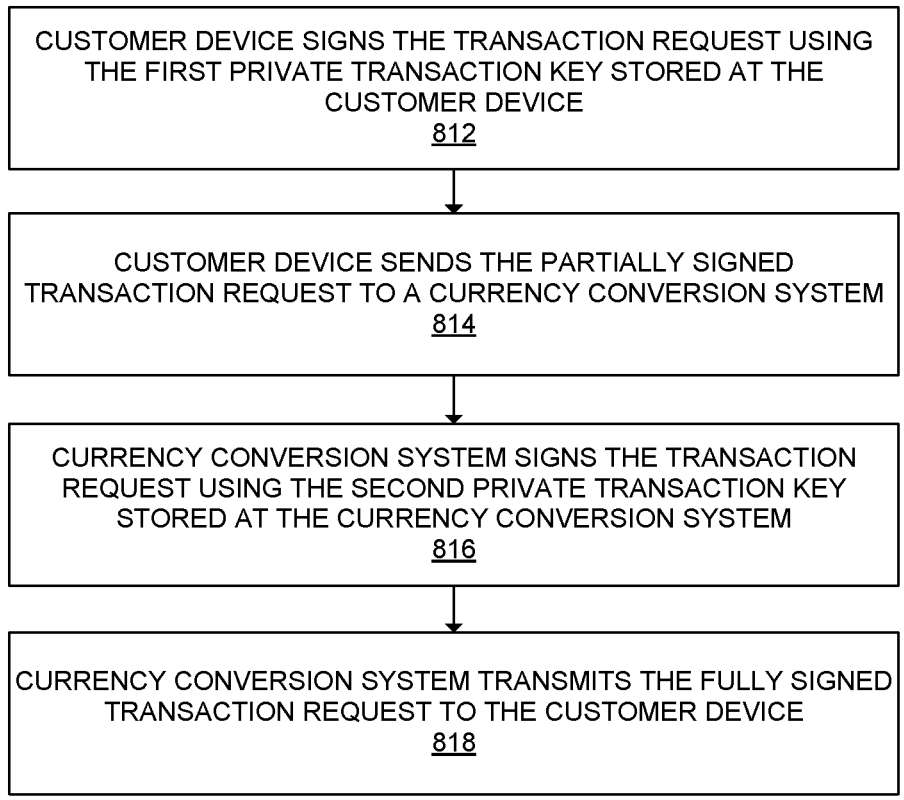
FIG. 8C is a flow diagram illustrating a third example method for signing a transaction request using multi-sig.
Figure 8D:
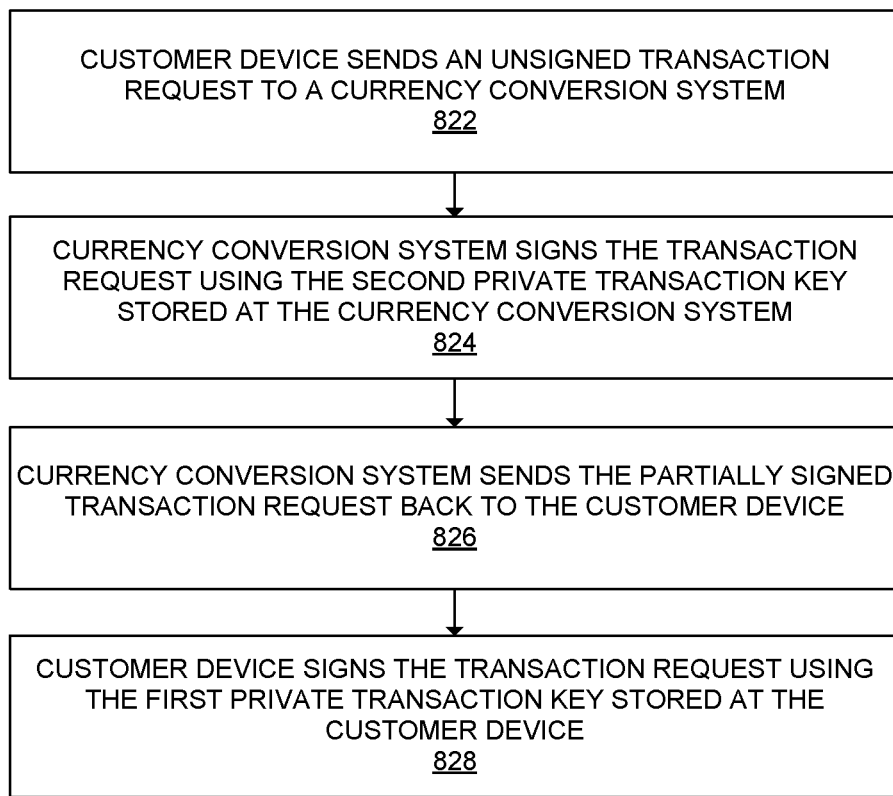
FIG. 8D is a flow diagram illustrating a fourth example method for signing a transaction request using multi-sig.
Figure 8E:
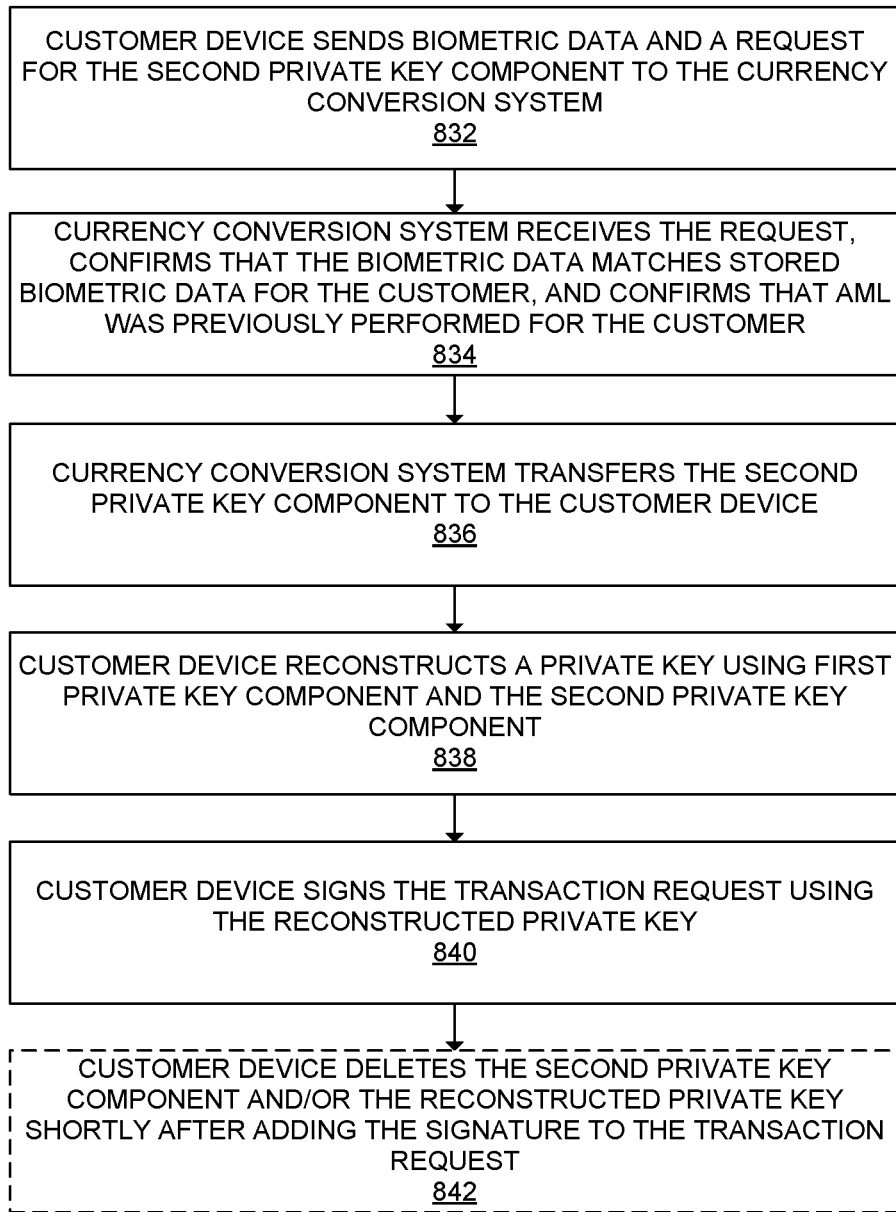
FIG. 8E is a flow diagram illustrating an example method for signing a transaction request using key splitting.

FIGS. 8A-E illustrate five different options for signing a transaction request. Specifically, FIGS. 8A-D illustrate different implementations of element 708 in FIG. 7A, and FIG. 8E illustrates an implementation of element 718 in FIG. 7B.

FIG. 8A is a flow diagram illustrating a first example method 800A for signing a transaction request using multi-sig. The method 800A may be performed by a customer device 102 seeking to transact with cryptocurrency. The customer device 102 may identify 801 one or more multi-approval transaction addresses 530 with sufficient cryptocurrency to fill a transaction request. In other words, the customer device 102 may locate one or more previously-generated multi-approval transaction addresses 530 that cumulatively hold the correct type and at least enough quantity of cryptocurrency to fill the customer's desired transaction, e.g., 0.15 Bitcoins. The one or more multi-approval transaction addresses 530 may be created during the purchase of cryptocurrency, during previous cryptocurrency transactions to store remaining cryptocurrency, and/or at the request of the customer.

The customer device 102 may also identify 803 one or more first private transaction keys 206 associated with the one or more multi-approval transaction addresses 530. The first private transaction key(s) 206 may be stored in the node tree 200A on the customer device 102. The first private transaction key(s) 206 may be hardened (i.e., non-extended) keys.

The customer device 102 may also identify 805 one or more second private transaction keys 216 associated with the one or more multi-approval transaction addresses 530. The second private transaction key(s) 216 may be originally stored in the node tree 200B on the currency conversion system 104, and subsequently transmitted to the customer device 102. In examples, the second private transaction keys 216 may be transmitted to the customer device 102 when the one or more multi-approval transaction addresses 530 were funded, e.g., during the purchase of cryptocurrency and/or created during previous cryptocurrency transactions to store remaining cryptocurrency. The second private transaction key(s) 216 may be hardened (i.e., non-extended) keys.

The customer device 102 may sign 807 the transaction request using the one or more first private transaction keys 206 and the one or more second private transaction keys 216. The signing may include using a redeemScript (e.g., according to BIP16) to produce a signed transaction, e.g., after verifying that a first private transaction key and a second private transaction key 216 corresponding to each source multi-approval transaction address 530 have been input.

Optionally, the customer device may then send 809 a request the currency conversion system 104 to create a new multi-approval transaction address 530 to hold any remaining funds following the transaction. In examples, if the transaction request was to transfer 0.15 Bitcoins from a multi-approval transaction address 530 that holds 0.5 Bitcoins, the remaining 0.35 Bitcoins may be transferred to a new multi-approval transaction address 530 created by the currency conversion system 104.

To create a new multi-approval transaction address 530, the currency conversion system 104 may use three public transaction keys 207, 217, 227 from the customer device 102, the currency conversion system 104, and the trusted third party 106, respectively, as illustrated in FIGS. 5-6.

FIGS. 8B-D assume that a first private transaction key 206A, a second private transaction key 216A, and optionally a third private transaction key 226A have previously been distributed at a customer device 102, a currency conversion system 104, and a trusted third party 106, respectively.

FIG. 8B is a flow diagram illustrating a second example method 800B for signing a transaction request using multi-sig. In the method 800B, the customer device 102 may send 802 biometric data and a request for the second private transaction key 216A to the currency conversion system 104. This may include sending an index for a private account key 214A stored in the node tree 200B on the currency conversion device 104. The currency conversion system 104 may receive 804 the request, confirm that the biometric data matches stored biometric data for the customer, and confirm that AML was previously performed for the customer.

The currency conversion system 104 may transfer 806 the second private transaction key 216A to the customer device 102, e.g., the second private transaction key 216A that was identified using the index from the customer device 102 and the private account key 214A. The customer device 102 may then sign 808 the transaction request using a first private transaction key 206A (stored at the customer device 102) and the second private transaction key 216A (received from the currency conversion system 104). The signing may include using a redeemScript (e.g., according to BIP16) to produce a signed transaction, e.g., after verifying that the first private transaction key 206A and the second private transaction key 216A corresponding to a multi-approval transaction address 530 have been input.

Optionally, the customer device 102 may delete 810 the second private transaction key 216A (received from the currency conversion system 104) shortly after adding the second signature to the transaction request.

FIG. 8C is a flow diagram illustrating a third example method 800C for signing a transaction request using multi-sig. In the method 800C, the customer device 102 may sign 812 the transaction request using the first private transaction key 206A stored at the customer device 102. The customer device 102 may send 814 the partially signed transaction request to the currency conversion system 104. The currency conversion system 104 may sign 816 the transaction request using the second private transaction key 216A stored at the currency conversion system 104. The currency conversion system 104 may transmit 818 the fully signed transaction request to the customer device 102.

FIG. 8D is a flow diagram illustrating a fourth example method 800D for signing a transaction request using multi-sig. In the method 800D, the customer device 102 may send 822 an unsigned transaction request to the currency conversion system 104. The currency conversion system 104 may sign 824 the transaction request using the second private transaction key 216A stored at the currency conversion system 104. Since transactions may require signatures using two out of the three private transaction keys (e.g., two of the private transaction keys 206A, 216A, 226A), the transaction request may only be partially signed at this point. Accordingly, the currency conversion system 104 may send 826 the partially signed transaction request back to the customer device 102. The customer device 102 may sign 828 the transaction request using the first private transaction key 206A stored at the customer device 102.

FIG. 8E is a flow diagram illustrating a method 800E for signing a transaction request using key splitting. FIG. 8E assumes that a private transaction key is previously split into the set of at least two (or three) key components, e.g., using polynomial interpolation or Shamir secret sharing. FIG. 8E also assumes that a first private key component, a second private key component, and optionally a third private key component have previously been distributed at a customer device 102, a currency conversion system 104, and a trusted third party 106, respectively.

In the method 800E, the customer device 102 may send 832 biometric data and a request for a second private key component to the currency conversion system 104. The currency conversion system 104 may receive 834 the request, confirm that the biometric data matches stored biometric data for the customer, and confirm that AML was previously performed for the customer. The currency conversion system 104 may also transfer 836 the second private key component to the customer device 102. The customer device 102 may reconstruct 838 a private key using a first private key component (stored at the customer device 102) and the second private key component (received from the currency conversion system 104). The customer device 102 may sign 840 the transaction request using the reconstructed private transaction key. Optionally, the customer device 102 may delete 842 the second private key component (received from the currency conversion system 104) and/or the reconstructed private key shortly after adding the signature to the transaction request.

Figure 9A:
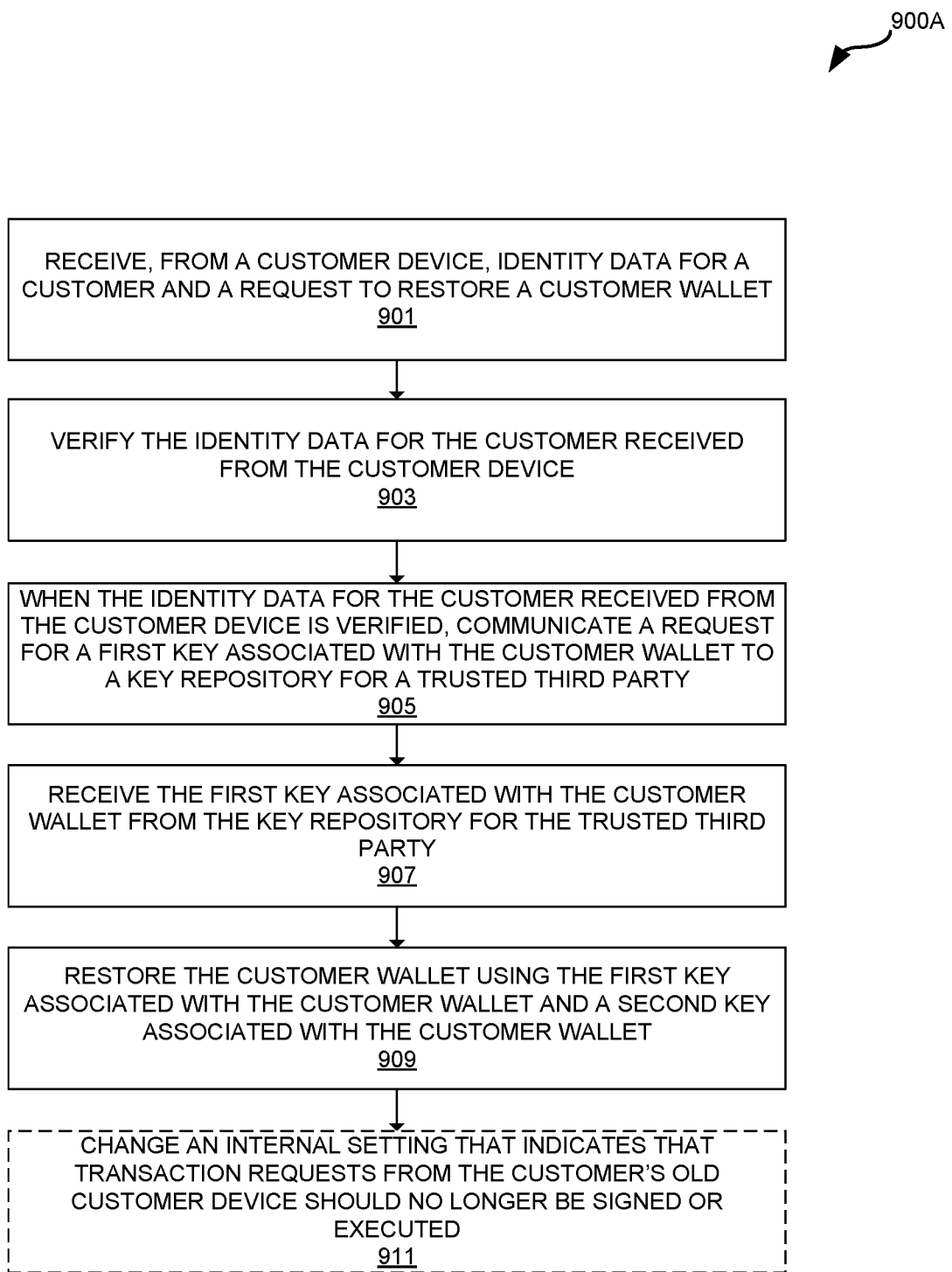
FIG. 9A is a flow diagram illustrating an example method for restoring a customer wallet following the loss of the customer's private key using multi-sig.

FIG. 9A is a flow diagram illustrating an example method 900A for restoring a customer wallet following the loss of the customer's key using multi-sig. The method 900A may be performed by the currency conversion system 104 illustrated in FIG. 1. The method 900A may be performed in response to a customer losing or breaking a device (e.g., mobile device) that stored a key for a customer wallet. The method 900A may also be performed when a customer purchases (i.e., upgrades to) a new mobile device or when a customer hard resets/reformats a mobile device.

The currency conversion system 104 may receive 901, from a customer device 102, identity data for a customer and a request to restore a customer wallet. In examples, the identity data may include a customer's name, date of birth, driver's license number and expiration date, address, phone number(s), email address(es), social security number, image of customer's government issued photo identification, photo of the customer holding the government issued photo identification, employment information, and/or income. The identity data may also include biometric data, such as fingerprint data (e.g., scan(s) of the customer's fingerprint(s)), retinal scan data (e.g., image(s) of the customer's retina), facial recognition data (e.g., image(s) of the customer's face), and/or voice data (e.g., recording(s) of the customer's voice). Instead of raw biometric data (e.g., images and/or recordings), the identity data may include processed data derived from the raw biometric data, e.g., image features, voice features, etc.

The currency conversion system 104 may verify 903 the identity data for the customer received from the customer device 102. In examples, verifying may include comparing received biometric data with previously stored biometric data, e.g., biometric data that was stored when the customer initially created their account with the currency conversion system 104.

When the identity data received from the customer device is verified (i.e., the received biometric data matches the previously stored biometric data), the currency conversion system 104 may communicate 905 a request for a first key associated with the customer wallet to a key repository for a trusted third party 106. In examples, the first key may be a private account key 226 stored at the trusted third party 106.

The currency conversion system 104 may also receive 907 the first key associated with the customer wallet from the key repository for the trusted third party 106. The currency conversion system 104 may also restore 909 the customer wallet using the first key associated with the customer wallet and a second key associated with the customer wallet. In examples, the second key may be private account key 226 stored at the currency conversion system 104.

Optionally, the currency conversion system 104 may also change 911 an internal setting that indicates that transaction requests from the customer's old customer device 102 should no longer be signed or executed.

Figure 9B:
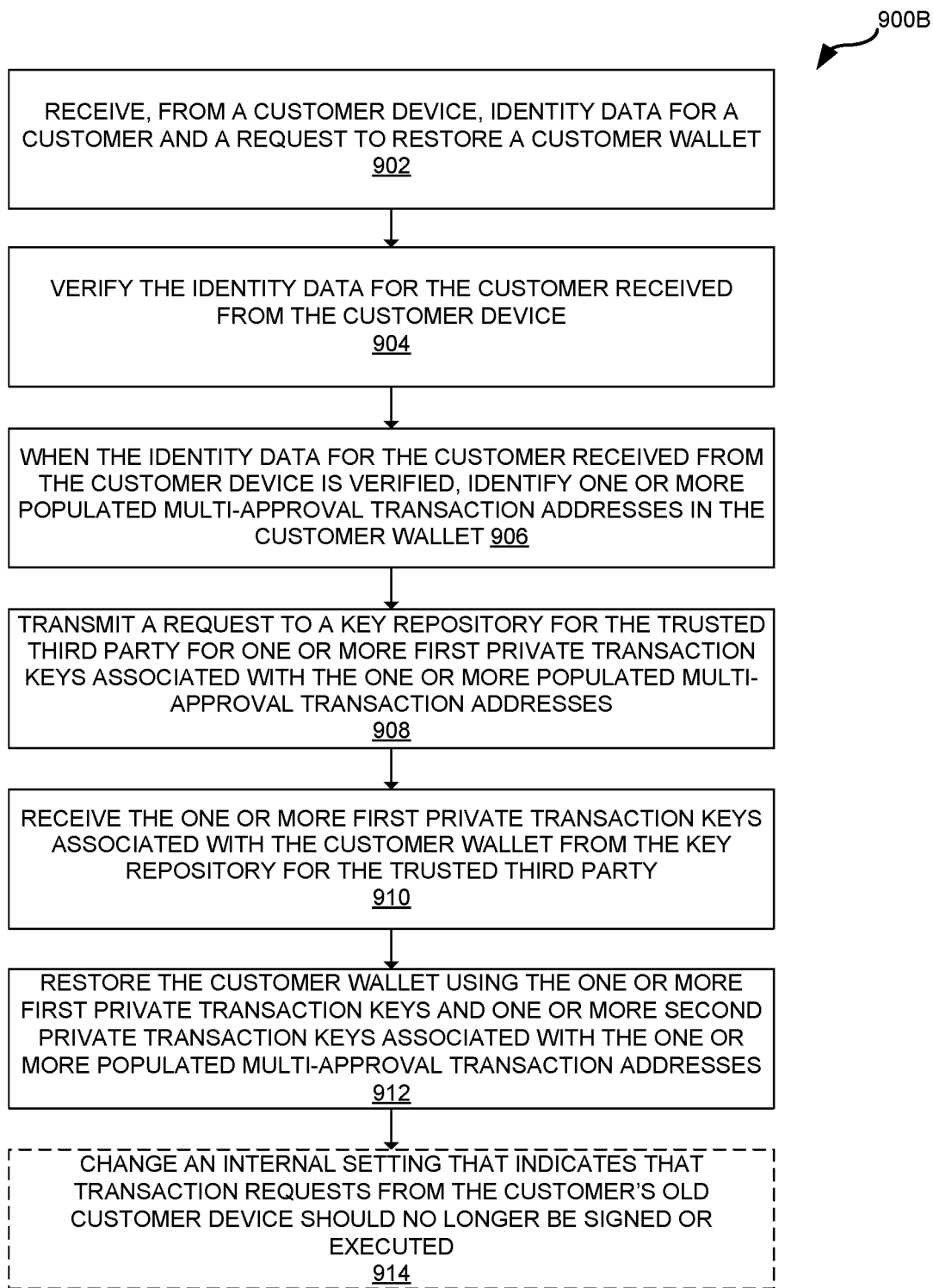
FIG. 9B is a flow diagram illustrating another example method for restoring a customer wallet following the loss of the customer's private key using multi-sig.

FIG. 9B is a flow diagram illustrating another example method 900B for restoring a customer wallet following the loss of the customer's key using multi-sig. The method 900B may be performed by the currency conversion system 104 illustrated in FIG. 1. The method 900B may be performed in response to a customer losing or breaking a device (e.g., mobile device) that stored a key for a customer wallet. The method 900B may also be performed when a customer purchases (i.e., upgrades to) a new mobile device or when a customer hard resets/reformats a mobile device.

The currency conversion system 104 may receive 902, from a customer device 102, identity data for a customer and a request to restore a customer wallet. In examples, the identity data may include a customer's name, date of birth, driver's license number and expiration date, address, phone number(s), email address(es), social security number, image of customer's government issued photo identification, photo of the customer holding the government issued photo identification, employment information, and/or income. The identity data may also include biometric data, such as fingerprint data (e.g., scan(s) of the customer's fingerprint(s)), retinal scan data (e.g., image(s) of the customer's retina), facial recognition data (e.g., image(s) of the customer's face), and/or voice data (e.g., recording(s) of the customer's voice). Instead of raw biometric data (e.g., images and/or recordings), the identity data may include processed data derived from the raw biometric data, e.g., image features, voice features, etc.

The currency conversion system 104 may verify 904 the identity data for the customer received from the customer device 102. In examples, verifying may include comparing received biometric data with previously stored biometric data, e.g., biometric data that was stored when the customer initially created their account with the currency conversion system 104.

When the identity data received from the customer device is verified (i.e., the received biometric data matches the previously stored biometric data), the currency conversion system 104 may identify 906 one or more populated multi-approval transaction addresses 530 in the customer wallet, i.e., one or more multi-approval transaction addresses 530 with cryptocurrency in them. This may include traversing the multi-approval transaction addresses 530 associated with a private account key 214 stored at the currency conversion system 104 for a customer. Alternatively, the currency conversion system 104 may maintain an index for the last multi-approval transaction address 530 (associated with the private account key 214) that was generated and/or populated for the customer.

The currency conversion system 104 may transmit 908 a request to the key repository 116 for the trusted third party 106 for one or more first private transaction keys 226 associated with the one or more populated multi-approval transaction addresses 530. In other words, the currency conversion system 104 may request the private transaction key(s) 226 associated with the public transaction key(s) 227 that were used to generate the populated multi-approval transaction address(es) 530. In examples, the request may include an index, for each requested first private transaction key 226, on the trusted third party 106, e.g., if the currency conversion system 104 requests three first private transaction keys 226, the request may include three indices for a private account key 224 on the trusted third party 106. The first private transaction key(s) 226 may be hardened keys that were generated during the purchase of cryptocurrency and/or previous cryptocurrency transactions (to store remaining cryptocurrency).

The currency conversion system 104 may also receive 910 the one or more first private transaction keys 226 associated with the customer wallet from the key repository for the trusted third party 106. The currency conversion system 104 may also restore 912 the customer wallet using the one or more first private transaction keys 226 and one or more second private transaction keys 216 associated with the one or more populated multi-approval transaction addresses 530. In examples, the second private transaction key(s) 216 may be stored in the node tree 200B on the currency conversion system 104, and may be associated with the one or more multi-approval transaction addresses 530. The second private transaction key(s) 216 may be hardened keys that were generated during the purchase of cryptocurrency and/or previous cryptocurrency transactions (to store remaining cryptocurrency).

Optionally, the currency conversion system 104 may also change 914 an internal setting that indicates that transaction requests from the customer's old customer device 102 should no longer be signed or executed.

Figure 9C:
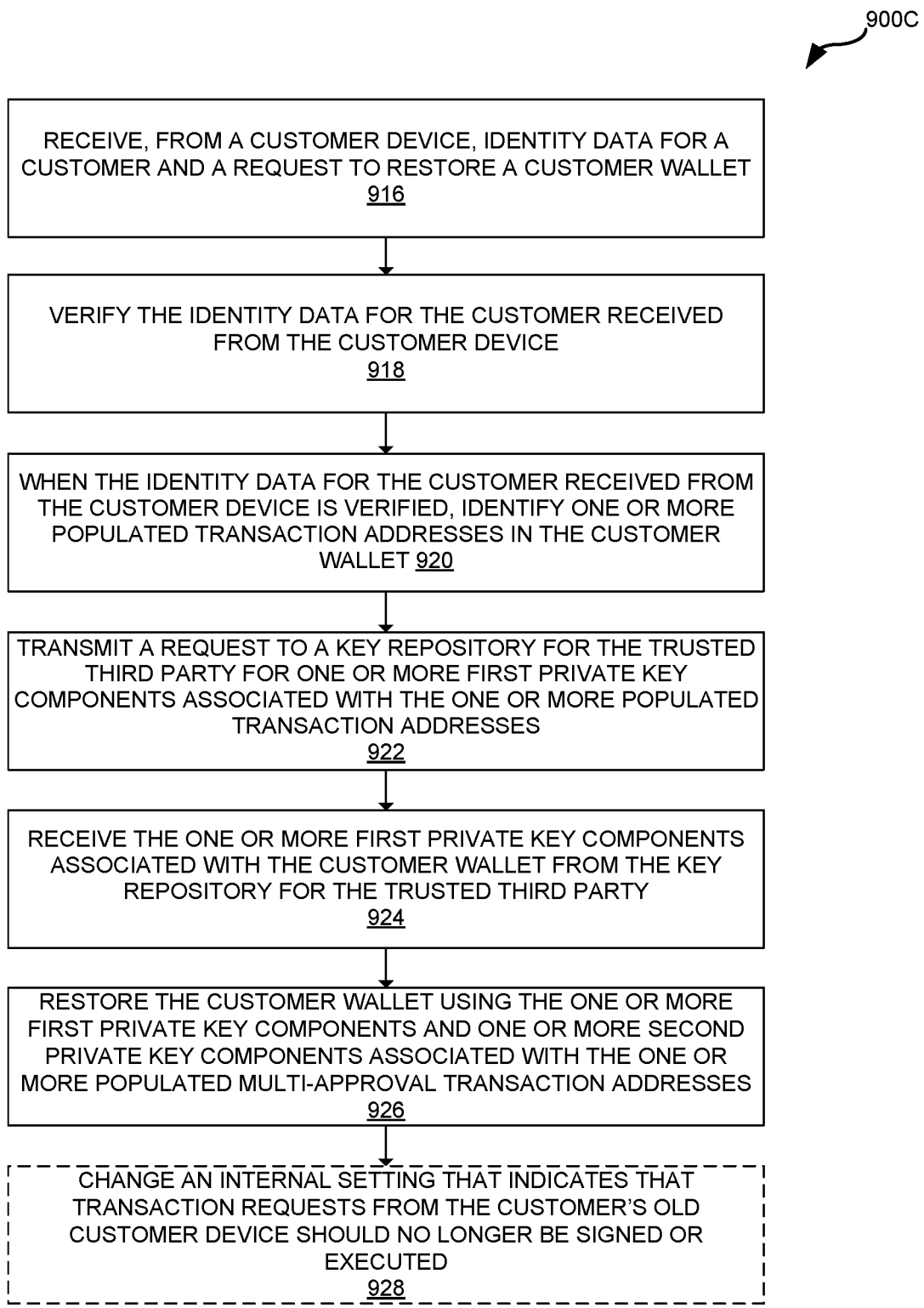
FIG. 9C is a flow diagram illustrating an example method for restoring a customer wallet following the loss of the customer's private key component using key splitting.

FIG. 9C is a flow diagram illustrating an example method 900C for restoring a customer wallet following the loss of the customer's key component using key splitting. The method 900C may be performed by the currency conversion system 104 illustrated in FIG. 1. The method 900C may be performed in response to a customer losing or breaking a device (e.g., mobile device) that stored a key component for a customer wallet. The method 900C may also be performed when a customer purchases (i.e., upgrades to) a new mobile device or when a customer hard resets/reformats a mobile device.

The currency conversion system 104 may receive 916, from a customer device 102, identity data for a customer and a request to restore a customer wallet. In examples, the identity data may include a customer's name, date of birth, driver's license number and expiration date, address, phone number(s), email address(es), social security number, image of customer's government issued photo identification, photo of the customer holding the government issued photo identification, employment information, and/or income. The identity data may also include biometric data, such as fingerprint data (e.g., scan(s) of the customer's fingerprint(s)), retinal scan data (e.g., image(s) of the customer's retina), facial recognition data (e.g., image(s) of the customer's face), and/or voice data (e.g., recording(s) of the customer's voice). Instead of raw biometric data (e.g., images and/or recordings), the identity data may include processed data derived from the raw biometric data, e.g., image features, voice features, etc.

The currency conversion system 104 may verify 918 the identity data for the customer received from the customer device 102. In examples, verifying may include comparing received biometric data with previously stored biometric data, e.g., biometric data that was stored when the customer initially created their account with the currency conversion system 104.

When the identity data received from the customer device is verified (i.e., the received biometric data matches the previously stored biometric data), the currency conversion system 104 may identify 920 one or more populated transaction addresses 530 in the customer wallet, i.e., one or more transaction addresses 530 with cryptocurrency in them. This may include traversing the transaction addresses 530 in a customer wallet. Alternatively, the currency conversion system 104 may maintain an index for the last transaction address 530 that was generated and/or populated for the customer.

The currency conversion system 104 may transmit 922 a request to a key repository for the trusted third party 106 for one or more first private key components associated with the one or more populated transaction addresses. In other words, the currency conversion system 104 may request the first private key components associated with the public key components that were used to generate the transaction addresses.

The currency conversion system 104 may also receive 924 the one or more first key components associated with the customer wallet from the key repository for the trusted third party 106. The currency conversion system 104 may also restore 926 the customer wallet using the one or more first key components and one or more second key components associated with the one or more transaction addresses 530. In examples, the second private key components may be generated during the purchase of cryptocurrency and/or previous cryptocurrency transactions (to store remaining cryptocurrency).

Optionally, the currency conversion system 104 may also change 928 an internal setting that indicates that transaction requests from the customer's old customer device 102 should no longer be signed or executed.

Figure 10A:
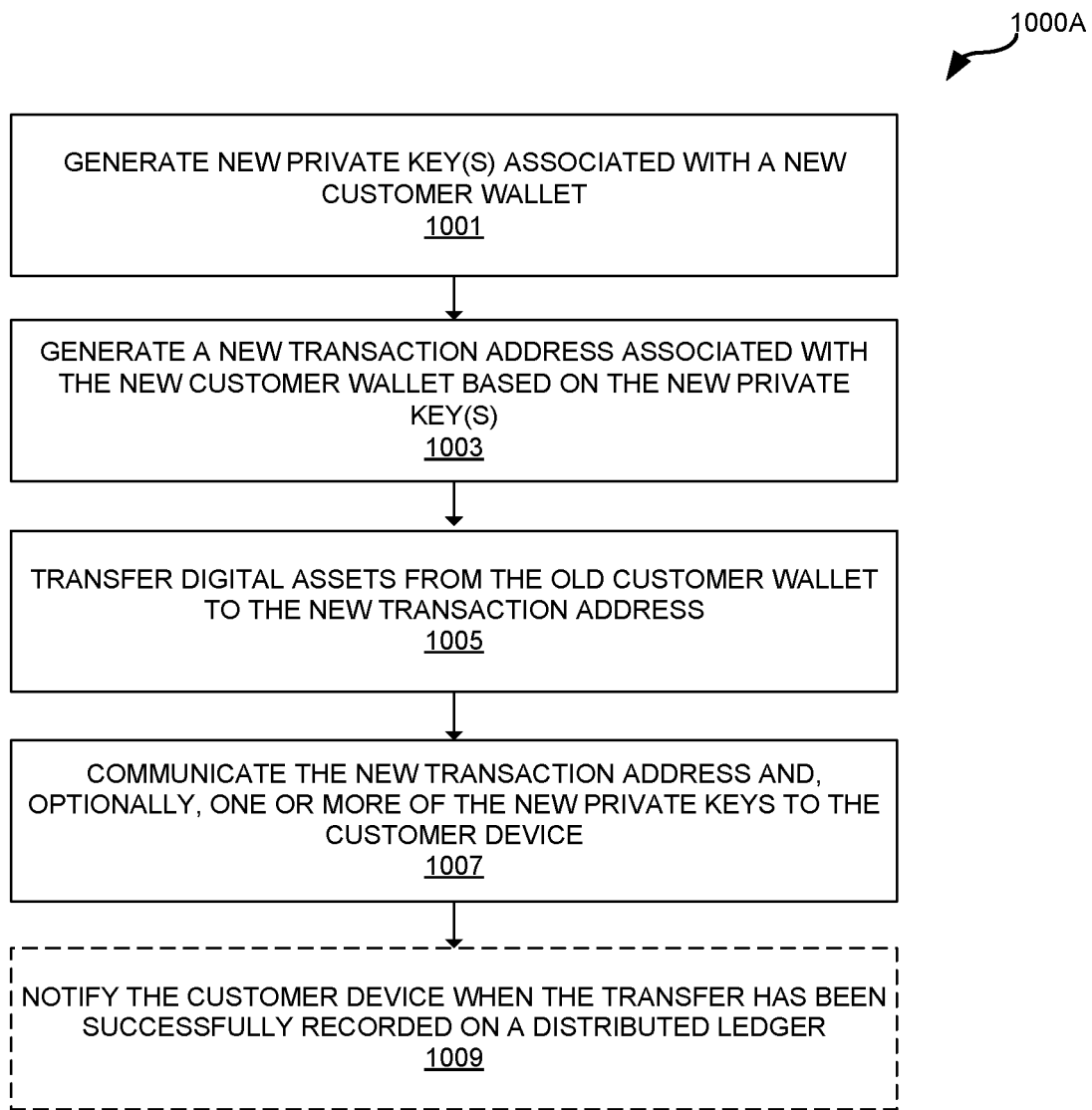
FIG. 10A is a block diagram illustrating an example method for restoring a customer wallet using multi-sig.

FIG. 10A is a block diagram illustrating an example method 1000A for restoring a customer wallet using multi-sig. FIG. 10A illustrates one implementation of element 909 in FIG. 9A. The method 1000A may be performed by one or more of the customer device 102, currency conversion system 104, and/or the trusted third party 106 illustrated in FIG. 1.

The method 1000A may be performed following the customer losing, breaking, upgrading or hard resetting/reformatting a customer device 102 possessing a private key associated with a customer wallet. The process of restoring a customer wallet (i.e., an old customer wallet) may include creating a new customer wallet and transferring assets from the old customer wallet to the new customer wallet.

As used herein, the term "old" when referring to a key, an address, or a customer wallet means that the key, address, or wallet was created during onboarding (e.g., as described in FIG. 3). The term "new" when referring to a key, an address, or a customer wallet means that the key, address, or wallet was created during account restoration following the loss of one or more old keys, addresses and/or wallets.

One or more new private keys associated with a new customer wallet may be generated 1001. The new private key(s) may be generated for the customer device 102, currency conversion system 104, and/or the trusted third party 106.

One of the device(s) generating the new private key(s) (e.g., the currency conversion system 104 may also generate 1003 a new transaction address associated with the new customer wallet based on the new private key(s). This may include generating new public keys associated with the new private keys, and deriving a new transaction address from the new public keys. In examples, a hashing function may receive three new public keys (e.g., one from each of the customer device 102, the currency conversion system 104, and the trusted third party 106), and produce the new transaction address. A device would may then be required to possess new private keys associated with at least two of the new public keys in order to transact from the new transaction address.

Digital assets may also be transferred 1005 from the old (lost) customer wallet to the new transaction address, e.g., signing the transaction using a first key (from the trusted third party 106) and a second key (from the currency conversion system 104). This may include the customer device 102, currency conversion system 104, and/or the trusted third party 106 transmitting a request to the asset exchange 108 (or other nodes with access to the distributed ledger 118) to record a change of ownership from the old customer wallet to the new transaction address. The request to record a change of ownership may require signatures using M/N (e.g., 2/3) of the new private keys or M/N (e.g., 2/3) of the old private keys. Therefore, the device generating/sending the request may be required to verify that it already possesses one or more old private keys and/or has received one or more old private keys from other device(s) before it signs the request, i.e., the generating/sending device may be required to verify that it possesses M/N (e.g., 2/3) of the old private keys before it signs the request.

The currency conversion system 104 may also communicate 1007 the new transaction address and one or more of the new private keys to the customer device 102. Optionally, the currency conversion system may also notify 1009 the customer device 102 when the transfer of digital assets from the old customer wallet to the new transaction address has been successfully recorded, e.g., on the distributed ledger 118.

Figure 10B:
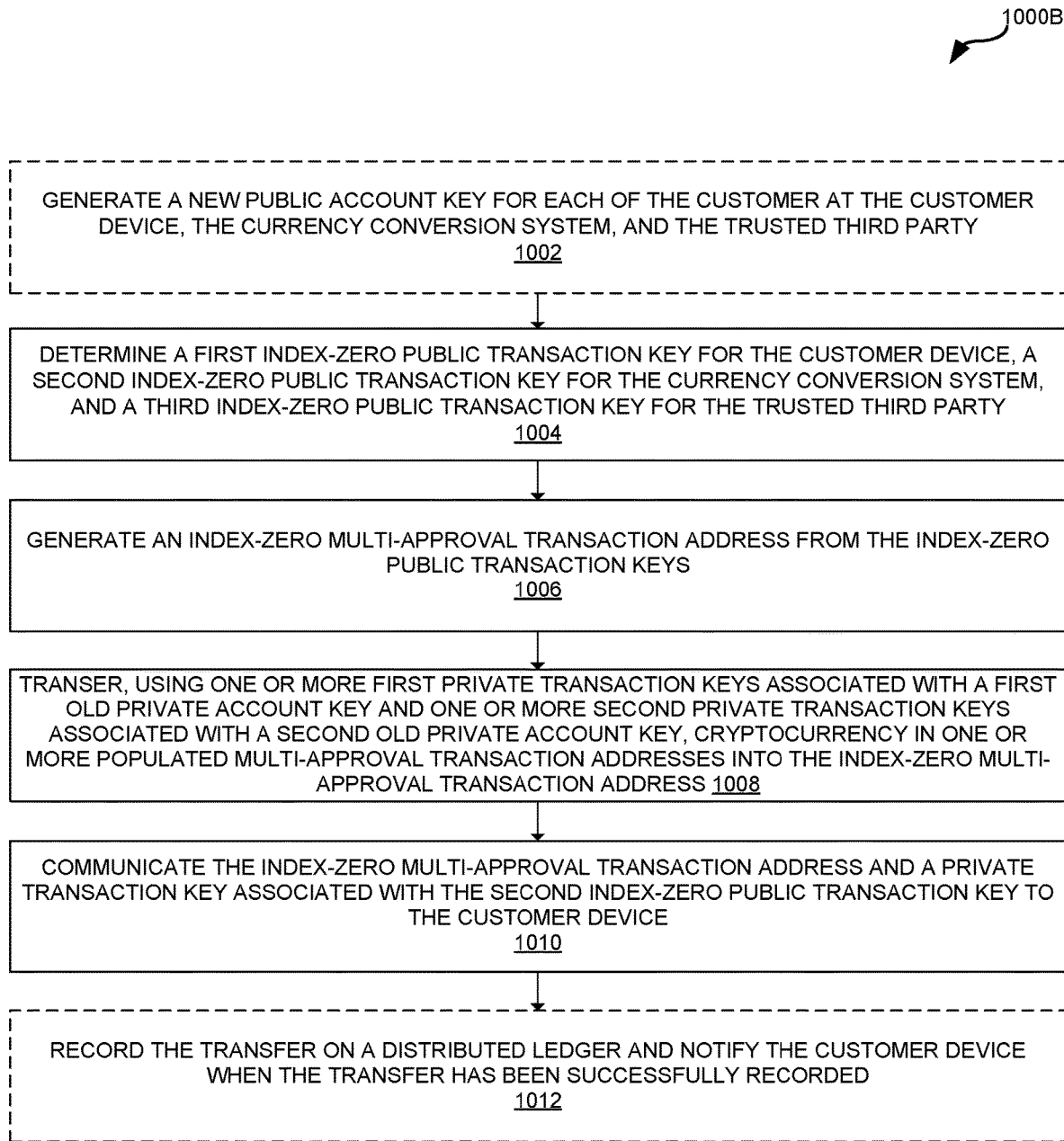
FIG. 10B is a block diagram illustrating another example method for restoring a customer wallet using multi-sig.

FIG. 10B is a block diagram illustrating another example method 1000B for restoring a customer wallet using multi-sig. FIG. 10B illustrates one implementation of element 912 in FIG. 9B. The method 1000B may be performed by one or more of the customer device 102, currency conversion system 104, and the trusted third party 106 illustrated in FIG. 1.

The method 1000B may be performed following the customer losing, breaking, upgrading or hard resetting/reformatting a customer device 102 possessing a private key associated with a customer wallet. The process of restoring a customer wallet (i.e., an old customer wallet) may include transferring assets from the transaction addresses associated with old account key(s) to a transaction address associated with a new account key.

Optionally, new public account keys 205, 215, 225 may be generated 1002 for each of the customer device 102, the currency conversion system 104, and the trusted third party 106. Since the method 1000B is likely performed following the loss of the customer's private account key 204 (and public account key 205) on an old customer device 102, a new customer device 102 may generate the new public account key 205, e.g., from a new private account key 204. The currency conversion system 104 may generate the new public account key 215 at a new index of the master public key 213 stored in the node tree 200B. The currency conversion system 104 may also generate the new public account key 225 for the trusted third party 106 using the master public key 223 stored at the currency conversion system 104, e.g., at a new index of the master public key 223 stored on the currency conversion system 104. The trusted third party 106 may share its master public key 223 with the currency conversion system 104 via secure and/or non-electronic means.

A first index-zero public transaction key 207 for the customer device 102, a second index-zero public transaction key 217 for the currency conversion system 104, and a third index-zero public transaction key 227 may be determined 1004. In examples, one or more of the index-zero public transaction keys 207, 217, 227 may be derived at index 0 of the new public account keys 205, 215, 225, respectively. Alternatively, or additionally, one or more of the index-zero public transaction keys 207, 217, 227 may be derived from one or more new private account keys 204, 214, 224, respectively. Alternatively, or additionally, one or more of the index-zero public transaction keys 207, 217, 227 may be derived from one or more index-zero private transaction keys 206, 216, 226, which may be derived from one or more new private account keys 204, 214, 224, respectively. In other words, the index-zero public transaction keys 207, 217, 227 may be derived via any path in their respective node trees 200A, 200B, 200C.

The currency conversion system 104 may also generate 1006 an index-zero multi-approval transaction address 530 from the index-zero public transaction keys 207, 217, 227. This may include using a hashing function (e.g., pay-to-script-hash (P2SH) or other pubkey script) to create a multi-approval transaction address 530 that requires two index-zero private transaction keys 206, 216, 226 to transact from the multi-approval transaction address 530.

The currency conversion system 104 may also transfer 1008, using one or more first private transaction keys 226 associated with a first old private account key 204 and one or more second private transaction keys 216 associated with a second old private account key 214, cryptocurrency in one or more populated multi-approval transaction addresses 530 into the index-zero multi-approval transaction address 530. In other words, the currency conversion system 104 may transfer the cryptocurrency from multi-approval transaction address(es) 530 associated with old private account keys 204, 214, 224 and/or old public account keys 205, 215, 225 into the index-zero multi-approval transaction address that is associated with new public account keys 205, 215, 225.

The currency conversion system 104 may also communicate 1010 the index-zero multi-approval transaction address 530 and a private transaction key 216 associated with the second public transaction key 217 to the customer device 102. Optionally, the currency conversion system 104 may also record 1012 the transfer on a distributed ledger and notify the customer device 102 when the transfer has been successfully recorded.

Figure 10C:
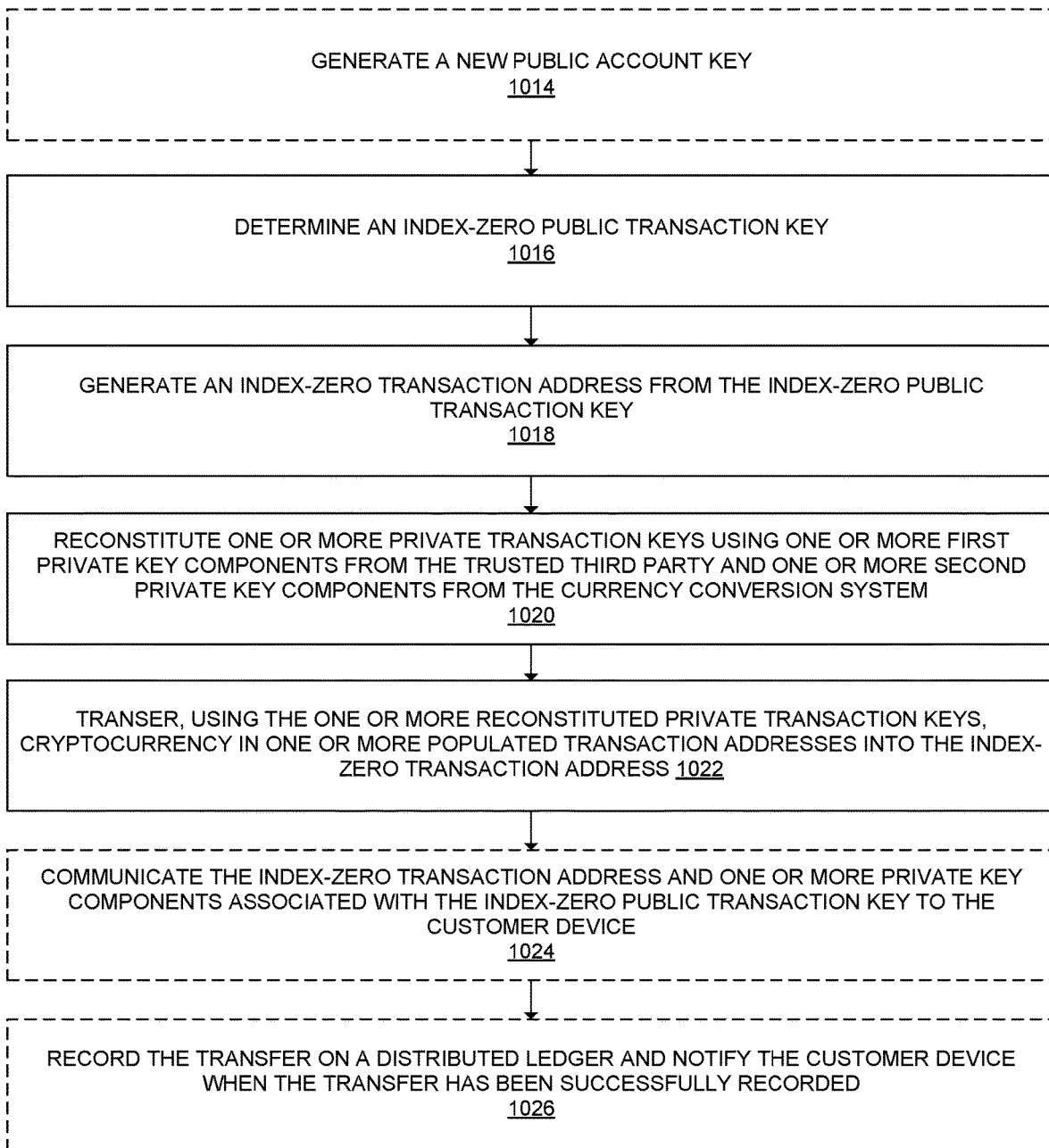
FIG. 10C is a block diagram illustrating an example method for restoring a customer wallet using key splitting.

FIG. 10C is a block diagram illustrating an example method 1000C for restoring a customer wallet using key splitting. FIG. 10C illustrates one implementation of element 926 in FIG. 9B. The method 1000C may be performed by one or more of the customer device 102, currency conversion system 104, and the trusted third party 106 illustrated in FIG. 1.

The method 1000C may be performed following the customer losing, breaking, upgrading or hard resetting/reformatting a customer device 102 possessing a private key component associated with a customer wallet. The process of restoring a customer wallet (i.e., an old customer wallet) may include creating a new customer wallet and transferring assets from the old customer wallet to the new customer wallet.

Optionally, a new public account key may be generated 1014, e.g., a new public account key 205 at the customer device 102. Since the method 1000C is likely performed following the loss of the customer's private account key 204 (and public account key 205) on an old customer device 102, a new customer device 102 may generate the new public account key 205, e.g., from a new private account key 204.

An index-zero public transaction key may be determined 1016 from the new public account key. In examples, the index-zero public transaction key 207 may be derived at index 0 of the new public account key 205. Alternatively, the index-zero public transaction key 207 may be derived from a new private account key 204 at the customer device 102. Alternatively, the index-zero public transaction key 207 may be derived from an index-zero private transaction key 206, which may be derived from a new private account key 204. In other words, the index-zero public transaction key 207 may be derived via any path in the node tree 200A.

An index-zero transaction address may be generated 1018 from the index-zero public transaction key 207. This may include using a hashing function (e.g., a pubkey script) to create a transaction address that requires a private transaction keys 206 to transact from the transaction address.

One or more private transaction keys 206 may be reconstituted 1020 using one or more first private key components from the trusted third party 106 and one or more second private key components from the currency conversion system 104.

Cryptocurrency in one or more populated transaction addresses may be transferred 1022, using the reconstituted private transaction key(s) 206, into the index-zero transaction address. In other words, cryptocurrency from transaction address(es) associated with an old private account key 204 and/or an old public account key 205 may be transferred into the index-zero transaction address that is associated with a new public account key 205.

The currency conversion system 104 may also communicate 1024 the index-zero transaction address 530 and one or more private key components associated with the index-zero public transaction key to the customer device 102. Optionally, the transfer may be recorded 1026 on a distributed ledger and the customer device 102 may be notified when the transfer has been successfully recorded.

Figure 11:
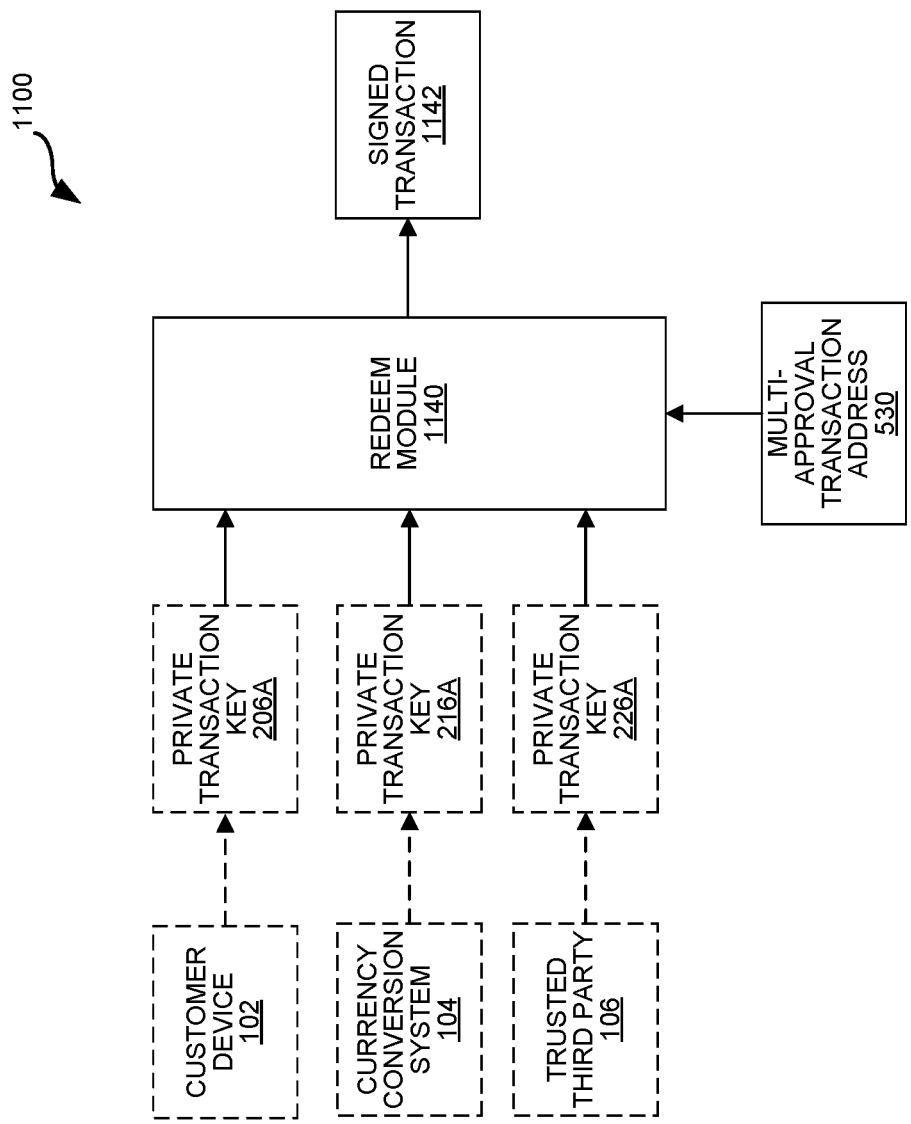
FIG. 11 is a block diagram illustrating an example system for transacting from a multi-approval transaction address.

FIG. 11 is a block diagram illustrating an example system 1100 for transacting from a multi-approval transaction address 530. The system 1100 may be complementary to the currency conversion system 104 illustrated in FIG. 5 and may use M of N (e.g., 2/3) private transaction keys 206A, 216A, 226A to transact from a multi-approval transaction address 530. The system 1100 may be implemented in a customer device 102 or a currency conversion system 104, depending on the application.

Specifically, for routine cryptocurrency transactions, the system 1100 may be implemented in a customer device 102. In examples, the system 1100 may receive a private transaction key 216A (at index X of a private account key 214 for the customer) from the currency conversion system 104. The system 1100 may input the private transaction key 216A and a private transaction key 206A (also at index X of a private account key 204 on the customer device 102) into a redeem module 1140. The redeem module 1140 may verify that both the private transaction key 206A and the private transaction key 216A correspond to the same multi-approval transaction address 530. If the private transaction key 206A and the private transaction key 216A both correspond to the multi-approval transaction address 530, the redeem module 1140 may produce a signed transaction 1142. In other words, the system 1100 may allow cryptocurrency in the multi-approval transaction address 530 to be transferred to another transaction address, e.g., specified by the customer on the customer device 102. The redeem module 1140 may use a redeemScript (e.g., according to BIP16) to produce the signed transaction 1142.

Alternatively, for cryptocurrency transactions involved with restoring a customer wallet, the system 1100 may be implemented in the currency conversion system 104. In examples, the system 1100 may receive a private transaction key 226A (at index Y of a private account key 224 for the customer) from the trusted third party 106. The system 1100 may input the private transaction key 226A and a private transaction key 216A (also at index Y of a private account key 214 on the currency conversion system 104) into the redeem module 1140. The redeem module 1140 may verify that both the private transaction key 216A and the private transaction key 226A correspond to the same multi-approval transaction address 530. If the private transaction key 216A and the private transaction key 226A both correspond to the multi-approval transaction address 530, the redeem module 1140 may produce a signed transaction 1142, e.g., the system 1100 may allow cryptocurrency in the multi-approval transaction address 530 to be transferred to a new multi-approval transaction address 530. The redeem module 1140 may use a redeemScript (e.g., according to BIP16) to produce the signed transaction 1142.

Figure 12:
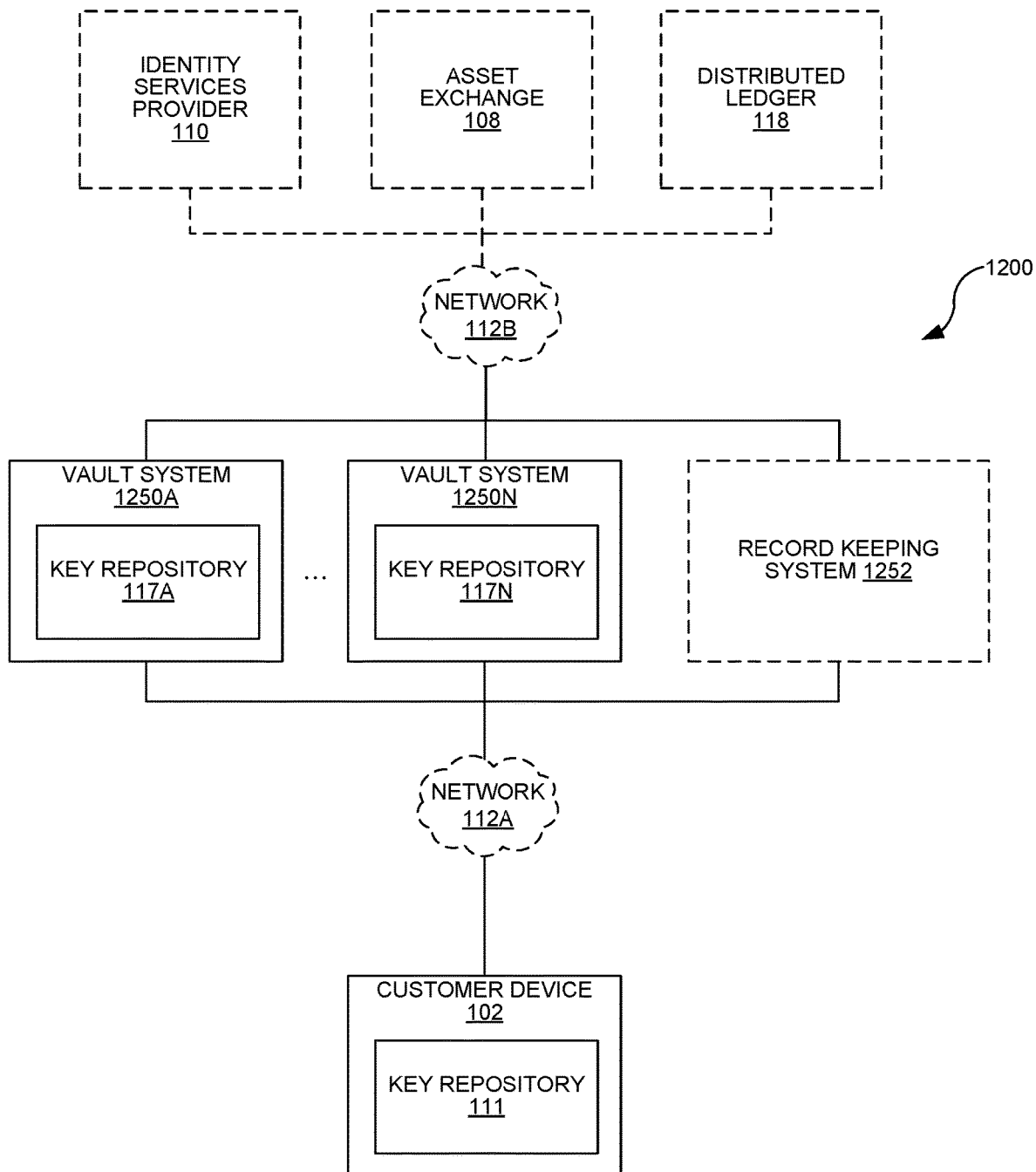
FIG. 12 is a block diagram illustrating another example system for multi-approval cryptocurrency accounts and transactions.

FIG. 12 is a block diagram illustrating another example system 1200 for multi-approval cryptocurrency accounts and transactions. The system 1200 may include a customer device 102, an optional asset exchange 108, an optional identity services provider 110, and an optional distributed ledger 118, each corresponding generally to systems/devices in FIG. 1. The system 1200 may also include N vault systems 1250A-N and an optional record keeping system 1252.

Each of the vault systems 1250 and the record keeping system 1252 may be implemented as any of a mobile computing device, such as a mobile phone, tablet computer, mobile media device, mobile gaming device, laptop computer, or vehicle-based computer, etc.; or a non-mobile computing device such as a dedicated terminal, a public terminal, a kiosk, a server, a cloud server, or a desktop computer. Each vault system 1250 and record keeping system 1252 may include one or more computing devices in one or more housings. Each vault system 1250 and record keeping system 1252 may include at least one processor that executes instructions stored in at least one memory.

Each of the devices in the system 1200 may be communicatively coupled to one or more other devices using at least one network 112 (such as networks 112A-B). In examples, the at least one network 112 includes at least one wired network and/or at least one wireless network. In examples, any combination of wired and wireless networks may be used to couple the customer device 102, the vault systems 1250, and the optional record keeping system 1252 to each other. In examples, the at least one network 112 includes at least one of at least one local area network (LAN), at least one wide area network (WAN), or the Internet. In examples, any combination of local area networks, wide area networks, or the Internet may be used as the at least one network 112 to couple the customer device 102, the vault systems 1250, and the optional record keeping system 1252 to each other.

The system 1200 may use a multi-approval methodology, e.g., multi-party multi-signature (multi-sig) methodology, a multi-party key splitting methodology, or a combination of the two. If multi-sig is used, N private keys may be generated, e.g., at the customer device 102, the vault systems 1250, or some combination. Alternatively, if key splitting is used, a private key may be generated at the customer device 102 or one of the vault systems 1250, after which the private key is split into N key components, each being stored on a different vault system 1250 or customer device 102. Alternatively, the system 1200 may use a combination of multi-sig and key splitting methodologies, e.g., where N private keys are generated (at the customer device 102 and/or vault system(s) 1250) and at least one of the private keys is split into different key components that must be reconstructed before it can be used to sign transactions.

The customer device 102 in the system 1200 may encrypt/decrypt data, generate transaction addresses, transmit completed transactions for recording on the optional distributed ledger 118, generate sweeping transactions during customer wallet recovery, and/or sign transactions. In examples, the customer device 102 in the system 1200 may generate N private keys (or key components) and distribute them to the vault systems 1250 for safe keeping. Alternatively, the customer device 102 in the system 1200 may generate N private keys (or key components) and distribute N−1 of them to N−1 respective vault systems 1250, and store one of the private keys (or key components) locally, e.g., in a key repository 111. The private keys may be hierarchical deterministic (HD) private keys, e.g., private account keys 204 described above. Each of the private keys may be indexed to a particular customer.

During onboarding at a vault system 1250, the customer device 102 may transmit identity data (associated with a customer) to the vault system 1250 and/or an identity services provider 110. As described above, identity data may include personally identifiable information, e.g., a customer's name, date of birth, driver's license number and expiration date, address, phone number(s), email address(es), social security number, image of customer's government issued photo identification, photo of the customer holding the government issued photo identification, employment information, and/or income. The identity data may also include biometric data, such as fingerprint data (e.g., scan(s) of the customer's fingerprint(s)), retinal scan data (e.g., image(s) of the customer's retina(s)), facial recognition data (e.g., image(s) of the customer's face), and/or voice data (e.g., recording(s) of the customer's voice). Instead of raw biometric data (e.g., images and/or recordings), the application may transmit only processed data derived from the raw biometric data, e.g., image features, voice features, etc. In addition to identity data, the customer device 102 may also transmit a private key (or key component) for the vault system 1250 to store, e.g., in its key repository.

It should be noted that alternative onboarding configurations are possible in which (1) the customer device 102 transmits identity data to the vault system 1250; and (2) the vault system 1250 generates a private key (or key component) associated with the customer device 102 (instead of receiving it from the customer device 102). Whether the vault system 1250 receives a private key (or key component) from the customer device 102 or the vault system 1250 generates the private key (or key component), the vault system 1250 may associate the private key (or key component) with the customer at the vault system 1250.

Furthermore, the onboarding process performed between the customer device 102 and a vault system 102 may include recording a transaction indicating the generation and/or transmission of the private key (or key component). In examples, the customer device 102 or vault system 1250 that generates the private key (or key component) may transmit a hash of the private key (or key component) to the distributed ledger (or a node implementing the optional distributed ledger 118) to serve as proof of the private key (or key component) creation. In examples, a single transaction may serve as proof of the creation of all N private keys (or key components).

Furthermore, an application programming interface (API) may be distributed among the customer device 102 and vault systems 1250. In examples, the customer device 102 may prompt for and receive user input that specifies how many and which of the vault systems 1250 (and optionally, the customer device 102 itself) the customer would like to store their private keys (or key components). In examples, a customer may select any number (e.g., N=1-100) of vault systems 1250 to store private keys (or key components) and specify that all of the private keys (or key components) are required to perform an action (e.g., encryption/decryption, signing a transaction, etc.), i.e., M=N. Alternatively, a customer may select any number (e.g., N=1-100) of vault systems 1250 to store private keys (or key components) and specify that less than all of the keys (or key components) are required to perform the action, i.e., M<N. Preferably both M and N are greater than 1.

Optionally, the customer may tailor the configuration used based on security, reliability, cost, and/or any other concerns. In one example, a customer may require 3 out of 4 private keys (or key components) to perform an action in the personal account (e.g., (M=3)<(N=4)) with 1 of the 4 private keys (or key components) initially stored on the customer device 102 itself. Such a configuration may be used for an account that the customer wants to retain a high degree of control, e.g., since (1) more people would have to collude to steal funds from the account; and (2) all the private keys (or key components) don't reside outside of the customer device 102. In other words, a 3/4 configuration may reduce the likelihood of theft of account funds (e.g., compared to a 2/4 or 2/5 configuration and/or a configuration that does not initially store a private key (or key component) on the customer device 102 itself).

In another example, a customer may require 2 out of 5 private keys (or key components) to perform an action in the personal account (e.g., (M=2)<(N=5)). Such a configuration may be used when the customer is concerned about the private keys (or key components) stored at vault systems 1252 getting lost. In other words, a 2 out of 5 configuration may increase reliability and reduce fail-over concerns associated with losing the customer's data (e.g., compared with a 2/2 or 2/3 configuration).

Additionally, a customer may have multiple accounts, e.g., personal, business, family, etc. Accordingly, the customer may tailor the digital security differently for two different accounts. For example, the customer may only require 2 out of 3 private keys (or key components) to perform an action in the personal account (e.g., (M=2)<(N=3)), while requiring 4 out of 4 private keys (or key components) to perform an action in the business account (e.g., (M=4)=(N=4)). Furthermore, a customer may choose to initially store one of the N private keys (or key components) on the customer device 102 for one account, while not initially storing any of the N private keys (or key components) locally for another account.

Therefore, if desired, the customer can tailor/select the following based on security, reliability, cost, and/or any other considerations: (1) the value of M and/or N; and/or (2) the particular storage locations for the N private keys (or key components).

Once the customer has selected how many and which of the vault systems 1250 (and optionally, the customer device 102 itself) the customer would like to store the N private keys (or key components), the customer device 102 may then communicate with the selected vault systems 1250 (e.g., during onboarding and afterwards) via the API. Furthermore, the customer device 102 and/or the vault systems 1250 may use the API to generate the private keys (or key components) associated with the customer.

The optional record keeping system 1252 may store a record of which vault systems 1250 store private keys (or key components) for a given customer. The record keeping system 1252 may be co-located with one of the vault systems 1250. In examples, the record keeping system 1252 may be located on a currency conversion system 104 that may or may not also be a vault system 1250 storing private keys (or key components) for customers.

The system 1200 may include N vault systems 1250A-N, where N is greater than or equal to one. Each vault system 1250 may maintain a key repository 117A-N for storing keys (e.g., a database and/or secure memory), each being associated with a customer. The key repository 117 for each vault system 1250 may be physically located in the same or different device(s) that perform the other functionality of the respective vault system 1250.

Each vault system 1250 may be owned and/or operated by a different trusted third party 106 (e.g., a financial institution such as a credit union or a bank), currency conversion system 104 (e.g., a bank or a non-bank financial institution that converts currency into another form of currency), corporation, individual, etc. In examples, the vault systems 1250 may each transmit a private key (or key component) to the customer device 102 (upon request from the customer device 102) for generating transaction addresses or wallet recovery, but the vault systems 1250 preferably do not generate transaction addresses, sign transactions, or transmit transactions to the optional distributed ledger 118 themselves. In such examples, the vault systems 1250 may not be required to possess a money transmitter license under applicable rules and regulations. Alternatively, however, configurations are possible where one or more of the vault systems 1250 generate transaction addresses, sign transactions, transmit transactions, and/or possess a money transmitter license.

Following onboarding with at least one vault system 1250, the customer device 102 (e.g., the API on the customer device 102) may transmit a key request for a private key (or key component) to one or more of the vault systems 1250. In one configuration, the customer device 102 may transmit the key request to a plurality (e.g., N) of vault systems 1250. Alternatively, the customer device 102 may transmit the request to N−1 vault systems 1250, e.g., if the customer device 102 stores one of the private keys (or key components) locally. In examples, the vault systems 1250 may charge the customer a fixed amount for storing and/or transmitting a private key (or key component) to the customer device 102.

The vault systems 1250 and/or identity services provider 110 may use an authentication protocol to identify the customer transmitting the key request. In a first authentication configuration, the vault systems 1250 store identity data directly. In this configuration, each key request may also include identity data that each vault system 1250 can use to identify the private key (or key component) associated with the requesting customer. Once the identity data for the customer is verified and a private key (or key component) is identified, the vault system 1250 may transmit the identified private key (or key component) to the customer device 102.

In a second authentication configuration, the identity services provider 110 (not the vault systems 1250) may store identity data of the customer. The second configuration may be preferable to the first because the vault systems 1250 preferably would not implement authentication systems, implement AML/KYC for the customers, and/or store identity data of the customers. Optionally, the customer wallet providers may implement AML/KYC for the customers.

In the second authentication configuration, each key request transmitted by the customer device 102 may have a corresponding identity request that includes identity data (and is transmitted to the identity services provider 110). Upon receiving the identity request from the customer device 102, the identity services provider 110 may authenticate the customer based on the identity data in the identity request, after which the identity services provider 110 may transmit some information (e.g., customer ID) to the vault system 1250. In examples, the identity services provider 110 may transmit an authentication successful message indicating that the customer has been authenticated with the identity services provider 110. In response to receiving a customer ID and/or an authentication successful message, the vault system 1250 may transmit the private key (or key component) associated with the customer to the customer device 102.

Once the customer device possesses at least M of N private keys (or key components), the customer device 102 may perform at least one action based on (e.g., that requires) at least M of N private keys (or key components). Examples of this action may include: (1) encrypting or decrypting data using M private keys (or key components); (2) generating a transaction address based on the N private keys (or key components); and/or (3) signing a transaction using M private keys (or key components), e.g., a sweeping transaction during customer wallet recovery. In key splitting configurations, the action may include the customer device 102 reconstructing a private key from at least M (or N) private key components. Furthermore, while at least M private keys (or key components) may not be required, the customer device 102 may also generate a sweeping transaction during customer wallet recovery and/or transmit transactions to the optional distributed ledger 118, e.g., to a node implementing the optional distributed ledger 118.

In the configuration where the private keys (or key components) are used to encrypt or decrypt data, the customer device 102 and/or at least one vault system 1250 may generate N private keys (or key components). In a multi-sig configuration, N private keys may be generated at the customer device 102 and/or the at least one vault system 1250. In a key splitting configuration, a single private key may be generated (at the customer device 102 or the at least one vault system 1250) and split into N private key components. Each of the different N private keys (or key components) may be distributed to a different of the at least one vault system 1250 and/or the customer device 102 itself, e.g., during an onboarding process performed between the different vault systems 1250 and the customer device 102. Thereafter, the customer device 102 may request and receive at least M of the N private keys (or key components), e.g., the M private keys (or key components) may be transmitted from the at least one vault system 1250 following authentication. Optionally, the customer device 102 may store one of the N private keys (or key components) locally and would only distribute N−1 private keys (or key components) to N−1 respective vault systems 1250.

Authentication between a respective vault system 1250 and the computing device 102 may be performed according to any of the configurations previously described. In examples, the vault systems 1250 store identity data directly, and each key request may also include identity data that each vault system 1250 can use to identify the private key (or key component) associated with the requesting customer. Alternatively, an identity services provider 110 (not the vault systems 1250) may store identity data of the customer, and the identity services provider 110 may transmit an indication of authentication to a vault system 1250 based on an authentication process performed between the identity services provider 110 and the customer device 102.

Once the customer device 102 possesses at least M of N private keys (or key components), the customer device 102 may identify data to be encrypted and/or decrypted, e.g., based on user input and/or a previous indication. Then, the customer device 102 may encrypt and/or decrypt data using at least M of N private keys (or key components).

In multi-sig examples, encrypting data may require all N private keys (or N keys derived from the N private keys) and decrypting data may require only M private keys (or M keys derived from M private keys). In key splitting examples, the customer device 102 may reconstruct a single private key from the at least M of N key components before encrypting and/or decrypting the data using the reconstructed private key.

In examples, the data being encrypted and/or decrypted may be a non-monetary cryptographic token (e.g., related to identity data of the customer), a security token (e.g., representing ownership of an asset), an audio file, a video file, a text file, or any other digital object, file, and/or token. In examples, the encrypting and/or decrypting may be part of a federated service in which vault systems 1250 each receive a fee for storing a private key (or key component) for a customer and/or transmitting the private key (or key component) to the customer. Optionally, the customer device 102 may delete at least one (e.g., all) of the locally-stored private keys (or key components) following encryption and/or decryption of the data.

In the configuration where the private keys (or key components) are used to generate a transaction address based on the N private keys (or key components), the customer device 102 and/or at least one vault system 1250 may generate N private keys (or key components) and distribute them among the customer device 102 and/or the at least one vault system 1250. In a key splitting configuration, the customer device 102 may split a single private key into N private key components before distribution. Optionally, the customer device 102 may store one of the N private keys (or key components) locally and would only distribute N−1 private keys (or key components) to N−1 respective vault systems 1250.

In multi-sig examples, the customer device 102 may generate a transaction address after it acquires or derives N public transaction keys (or key components). In multi-sig examples, a respective public transaction key may be derived from each of the N private keys (or key components), where each public transaction key is derived: (1) directly from a private account key received from a vault system 1250 or locally-stored at the customer device 102; and/or (2) from a public account key that is derived from a private account key received from a vault system 1250 or locally-stored at the customer device 102. As described above, receiving a private key from a vault system 1250 may include a direct authentication process (between customer device 102 and vault system 1250) or an indirect authentication process (performed via an identity services provider 110). Generating the transaction address may include using a multi-approval hashing module 528 operating on the customer device 102, e.g., utilizing pay-to-script-hash (P2SH), as defined in BIP16, or other pubkey script as described in connection with FIG. 5. In addition to the public transaction keys, the multi-approval hashing module 528 may optionally receive a multi-approval condition 529, e.g., specifying that M of N private keys are required to sign transactions from the generated transaction address. The N public transaction keys (along with a multi-approval condition 529) may then be used as input to the multi-approval hashing module 528 to produce a transaction address.

In key splitting examples, a public transaction key may be derived from a single private key that is reconstructed from M (or N) private key components. After the public transaction key is derived, a transaction address may be generated based on the public transaction key.

After the transaction address is generated, funds may be received in the generated transaction address. At that point, the customer device 102 may transmit the sweeping transaction to the optional distributed ledger 118 (or one of the nodes implementing the optional distributed ledger 118) for recording on the optional distributed ledger 118.

In the configuration where the private keys (or key components) are used to sign a transaction using M private keys (or key components), the customer device 102 and/or at least one vault system 1250 may generate N private keys (or key components) and distribute them among the customer device 102 and/or the at least one vault system 1250. In a key splitting configuration, the customer device 102 may split a single private key into N private key components before distribution. Following an onboarding process performed between the different vault systems 1250 and the customer device 102, the customer device 102 may receive at least M of the N private keys (or key components), e.g., including a direct authentication process (between customer device 102 and vault system 1250) or indirect authentication process (performed via an identity services provider 110). Optionally, the customer device 102 may store one of the N private keys (or key components) locally and would only distribute N−1 private keys (or key components) to N−1 respective vault systems 1250.

In multi-sig examples, once the customer device 102 possesses the required M of N private keys, it may sign a transaction from a transaction address requiring M of N private keys. Signing a transaction may include using a redeem module 1140 operating on the customer device 102. In examples, the redeem module may utilize a redeemScript (e.g., according to BIP16) to produce the signed transaction 1142, e.g., as described in connection with FIG. 11. In examples, a respective private transaction key may be derived from each of the M private account keys (or key components), where each private transaction key is derived from a respective private account key received from a vault system 1250 and, optionally, locally-stored at the customer device 102. The M private transaction keys (along with the transaction address) may be used as input to the redeem module 1140 to produce a signed transaction. In key splitting examples, a private transaction key may be derived from a single private account key reconstructed from M of N private key components, after which a signed transaction may be generated based on the private transaction key and transaction address.

In examples, the customer device 102 may sign a sweeping transaction to restore a customer account or wallet, e.g., following the customer device 102 being lost, broken, upgraded or hard reset/reformatted. The sweeping transaction may transfer all funds from at least one transaction address (e.g., at least one unspent transaction output (UTXO)) in the customer wallet to a new transaction address. In a first example, the customer device 102 may generate and sign the sweeping transaction using at least M private keys (or a private key reconstructed from at least M key components). The customer device 102 may transmit the fully-signed sweeping transaction to the optional distributed ledger 118 (or one of the nodes implementing the optional distributed ledger 118) for recording on the optional distributed ledger 118.

In a second example, (1) the customer device 102 requests an external entity (e.g., a vault system 1250 and/or a currency conversion system 104) generate a sweeping transaction; (2) the external entity generates and optionally signs the sweeping transaction; (3) the external entity transmits the sweeping transaction to the customer device 102, which optionally signs it; (4) the customer device 102 iteratively transmits the sweeping transaction to different vault system(s) 1250 for signing (and receives the transaction back from the respective vault system(s) 1250) until the sweeping transaction has been signed by at least M of N private keys; and (5) the customer device 102 transmits the fully-signed sweeping transaction to the optional distributed ledger 118 (or one of the nodes implementing the optional distributed ledger 118) for recording on the optional distributed ledger 118.

Figure 13:
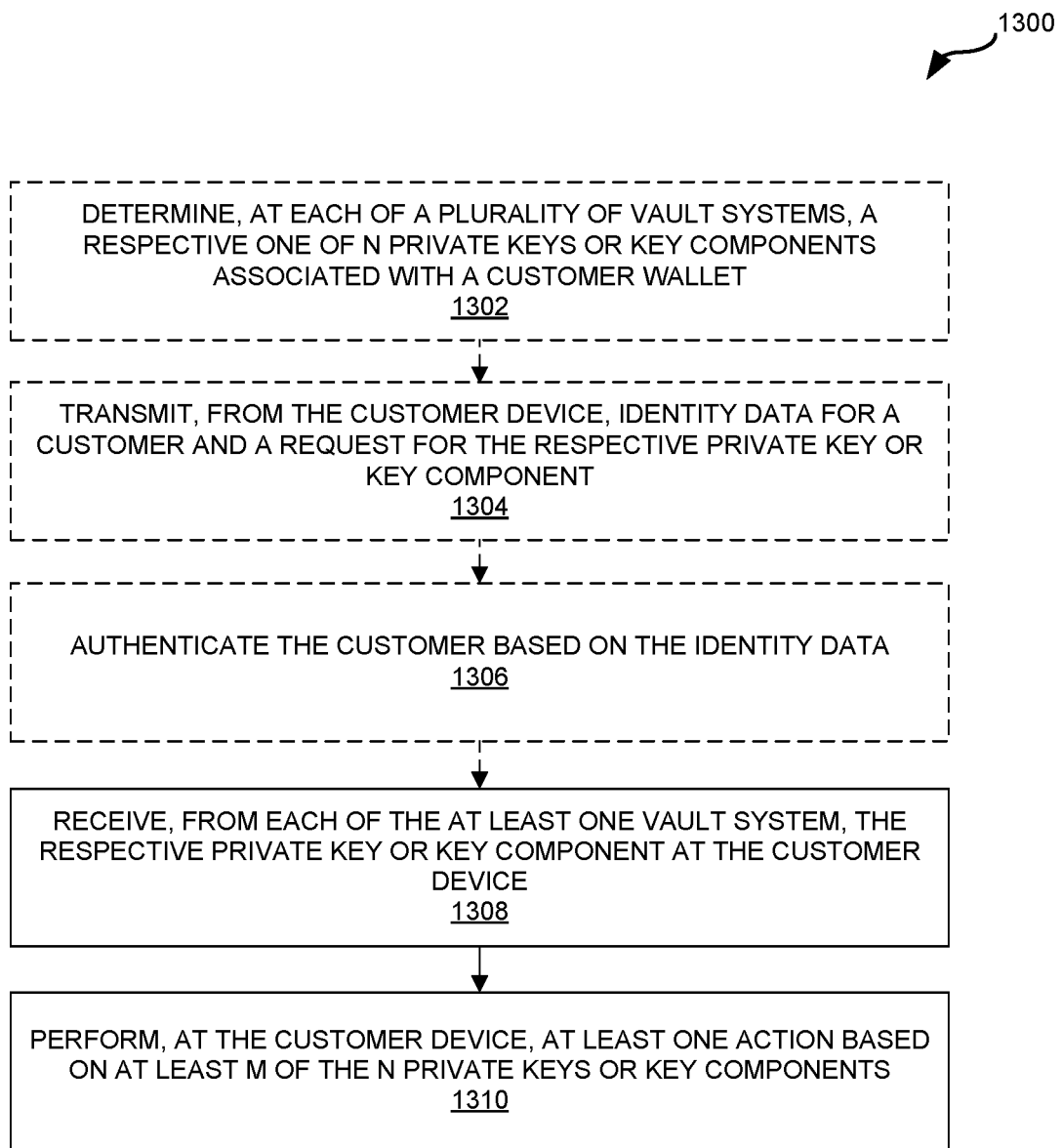
FIG. 13 is a flow diagram illustrating an example method for performing an action based on at least M of N private keys (or key components)

FIG. 13 is a flow diagram illustrating an example method 1300 for performing an action based on at least M of N private keys (or key components), e.g., encrypting and/or decrypting data, generating a transaction address, signing a transaction, etc. The method 1300 may be performed by the customer device 102 and/or at least one vault system 1250 in the system 1200 of FIG. 12.

Optionally, each of a plurality of vault systems 1250 may determine 1302 a respective one of N private keys (or key components) associated with a customer wallet. Each of the N private keys (or key components) may be generated at the customer device 102 and/or a respective vault system 1250. If generated at the customer device 102, each of the plurality of vault systems 1250 may receive a respective private key (or key component) from the customer device 102, e.g., during a respective onboarding process. Optionally, the customer device 102 may store one of the N private keys (or key components) locally and would only distribute N−1 private keys (or key components) to N−1 respective vault systems 1250. Alternatively, each of the N private keys (or key components) may be stored on a different one of N vault system 1250. Therefore N or N−1 private keys (or key components) may be stored on the vault systems 1250 for safekeeping.

In examples, a transaction indicating the generation and/or transmission of the private key(s) (or key component(s)) may be recorded (or transmitted for recording) on an optional distributed ledger 118 by the device/system generating the private key (or key component). In examples, the customer device 102 or vault system 1250 that generates the private key (or key component) may transmit a hash of the private key (or key component) to the distributed ledger (or a node implementing the optional distributed ledger 118) to serve as proof of the private key (or key component) creation. In examples, a single transaction may serve as proof of the creation of all N private keys (or key components).

Optionally, the customer device 102 may transmit 1304 identity data for a customer and a request for the respective private key (or key component). In a first authentication configuration, the vault systems 1250 store identity data directly. In the first authentication configuration, each key request may also include identity data that each vault system 1250 can use to the customer. In a second configuration, the customer device 102 may transmit identity data to the identity services provider 110 (not the vault systems 1250) for authentication, after which the identity services provider 110 may communicate with the vault systems 1250. The identity data and/or the key request may be transferred using a secure transfer protocol.

Optionally, the customer may be authenticated 1306 based on the identity data. In the first authentication configuration, the vault systems 1250 store identity data for the customer during onboarding and subsequently compare it to the received identity data for the customer. In the second authentication configuration, the identity services provider 110 may compare the received identity data with previously-stored identity data and notify the vault systems 1250 about whether the customer has been authenticated.

The customer device 102 may also receive 1308, from each of the plurality of vault systems 1250, a respective private key (or key component), e.g., using a secure transfer protocol. In configurations where customer authentication is required, each vault system 1250 may only transmit the respective private key (or key component) upon successful authentication.

The customer device 102 may also perform 1310 at least one action based on at least M of the N private keys (or key components). In examples, the action requires the at least M of N private keys (or key components) and/or at least M of N keys derived from the at least M of N private keys (or key components). Examples of this action may include: (1) encrypting or decrypting data using M private keys (or key components); (2) generating a transaction address based on the N private keys (or key components); and/or (3) signing a transaction using at least M of N private keys (or key components), e.g., a sweeping transaction during customer wallet recovery. These actions are described in more detail below.

In key splitting configurations, the action may include the customer device 102 reconstructing a private key from at least M private key components. Furthermore, while M private keys (or key components) may not be required for it, the customer device 102 may also generate a sweeping transaction during customer wallet recovery and/or transmit transactions to the optional distributed ledger 118, e.g., to a node implementing the optional distributed ledger 118.

Figure 14:
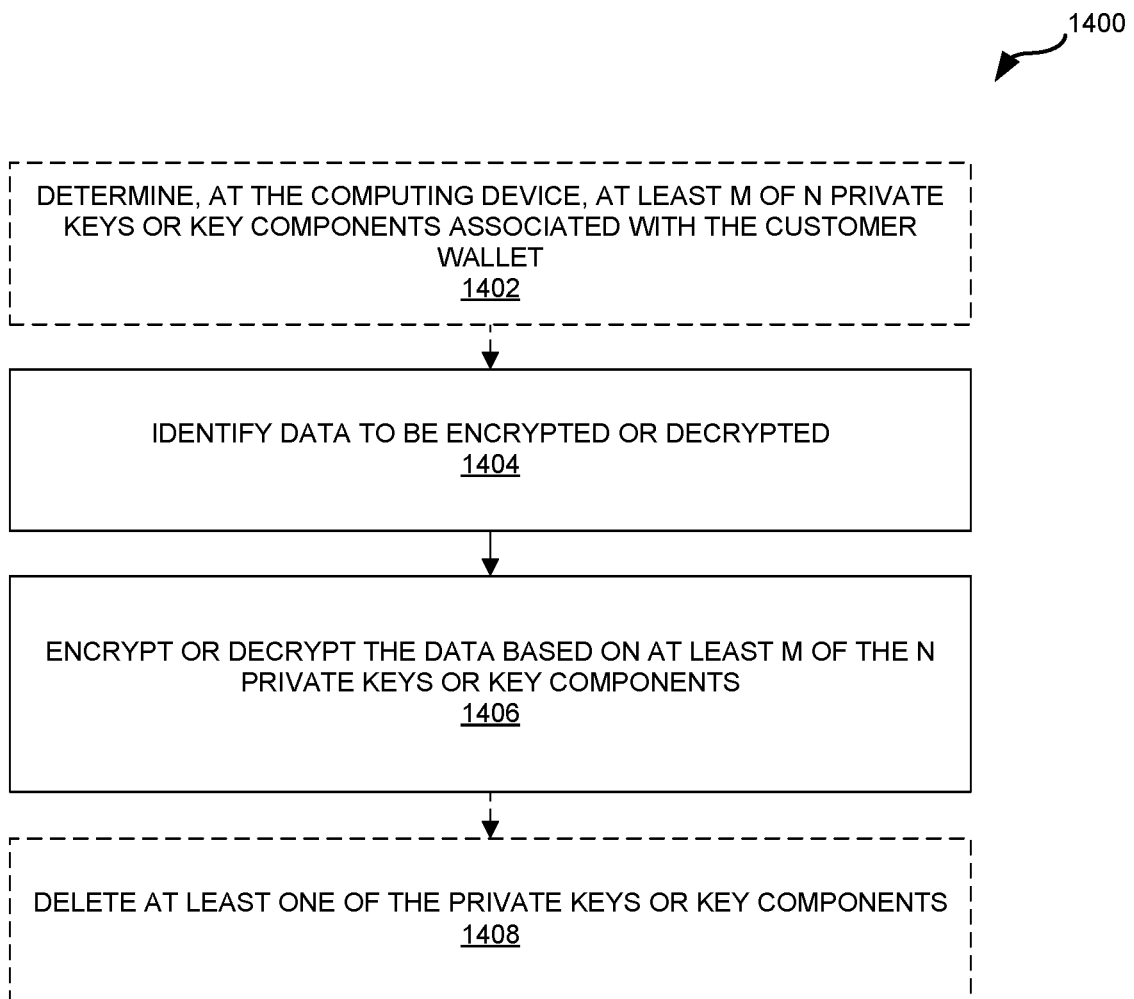
FIG. 14 is a flow diagram illustrating an example method for encrypting or decrypting data based on at least M of N private keys (or key components)

FIG. 14 is a flow diagram illustrating an example method 1400 for encrypting or decrypting data based on at least M of N private keys (or key components). The method 1400 may be performed by at least the customer device 102 in the system 1200 of FIG. 12. The method 1400 may be an example of the action performed in step 1310 of the method 1300 illustrated in FIG. 13.

The customer device 102 may first identify 1404 the data to be encrypted and/or decrypted. Identifying the data may include the customer device 102 receiving user input indicating the data and/or utilizing a previous indication of the data to be encrypted and/or decrypted. Furthermore, any suitable way of identifying the data may be utilized.

The customer device 102 may then encrypt 1404 or decrypt the identified data based on at least M of N private keys (or key components). In a multi-sig configuration, this may include encrypting or decrypting the data using the at least M private keys (at least one of which are received from a vault system 1250) or at least M keys that are respectively derived from the M private keys. In the multi-sig configuration, encrypting data may require all N private keys (or N keys derived from the N private keys) and decrypting data may require only M private keys (or M keys derived from M private keys). In a key splitting configuration, the customer device 102 may reconstruct a single private key from the at least M key components (at least one of which are received from a vault system 1250) before encrypting and/or decrypting the data using the reconstructed private key.

Optionally, the customer device 102 may also delete 1406 at least one of the private keys (or key components). In examples, the customer device 102 may only delete the private keys (or key components) that were received from vault systems 1250, e.g., but not a private key (or key component) that was optionally initially stored at the customer device 102.

Figure 15:
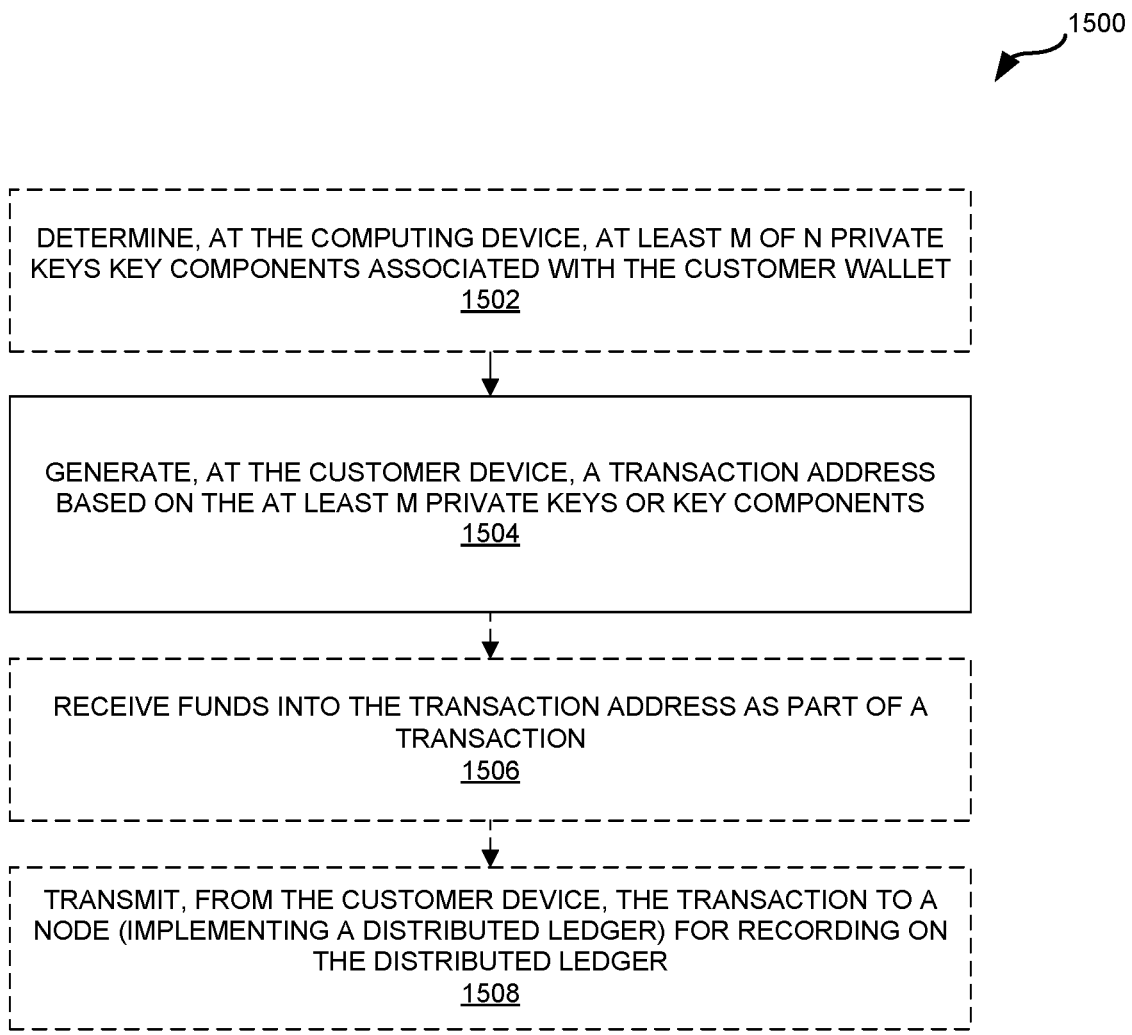
FIG. 15 is a flow diagram illustrating an example method for generating a transaction address at a customer device.

FIG. 15 is a flow diagram illustrating an example method 1500 for generating a transaction address at a customer device 102. The method 1500 may be performed by at least the customer device 102 in the system 1200 of FIG. 12. The method 1500 may be an example of the action performed in step 1310 of the method 1300 illustrated in FIG. 13.

Optionally, the customer device 102 may determine 1502 at least M of N private keys (or key components). This may include receiving at least some of the at least M of N private keys (or key components) from respective vault systems 1250 and, optionally, identifying a locally-stored private key (or key component) that was not previously stored on a vault system 1250. Alternatively, all of the N private keys (or key components) may be stored across the vault systems 1250, e.g., one private key (or key component) per vault system 1250.

The customer device 102 may also generate 1504 a transaction address based on the at least M private keys (or key components). In multi-sig examples, a different public transaction key may be derived from each of the N private keys. Generating the transaction address may include using a multi-approval hashing module 528 operating on the customer device 102, e.g., utilizing pay-to-script-hash (P2SH), as defined in BIP16, or other pubkey script as described in connection with FIG. 5. Optionally, a multi-approval condition 529 may be specified, e.g., specifying that at least M of N private keys are required to sign a transaction from the generated transaction address. The N public transaction keys (along with the optional multi-approval condition 529) may then be used as input to the multi-approval hashing module 528 to produce a transaction address. In multi-sig examples, at least M of the N private keys may be required to subsequently transact from the generated transaction address. M and/or N may be selected based on user input at the customer device 102. In examples, M<N or M=N.

In key splitting examples, a single private key may be reconstructed from the at least M private key components, and a public transaction key may be derived from the reconstructed private key. The public transaction key may be used as input (e.g., to a hashing module) to generate a transaction address, e.g., without a multi-approval condition. In examples, only the reconstructed private key may be required to transact from the generated transaction address.

Optionally, the customer device 102 may also receive 1506 funds into the transaction address as part of a transaction. Optionally, the customer device 102 may also transmit the completed transaction to the optional distributed ledger 118 for recording. More specifically, the customer device 102 may transmit the completed transaction to a node implementing the optional distributed ledger 118 for recording on the optional distributed ledger 118. Optionally, this may include a small fee paid by the customer to the node implementing the optional distributed ledger 118.

Figure 16A:
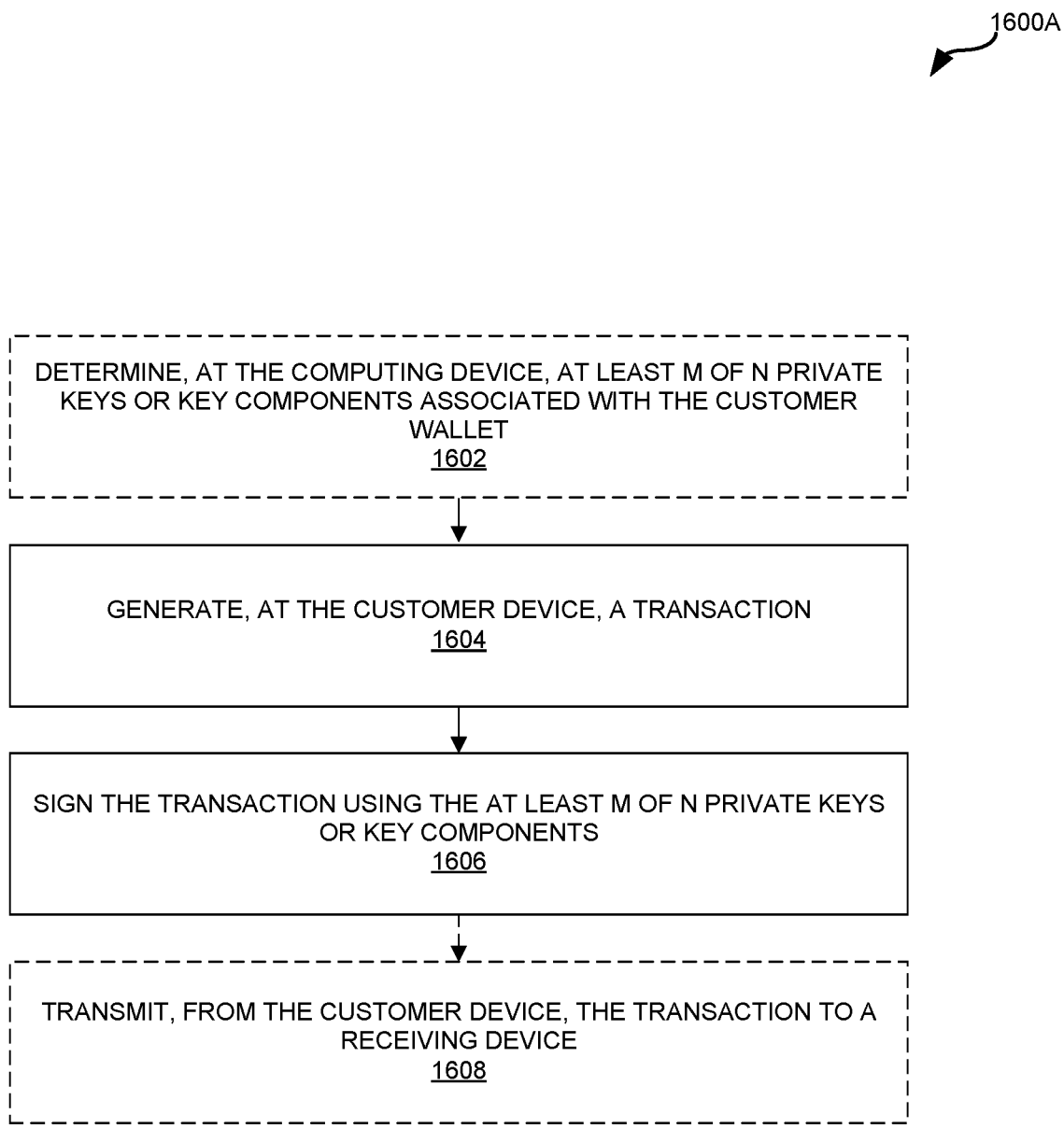
FIG. 16A is a flow diagram illustrating an example method for signing a transaction using at least M of N private keys (or key components)

FIG. 16A is a flow diagram illustrating an example method 1600A for signing a transaction using at least M of N private keys (or key components). The method 1600A may be performed by at least the customer device 102 (and optionally at least one vault system 1250) in the system 1200 of FIG. 12. The method 1600A may be an example of the action performed in step 1310 of the method 1300 illustrated in FIG. 13.

Optionally, the customer device 102 may determine 1602 at least M of N private keys (or key components). This may include receiving at least some of the at least M of N private keys (or key components) from respective vault systems 1250 and, optionally, identifying a locally-stored private key (or key component) that was not previously stored on a vault system 1250. Alternatively, all of the N private keys (or key components) may be stored across the vault systems 1250, e.g., one private key (or key component) per vault system 1250.

The customer device 102 may generate 1604 a transaction. The transaction may include at least one input address, at least one output address, a timestamp, an amount of an asset being transferred, and/or description of the asset being transferred, etc. The transaction may transfer cryptocurrency from at least one generated transaction address. Alternatively, the transaction may represent an asset transfer via a security token. Alternatively, the transaction may be a sweeping transaction, e.g., that transfers all funds from at least one transaction address (e.g., at least one unspent transaction output) in the customer wallet to a new transaction address. A sweeping transaction may be used to restore a customer account or wallet, e.g., following a customer device 102 being lost, broken, upgraded or hard reset/reformatted.

The transaction may also be signed 1606 using the at least M of N private keys (or key components). In a first signing configuration, the customer device 102 may sign the transaction using the at least M of N private keys (or key components) that are received from respective vault systems 1250 and, optionally, a locally-stored private key (or key component) that was not previously stored on a vault system 1250. Signing a transaction may include using a redeem module 1140 operating on the customer device 102. In examples, the redeem module may utilize a redeemScript (e.g., according to BIP16) to produce the signed transaction 1142, e.g., as described in connection with FIG. 11. In multi-sig examples, a respective private transaction key may be derived from each of the at least M of N private account keys received from a vault system 1250 and, optionally, locally-stored at the customer device 102. The at least M of N private transaction keys (along with the transaction address) may be used as input to the redeem module 1140 to produce a signed transaction. In key splitting examples, a private transaction key may be derived from a single private account key reconstructed from at least M of N private key components, after which a signed transaction may be generated based on the private transaction key and transaction address.

In a second signing configuration, the customer device 102 may iteratively transmit the generated transaction to different vault system(s) 1250 for signing (and receive the transaction back from the respective vault system(s) 1250) until the generated transaction has been signed by at least M of N private keys.

Optionally, the customer device 102 may transmit 1608 the (fully-signed) transaction to a receiving device, e.g., a device receiving funds as part of the transaction. If the transaction is a sweeping transaction, the customer device 102 may instead transmit the sweeping transaction to an optional distributed ledger 118 (e.g., to a node implementing an optional distributed ledger 118) for recording on the optional distributed ledger 118.

Figure 16B:
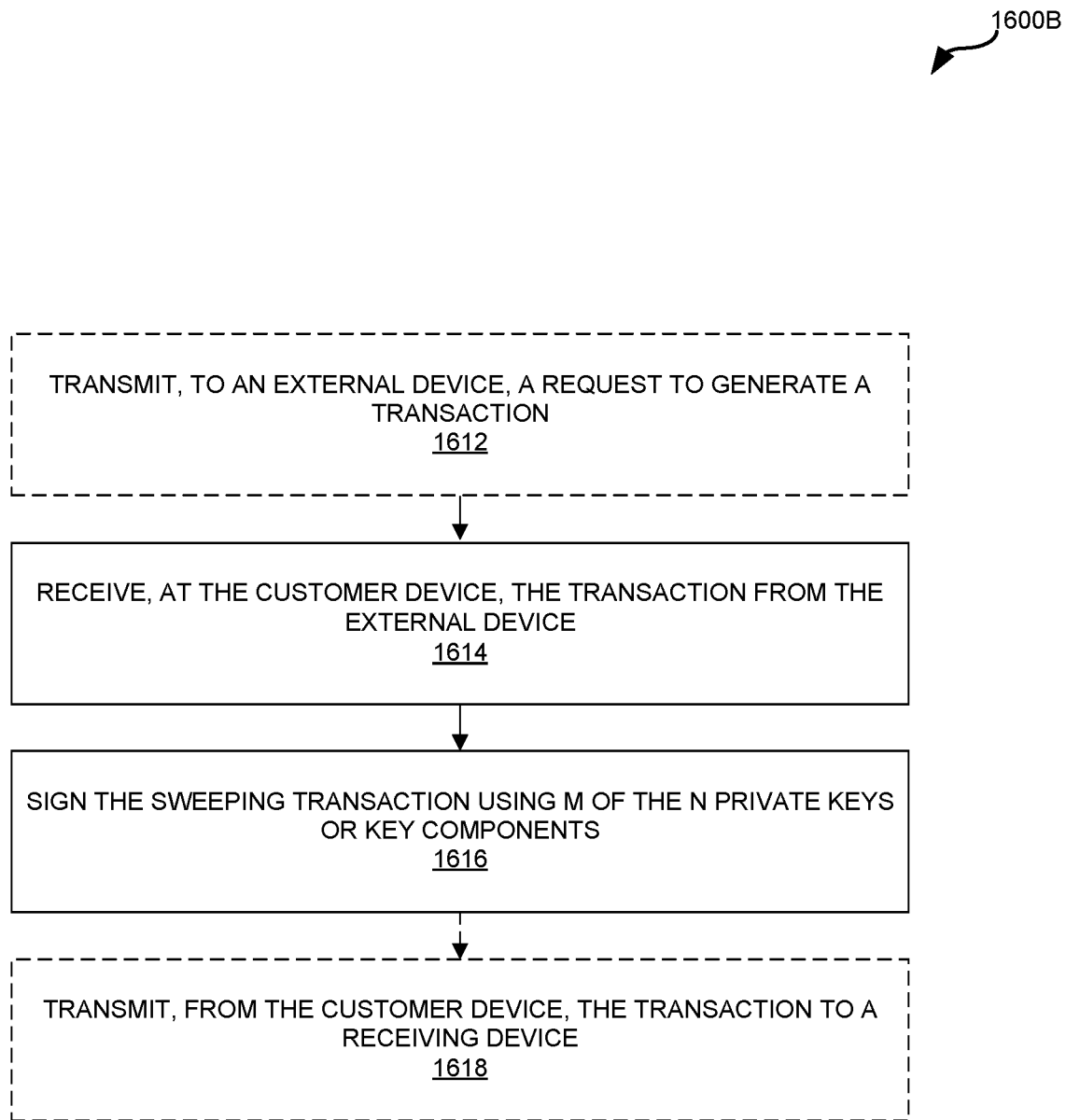
FIG. 16B is a flow diagram illustrating an example method for signing a transaction using at least M of N private keys (or key components)

FIG. 16B is a flow diagram illustrating an example method 1600B for signing a transaction using at least M of N private keys (or key components). The method 1600B may be performed by at least the customer device 102 (and optionally at least one vault system 1250) in the system 1200 of FIG. 12. The method 1600B may be an example of the action performed in step 1310 of the method 1300 illustrated in FIG. 13.

The customer device 102 may transmit 1612, to an external device, a request to generate a transaction. The external device may be a vault system 1250 and/or a currency conversion system 104. The request may include at least one input transaction address, at least one output transaction address, a timestamp, an amount of an asset being transferred, and/or description of the asset being transferred, etc.

The customer device 102 may receive 1614 a transaction from the external device. The transaction may include at least one input address, at least one output address, a timestamp, an amount of an asset being transferred, and/or description of the asset being transferred, etc. The transaction may transfer funds from at least one generated transaction address. Alternatively, the transaction may represent an asset transfer via a security token. Alternatively, the transaction may be a sweeping transaction, e.g., that transfers all funds from at least one transaction address (e.g., at least one unspent transaction output) in the customer wallet to a new transaction address. A sweeping transaction may be used to restore a customer account or wallet, e.g., following a customer device 102 being lost, broken, upgraded or hard reset/reformatted.

The transaction may also be signed 1616 using the at least M of N private keys (or key components). In a first signing configuration, the customer device 102 may sign the transaction using private keys (or key components) that are received from respective vault systems 1250 and, optionally, a locally-stored private key (or key component) that was not previously stored on a vault system 1250. Signing a transaction may include using a redeem module 1140 operating on the customer device 102. In examples, the redeem module may utilize a redeemScript (e.g., according to BIP16) to produce the signed transaction 1142, e.g., as described in connection with FIG. 11. In multi-sig examples, a respective private transaction key may be derived from each of the at least M of N private account keys received from a vault system 1250 and, optionally, locally-stored at the customer device 102. The at least M of N private transaction keys (along with the transaction address) may be used as input to the redeem module 1140 to produce a signed transaction. In key splitting examples, a private transaction key may be derived from a single private account key reconstructed from at least M of N private key components, after which a signed transaction may be generated based on the private transaction key and transaction address.

In a second signing configuration, the customer device 102 may iteratively transmit the generated transaction to different vault system(s) 1250 for signing (and receive the transaction back from the respective vault system(s) 1250) until the generated transaction has been signed by at least M of N private keys. In examples, the customer device 102 may transmit the transaction to a first vault system 1250 for signing, receive the transaction (signed by the first vault system 1250) from the first vault system 1250, then send the transaction to a second vault system 1250 and receive the transaction (signed by the second vault system 1250) from the second vault system 1250, etc. Optionally, the external device (e.g., vault system 1250) that generates the transaction may sign the transaction using a private key (or key component) before sending the transaction to the customer device 102. Also optionally, the customer device 102 may sign the transaction using a locally-stored private key (or key component) that was not previously stored on a vault system 1250.

Optionally, the customer device 102 may transmit 1618 the (fully-signed) transaction to a receiving device, e.g., a device receiving funds as part of the transaction. If the transaction is a sweeping transaction, the customer device 102 may instead transmit the sweeping transaction to an optional distributed ledger 118 (e.g., to a node implementing an optional distributed ledger 118) for recording on the optional distributed ledger 118.

Figure 16C:
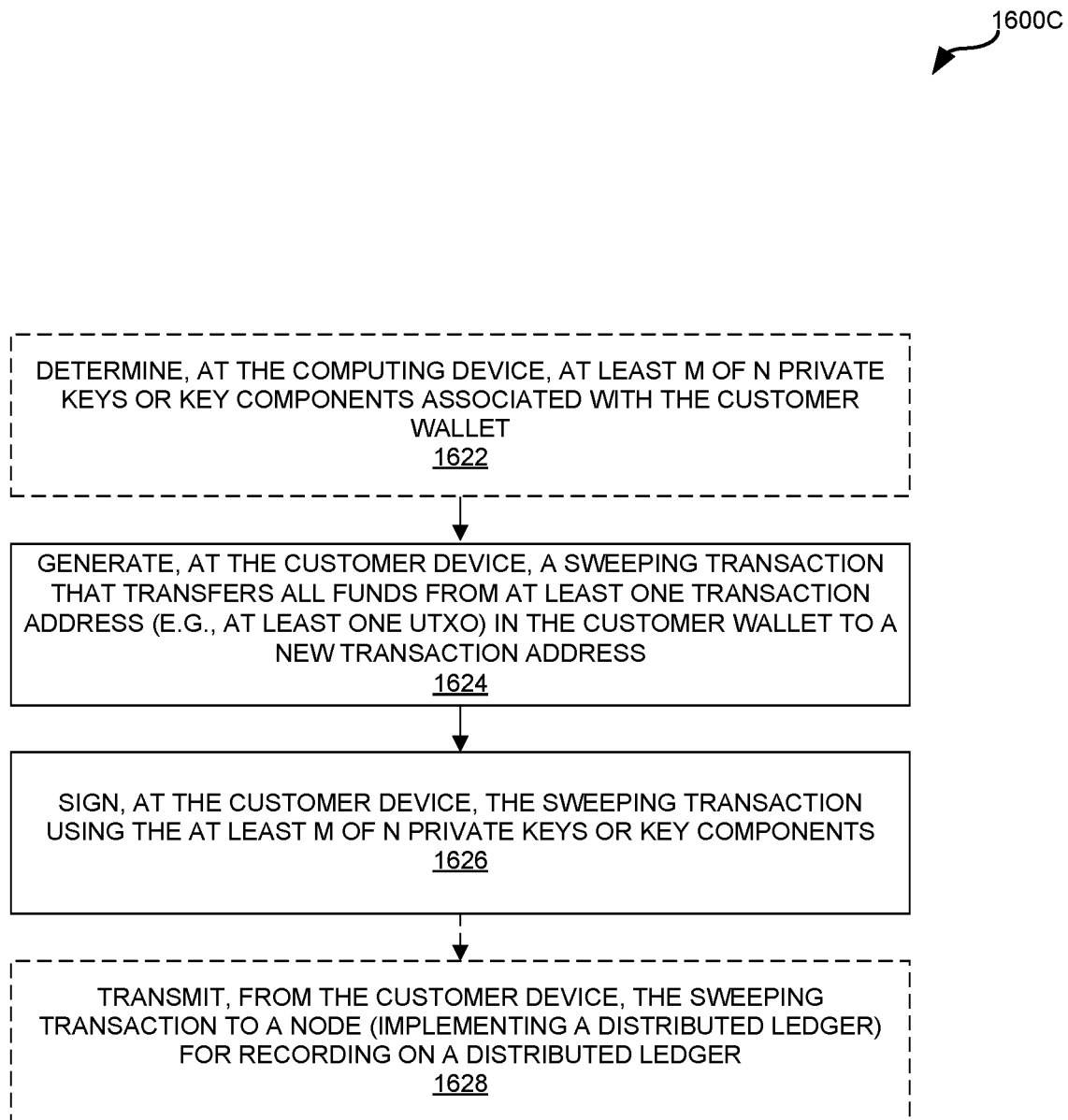
FIG. 16C is a flow diagram illustrating an example method for signing a sweeping transaction using at least M of N private keys (or key components) at a customer device.

FIG. 16C is a flow diagram illustrating an example method 1600C for signing a sweeping transaction using at least M of N private keys (or key components) at a customer device 102. The method 1600C may be performed by at least the customer device 102 in the system 1200 of FIG. 12. The method 1600C may be an example of the action performed in step 1310 of the method 1300 illustrated in FIG. 13.

Optionally, the customer device 102 may determine 1622 at least M of N private keys (or key components). This may include receiving at least some of the at least M of N private keys (or key components) from respective vault systems 1250 and, optionally, identifying a locally-stored private key (or key component) that was not previously stored on a vault system 1250. Alternatively, all of the N private keys (or key components) may be stored across the vault systems 1250, e.g., one private key (or key component) per vault system 1250.

The customer device 102 may generate 1624 a sweeping transaction, e.g., that transfers all funds from at least one transaction address (e.g., at least one unspent transaction output) in the customer wallet to a new transaction address. A sweeping transaction may be used to restore a customer account or wallet, e.g., following a customer device 102 being lost, broken, upgraded or hard reset/reformatted.

The sweeping transaction may also be signed 1626 using the at least M of N private keys (or key components). In examples, the customer device 102 may sign the sweeping transaction using the at least one private key (or key component) that is received from respective vault systems 1250 and, optionally, a locally-stored private key (or key component) that was not previously stored on a vault system 1250. Signing a sweeping transaction may include using a redeem module 1140 operating on the customer device 102. In examples, the redeem module may utilize a redeemScript (e.g., according to BIP16) to produce the signed sweeping transaction 1142, e.g., as described in connection with FIG. 11. In multi-sig examples, a respective private transaction key may be derived from each of the at least M of N private account keys received from a vault system 1250 and, optionally, locally-stored at the customer device 102. The at least M of N private transaction keys (along with the transaction address) may be used as input to the redeem module 1140 to produce a signed sweeping transaction. In key splitting examples, a private transaction key may be derived from a single private account key reconstructed from at least M of N private key components, after which a signed sweeping transaction may be generated based on the private transaction key and transaction address.

Optionally, the customer device 102 may transmit 1628 the sweeping transaction to an optional distributed ledger 118 (e.g., to a node implementing an optional distributed ledger 118) for recording on the optional distributed ledger 118.

In examples, the devices and systems herein are implemented using memory and/or processors. In examples, the memory can be any device, mechanism, or populated data structure used for storing information. In examples, the memory can be or include any type of volatile memory, nonvolatile memory, and/or dynamic memory. In examples, the memory can be random access memory, memory storage devices, optical memory devices, magnetic media, floppy disks, magnetic tapes, hard drives, erasable programmable read-only memories (EPROMs), electrically erasable programmable read-only memories (EEPROMs), optical media (such as compact discs, DVDs, Blu-ray Discs) and/or the like. In accordance with some embodiments, the memory may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory. The memory may be used to store instructions for running one or more applications or modules on the processor. In examples, the memory could be used in one or more examples to house all or some of the instructions needed to execute the functionality of the any of the systems devices described herein. The processor can be any known processor, such as a general purpose processor (GPP) or special purpose (such as a field-programmable gate array (FPGA), application-specific integrated circuit (ASIC) or other integrated circuit or circuitry), or any programmable logic device.

The techniques introduced here can be embodied as special-purpose hardware (such as circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, for example, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Computer System Overview

Figure 17:
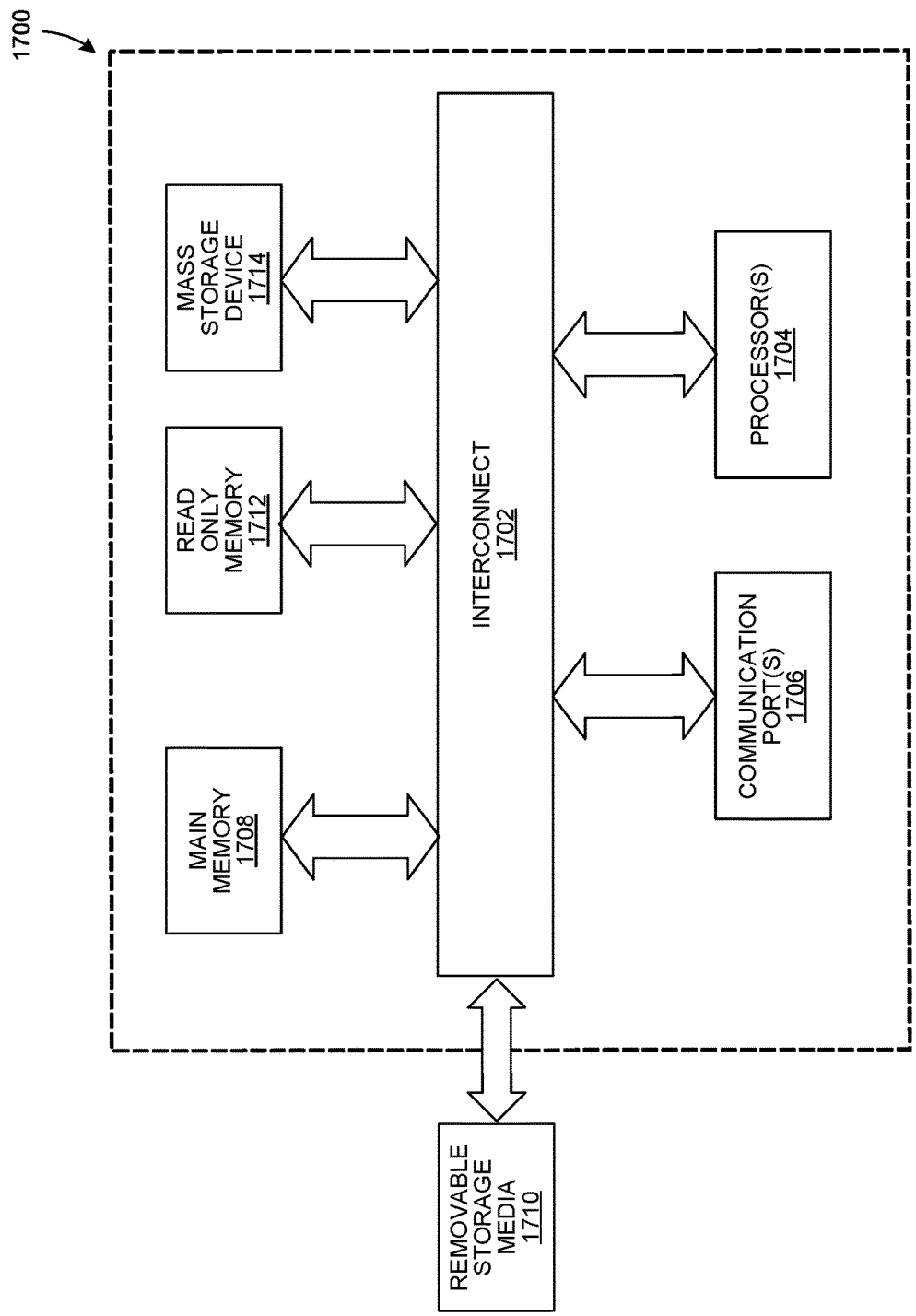
FIG. 17 is a block diagram illustrating an example computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 17 is a block diagram illustrating an example computer system 1700 with which embodiments of the present disclosure may be utilized. According to the present example, the computer system 1700 includes an interconnect 1702, at least one processor 1704, at least one communication port 1706, at least one main memory 1708, at least one removable storage media 1710, at least one read only memory 1712, and at least one mass storage device 1714.

The at least one processor 1704 can be any known processor. The at least one communication port 1706 can be or include, for example, any of an RS-232 port for use with a modem-based dialup connection, a 10/100 Ethernet port, or a Gigabit port using copper or fiber. The nature of the at least one communication port 1706 may be chosen depending on a network such as a Local Area Network (LAN), Wide Area Network (WAN), or any network to which the computer system 1700 connects. The at least one main memory 1708 can be Random Access Memory (RAM), or any other dynamic storage device(s) commonly known in the art. The at least one read only memory 1712 can be any static storage device(s) such as Programmable Read Only Memory (PROM) chips for storing static information such as instructions for the at least one processor 1704.

The at least one mass storage device 1714 can be used to store information and instructions. For example, hard disks (such as magnetic disk drives or solid state drive using serial/parallel ATA or SCSI interfaces), an optical disc, an array of disks such as a Redundant Array of Independent Disks (RAID), or any other mass storage devices may be used. Interconnect 1702 can be or include one or more buses, bridges, controllers, adapters, and/or point-to-point connections. Interconnect 1702 communicatively couples the at least one processor 1704 with the other memory, storage, and communication blocks. Interconnect 1702 can be a PCI/PCI-X or SCSI based system bus depending on the storage devices used. The at least one removable storage media 1710 can be any kind of external hard-drives, floppy drives, Compact Disc-Read Only Memory (CD-ROM), Compact Disc-Re-Writable (CD-RW), Digital Video Disc-Read Only Memory (DVD-ROM), Blu-Ray Disc Read Only Memory (BD-ROM), Blu-Ray Disc Recordable (BD-R), Blu-Ray Disc Recordable Erasable (BD-RE).

The components described above are meant to exemplify some types of possibilities. In no way should the aforementioned examples limit the disclosure, as they are only exemplary embodiments.

Figure 18:
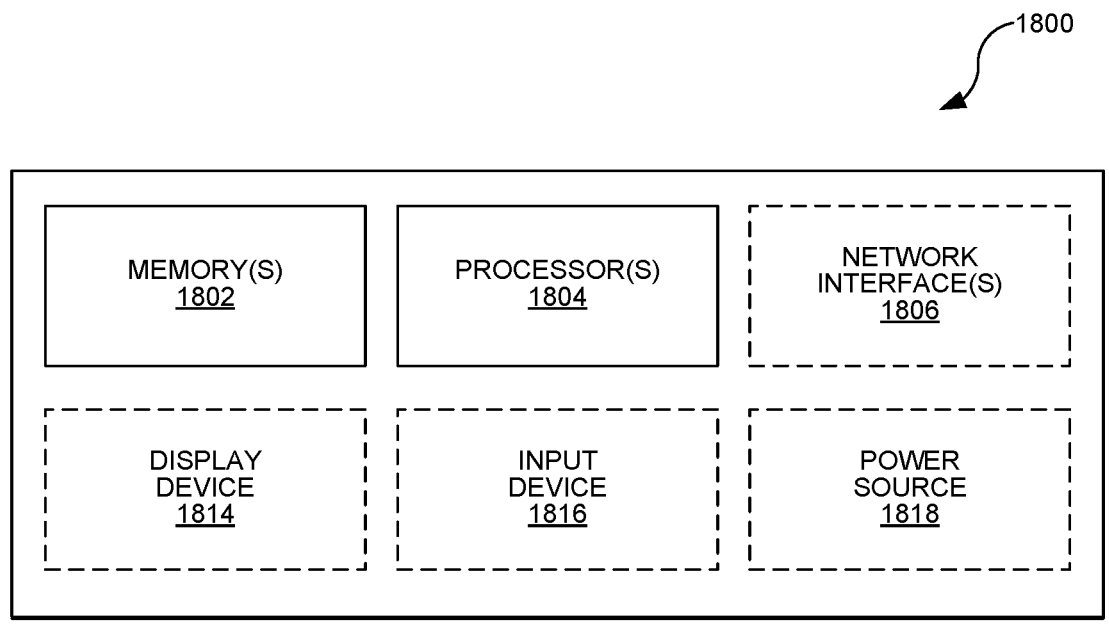
FIG. 18 is a block diagram illustrating another example computing device.

FIG. 18 is a block diagram illustrating another example computing device 1800. The example computing device 1800 may be used to implement any of the customer device 102, the currency conversion system 104, the trusted third party 106, the asset exchange 108 the identity services provider 110, the vault systems 1250, and/or the optional record keeping system 1252. The computing device 1800 includes at least one memory 1802, at least one processor 1804, optional at least one network interface 1806, optional display device 1808, optional input device 1810, and optional power source 1812.

In examples, the at least one memory 1802 can be any device, mechanism, or populated data structure used for storing information. In examples, the at least one memory 1802 can be or include any type of volatile memory, nonvolatile memory, and/or dynamic memory. In examples, the at least one memory 1802 can be random access memory, memory storage devices, optical memory devices, magnetic media, floppy disks, magnetic tapes, hard drives, erasable programmable read-only memories (EPROMs), electrically erasable programmable read-only memories (EEPROMs), optical media (such as compact discs, DVDs, Blu-ray Discs) and/or the like.

In accordance with some embodiments, the at least one memory 1802 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information, which can be used as the at least one memory 1802. The at least one memory 1802 may be used to store instructions for running one or more applications or modules on the at least one processor 1804. In examples, the at least one memory 1802 could be used in one or more examples to house all or some of the instructions needed to execute the functionality discussed herein, e.g., in FIGS. 3-4 and 6-10.

The at least one processor 1804 can be any known processor, such as a general purpose processor (GPP) or special purpose (such as a field-programmable gate array (FPGA), application-specific integrated circuit (ASIC) or other integrated circuit or circuitry), or any programmable logic device. In examples, any of the functionality disclosed herein (e.g., in FIGS. 3-4, 6-10 and 13-16C) may be implemented by the at least one processor 1804 and the at least one memory 1802.

In examples, the at least one optional network interface 1806 includes or is coupled to at least one optional antenna for communication with a network (such as one of the at least one networks 112 of system 100). In examples, the at least one optional network interface 1806 includes at least one of an Ethernet interface, a cellular radio access technology (RAT) radio, a Wi-Fi radio, a Bluetooth radio, or a near field communication (NFC) radio. In examples, the at least one optional network interface 1806 includes a cellular radio access technology radio configured to establish a cellular data connection (mobile Internet) of sufficient speeds with a remote server using a local area network (LAN) or a wide area network (WAN). In examples, the cellular radio access technology includes at least one of Personal Communication Services (PCS), Specialized Mobile Radio (SMR) services, Enhanced Special Mobile Radio (ESMR) services, Advanced Wireless Services (AWS), Code Division Multiple Access (CDMA), Global System for Mobile Communications (GSM) services, Wideband Code Division Multiple Access (W-CDMA), Universal Mobile Telecommunications System (UMTS), Worldwide Interoperability for Microwave Access (WiMAX), 3rd Generation Partnership Projects (3GPP) Long Term Evolution (LTE), High Speed Packet Access (HSPA), third generation (3G) fourth generation (4G), fifth generation (5G), etc. or other appropriate communication services or a combination thereof. In examples, the at least one optional network interface 1806 includes a Wi-Fi (IEEE 802.11) radio configured to communicate with a wireless local area network that communicates with the remote server, rather than a wide area network. In examples, the at least one optional network interface 1806 includes a near field radio communication device that is limited to close proximity communication, such as a passive near field communication (NFC) tag, an active near field communication (NFC) tag, a passive radio frequency identification (RFID) tag, an active radio frequency identification (RFID) tag, a proximity card, or other personal area network device.

In examples, the optional at least one display device 1808 includes at least one of a light emitting diode (LED), a liquid crystal display (LCD), a light emitting diode (LED) display, an organic light emitting diode (OLED) display, an e-ink display, a field emission display (FED), a surface-conduction electron-emitter display (SED), or a plasma display. In examples, the optional at least one input device 1810 includes at least one of a touchscreen (including capacitive and resistive touchscreens), a touchpad, a capacitive button, a mechanical button, a switch, a dial, a keyboard, a mouse, a camera, a biometric sensor/scanner, a microphone, etc. In examples, the optional at least one display device 1808 is combined with the optional at least one input device 1810 into a human machine interface (HMI) for user interaction with the customer device 102, the currency conversion system 104, and/or the trusted third party 106. In examples, at least one optional power source 1812 is used to provide power to the various components of the computing device 1800.

Terminology

Brief definitions of terms, abbreviations, and phrases used throughout this application are given below.

The term "determining" may include calculating, computing, generating, processing, deriving, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the phrase "based on" does not preclude intermediate steps, e.g., A is based on C may mean that B is based on C and A is based on B. Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in exemplary embodiments", "in example embodiments", "in some embodiments", "according to some embodiments", "in the embodiments shown", "in other embodiments", "embodiments", "in examples", "examples", "in some examples", "some examples" and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead are examples. Other systems, devices, and networks to which embodiments of the present disclosure are applicable include, for example, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present disclosure provides a novel multi-approval system using M of N keys to perform an action at a customer device and associated methods. While detailed descriptions of one or more embodiments of the disclosure have been given above, various alternatives, modifications, and equivalents will be apparent to those skilled in the art without varying from the spirit of the disclosure. In examples, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

EXAMPLE EMBODIMENTS

Example 1 includes a customer device, comprising: at least one processor; at least one memory communicatively coupled to the at least one processor; at least one network interface communicatively coupled to the at least one processor and configured to communicate with at least one vault system, each of the at least one vault system storing a respective one of N private keys or key components associated with a customer; wherein the at least one processor is configured to: receive, from each of at least one vault system, a respective private key or key component; perform at least one action based on at least M of the N private keys or key components.

Example 2 includes the customer device of Example 1, wherein M is greater than one and less than N.

Example 3 includes the customer device of any of Examples 1-2, wherein M is greater than one and equal to N.

Example 4 includes the customer device of any of Examples 1-3, wherein the at least one processor is further configured to generate and transmit the N private keys or key components to the at least one vault system.

Example 5 includes the customer device of any of Examples 1-4, wherein the N private keys or key components are generated by the at least one vault system.

Example 6 includes the customer device of any of Examples 1-5, wherein the N private keys or key components are generated by the at least one vault system and the customer device.

Example 7 includes the customer device of any of Examples 1-6, wherein the at least one processor is further configured to transmit identity data for the customer; wherein the customer is authenticated, based on the identity data, at each of the at least one vault system or at an identity services provider.

Example 8 includes the customer device of Example 7, wherein the identity data comprises biometric data.

Example 9 includes the customer device of any of Examples 1-8, wherein each of the at least one vault system is owned or operated at least one of: a credit union; a bank; a currency conversion system that converts currency into another form of currency; a corporation; and an individual.

Example 10 includes the customer device of any of Examples 1-9, wherein the at least one action comprises: identifying data to be encrypted or decrypted; and encrypting or decrypting the data based on the at least M of the N private keys or key components.

Example 11 includes the customer device of any of Examples 1-10, wherein the at least one action comprises: for each of the N private keys, deriving a public transaction key; generating a multi-approval transaction address based on the N public transaction keys; wherein at least M of the N private keys are required to transact from the multi-approval transaction address.

Example 12 includes the customer device of any of Examples 1-11, wherein the at least one action comprises: reconstructing a single private key from the at least M of N private key components; deriving a public transaction key from the reconstructed single private key; and generating a transaction address based on the public transaction key.

Example 13 includes the customer device of any of Examples 1-12, wherein the at least one action comprises: receiving funds into a generated transaction address as part of a transaction; and transmitting, from the customer device, the transaction to a node implementing a distributed ledger for recording on the distributed ledger.

Example 14 includes the customer device of any of Examples 1-13, wherein the at least one action comprises: generating, at the customer device, a transaction; signing the transaction, at the customer device, using the at least M of N private keys or key components.

Example 15 includes the customer device of Example 14, wherein the transaction is a sweeping transaction that transfers all funds from at least one input transaction address in a customer wallet to a new transaction address.

Example 16 includes a method performed by a customer device communicating with at least one vault system, each of the at least one vault system storing a respective one of N private keys or key components associated with a customer, the method comprising: receiving, from each of at least one vault system, a respective private key or key component; performing at least one action based on at least M of the N private keys or key components.

Example 17 includes the method of any of Examples 15-16, wherein M is greater than one and less than N.

Example 18 includes the method of any of Examples 15-17, wherein M is greater than one and equal to N.

Example 19 includes the method of any of Examples 15-18, further comprising generating and transmitting the N private keys or key components to the at least one vault system.

Example 20 includes the method of any of Examples 15-19, wherein the N private keys or key components are generated by the at least one vault system.

Example 21 includes the method of any of Examples 15-20, wherein the N private keys or key components are generated by the at least one vault system and the customer device.

Example 22 includes the method of any of Examples 15-21, further comprising transmitting identity data for the customer; wherein the customer is authenticated, based on the identity data, at each of the at least one vault system or at an identity services provider.

Example 23 includes the method of Example 22, wherein the identity data comprises biometric data.

Example 24 includes the method of any of Examples 15-23, wherein each of the at least one vault system is owned or operated at least one of: a credit union; a bank; a currency conversion system that converts currency into another form of currency; a corporation; and an individual.

Example 25 includes the method of any of Examples 15-24, wherein the performing at least one action comprises: identifying data to be encrypted or decrypted; and encrypting or decrypting the data based on the at least M of the N private keys or key components.

Example 26 includes the method of any of Examples 15-25, wherein the performing at least one action comprises: for each of the N private keys, deriving a public transaction key; generating a multi-approval transaction address based on the N public transaction keys; wherein at least M of the N private keys are required to transact from the multi-approval transaction address.

Example 27 includes the method of any of Examples 15-26, wherein the performing at least one action comprises: reconstructing a single private key from the at least M of N private key components; deriving a public transaction key from the reconstructed single private key; and generating a transaction address based on the public transaction key.

Example 28 includes the method of any of Examples 15-27, wherein the performing at least one action comprises: receiving funds into a generated transaction address as part of a transaction; and transmitting, from the customer device, the transaction to a node implementing a distributed ledger for recording on the distributed ledger.

Example 29 includes the method of any of Examples 15-28, wherein the performing at least one action comprises: generating, at the customer device, a transaction; signing the transaction, at the customer device, using the at least M of N private keys or key components.

Example 30 includes the method of Example 29, wherein the transaction is a sweeping transaction that transfers all funds from at least one input transaction address in a customer wallet to a new transaction address.

Example 31 includes the method of any of Examples 15-30, wherein the performing at least one action comprises signing a transaction, using the at least M of N private keys, transferring funds from a multi-approval transaction address in the customer wallet; wherein the multi-approval transaction address in the customer wallet is generated at a currency conversion system, using a hashing function, based on the N private keys; wherein the currency conversion system transmits the new transaction address to the customer device.

The invention claimed is:

1. A system, comprising:
   a first computing device, comprising:
   at least one first processor;
   at least one first memory communicatively coupled to the at least one first processor and storing first instructions; and
   network interface circuitry communicatively coupled to the at least one first processor and configured to communicate with a plurality of remote servers;
   wherein the at least one first processor executes the first instructions causing the first computing device to:
   generate a plurality of private key components from a private key;
   transmit a respective private key component of the plurality of private key components to each of the plurality of remote servers via at least one network;
   the plurality of remote servers, each comprising at least one memory, each respective remote server of the plurality of remote servers executing a respective set of server instructions that, when executed, cause the respective remote server to:
   receive at least one piece of identity data from a second computing device;
   perform customer authentication based on the at least one piece of identity data from the second computing device; and
   transmit the respective private key component of the plurality of private key components, stored on the respective remote server, to the second computing device via the at least one network in response to a successful customer authentication; and
   the second computing device, comprising:
   at least one second processor;
   at least one second memory communicatively coupled to the at least one second processor and storing second instructions that, when executed, cause the second computing device to:
   receive multiple private key components of the plurality of private key components from the plurality of remote servers via the at least one network;
   reconstruct a single private key from the multiple private key components of the plurality of private key components; and
   perform at least one of: (1) decrypt encrypted data using the single private key; (2) encrypt data based on a public key derived from the single private key; (3) generate a transaction address using a hashing function and based on a public transaction key derived from the single private key; or (4) cryptographically sign a transaction using the single private key.

2. The system of claim 1, wherein the second instructions that, when executed, cause the second computing device to reconstruct the single private key from the multiple private key components of the plurality of private key components comprise instructions causing the at least one second processor to reconstruct the single private key from less than a total quantity of the plurality of private key components.

3. The system of claim 1, wherein the second instructions that, when executed, cause the second computing device to reconstruct the single private key from the multiple private key components of the plurality of private key components comprise instructions causing the at least one second processor to reconstruct the single private key from all of the plurality of private key components.

4. The system of claim 1, wherein the identity data comprises biometric data.

5. The system of claim 1, wherein each of the plurality of remote servers is controlled by at least one of:
   a credit union;
   a bank;
   a currency conversion system that storing instructions executable to cause the currency conversion system to convert a first form of currency into another form of currency;
   a corporation; and
   an individual.

6. The system of claim 1, wherein the second instructions, when executed, cause the second computing device to:
- identify the data to be encrypted or the encrypted data to be decrypted; and
- perform at least one of: (1) decrypt the encrypted data using the single private key; and (2) encrypt the data based on the public key derived from the single private key.

7. The system of claim 1, wherein the second instructions, when executed, cause the second computing device to:
- derive the public transaction key from the single private key.

8. The system of claim 1, wherein the second instructions, when executed, cause the second computing device to:
- generate the transaction address using the hashing function and based on the public transaction key derived from the single private key;
- receive funds into the transaction address; and
- transmit the transaction from the second computing device to a node, the node configured for storing a copy of a distributed ledger and for recording the transaction on the distributed ledger.

9. The system of claim 1, wherein the second instructions, when executed, cause the second computing device to:
- generate the transaction at the second computing device; and
- cryptographically sign the transaction using the single private key.

10. The system of claim 9, wherein the second instructions that, when executed, cause the second computing device to generate the transaction address comprise instructions causing the at least one second processor to generate a sweeping transaction indicating a transfer of all funds from at least one multiple input transaction addresses in a customer wallet to a second transaction address.

11. A method performed by a first computing device and a second computing device communicating with a plurality of remote servers, the method comprising:
- generating a plurality of private key components from a private key;
- transmitting a respective private key component of the plurality of private key components from the first computing device to each of the plurality of remote servers via at least one network;
- receiving at least one piece of identity data, at each of the plurality of remote servers, from the second computing device;
- performing customer authentication based on the at least one piece of identity data from the second computing device;
- transmitting the respective private key component of the plurality of private key components, stored on a respective remote server, of the plurality of remote servers to the second computing device via the at least one network in response to a successful customer authentication;
- reconstructing, at the second computing device, a single private key from multiple private key components of the plurality of private key components; and
- performing at least one of: (1) decrypting encrypted data using the single private key; (2) encrypting data based on a public key derived from the single private key; (3) generating a transaction address using a hashing function and based on a public transaction key derived from the single private key; or (4) cryptographically signing a transaction using the single private key.

12. The method of claim 11, wherein the reconstructing the single private key from the multiple private key components of the plurality of private key components comprises reconstructing the single private key from less than a total quantity of the plurality of private key components.

13. The method of claim 11, wherein the reconstructing the single private key from the multiple private key components of the plurality of private key components comprises reconstructing the single private key from all of the plurality of private key components.

14. The method of claim 11, wherein the identity data comprises biometric data.

15. The method of claim 11, wherein each of the plurality of remote servers is controlled by at least one of:
- a credit union;
- a bank;
- a currency conversion system that converts a first form of currency into another form of currency;
- a corporation; and
- an individual.

16. The method of claim 11, further comprising:
- identifying the data to be encrypted or decrypted; and
- performing at least one of: (1) decrypting the encrypted data using the single private key; and (2) encrypting the data based on the public key derived from the single private key.

17. The method of claim 11, further comprising:
- deriving the public transaction key from the single private key; and
- generating the transaction address using the hashing function and based on the public transaction key.

18. The method of claim 11, further comprising
- generating the transaction address using the hashing function and based on the public transaction key derived from the single private key;
- receiving funds into the transaction address; and
- transmitting the transaction from the second computing device to a node, the node configured for storing a copy of a distributed ledger and for recording the transaction on the distributed ledger.

19. The method of claim 11, further comprising:
- generating the transaction at the second computing device; and
- cryptographically signing the transaction using the single private key.

20. The method of claim 19, wherein the generating the transaction address comprises generating a sweeping transaction indicating a transfer of all funds from at least one multiple input transaction addresses in a customer wallet to a second transaction address.

21. The system of claim 1, wherein one of the plurality of remote servers is a currency conversion system; and
- wherein the respective set of server instructions cause the respective remote server to:
  - perform the customer authentication at least in part by confirming that the identity data from the second computing device matches stored biometric data for a customer and confirming that anti-money-laundering screening was previously performed for the customer.

22. The system of claim 1, wherein the second computing device is a different device from the first computing device.

23. The system of claim 1, wherein the second computing device is a same device as the first computing device.

24. The method of claim 11, wherein the second computing device is a different device from the first computing device.

25. The method of claim 11, wherein the second computing device is a same device as the first computing device.

\* \* \* \* \*